United States Patent [19]

Nay et al.

[11] Patent Number: 5,237,567
[45] Date of Patent: Aug. 17, 1993

[54] PROCESSOR COMMUNICATION BUS

[75] Inventors: Daniel L. Nay, Palos Verdes; Darryl K. Korn, Laguna Beach; John T. Ralph, Mission Viejo, all of Calif.

[73] Assignee: Control Data Systems, Inc., Arden Hills, Minn.

[21] Appl. No.: 607,143

[22] Filed: Oct. 31, 1990

[51] Int. Cl.[5] .............................................. H04J 3/02
[52] U.S. Cl. ................... 370/85.1; 370/85.2; 370/85.6; 370/85.7; 370/85.11
[58] Field of Search .................. 370/85.11, 85.9, 85.1, 370/85.6, 85.7; 340/825.5

[56] References Cited

U.S. PATENT DOCUMENTS 4,229,792 10/1980 Jensen et al. .................... 370/85.1
4,550,402 10/1985 Gable et al. .................... 370/85.11
4,604,743 8/1986 Alexandru .................... 370/85.11

Primary Examiner—Douglas W. Olms
Assistant Examiner—Min Jung
Attorney, Agent, or Firm—Ronald M. Goldman

[57] ABSTRACT

In a computer system that contains plural computer resource elements, such as multiple processor and memory units, with those elements communicating digital information over a common communications bus, high communications bus efficiency is achieved. An interface permits each of said processor and memory elements to individually and independently access either the data bus, without busying the address bus, or the address bus without busying the data bus, with bus access being limited to a fixed interval of time. Different ones of said processor and memory units may thus simultaneously transfer digital information over the respective address and data bus. The foregoing system includes a bus contention and priority protocol to eliminate the possibility of data collision and includes identification lines for identifying each processor element accessing the bus.

30 Claims, 13 Drawing Sheets

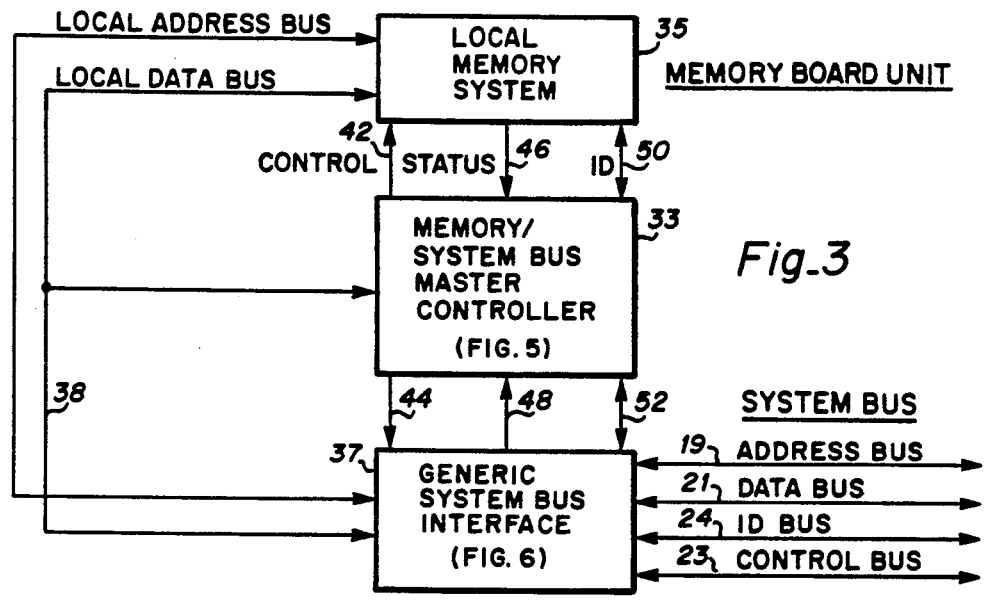
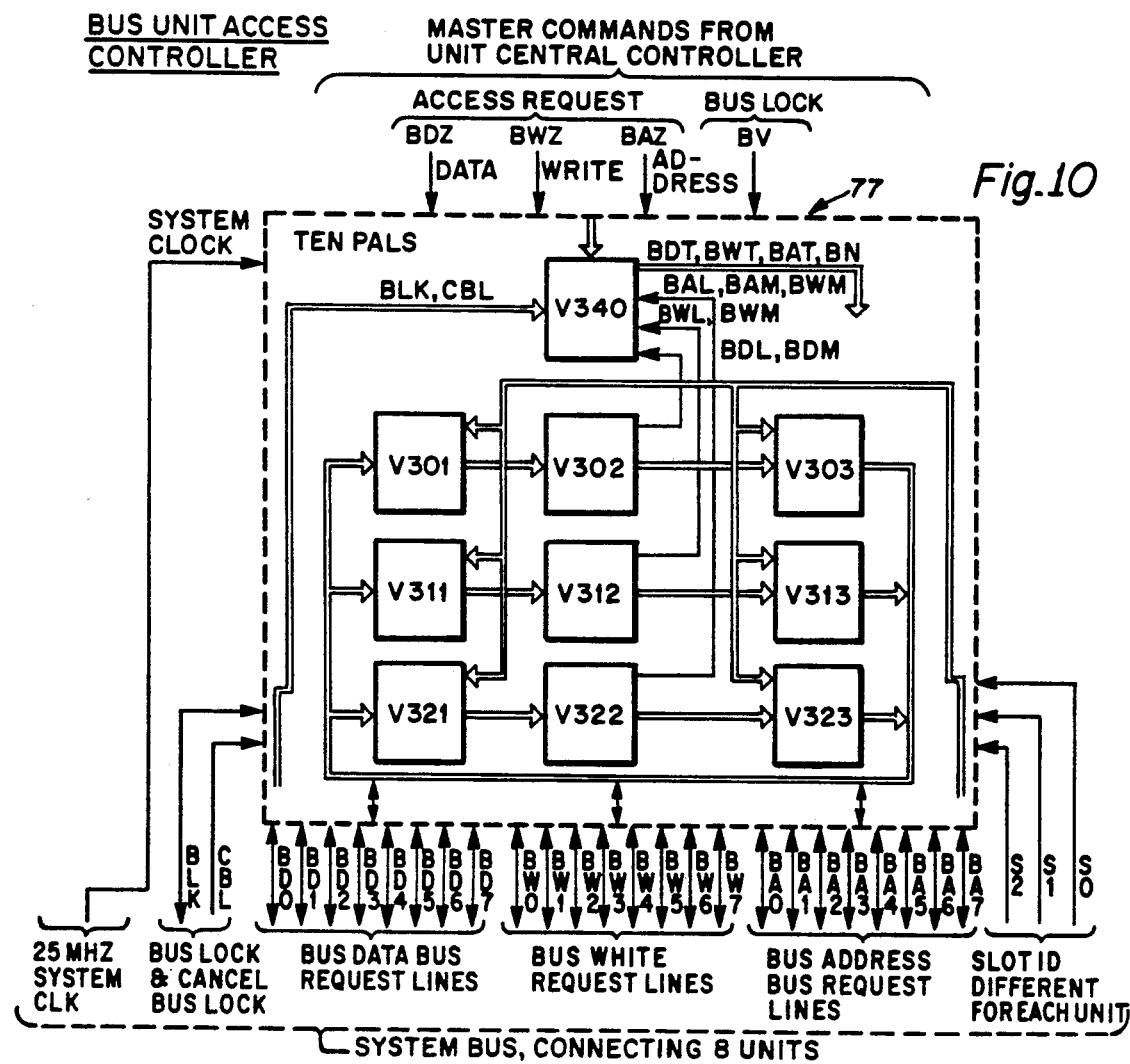

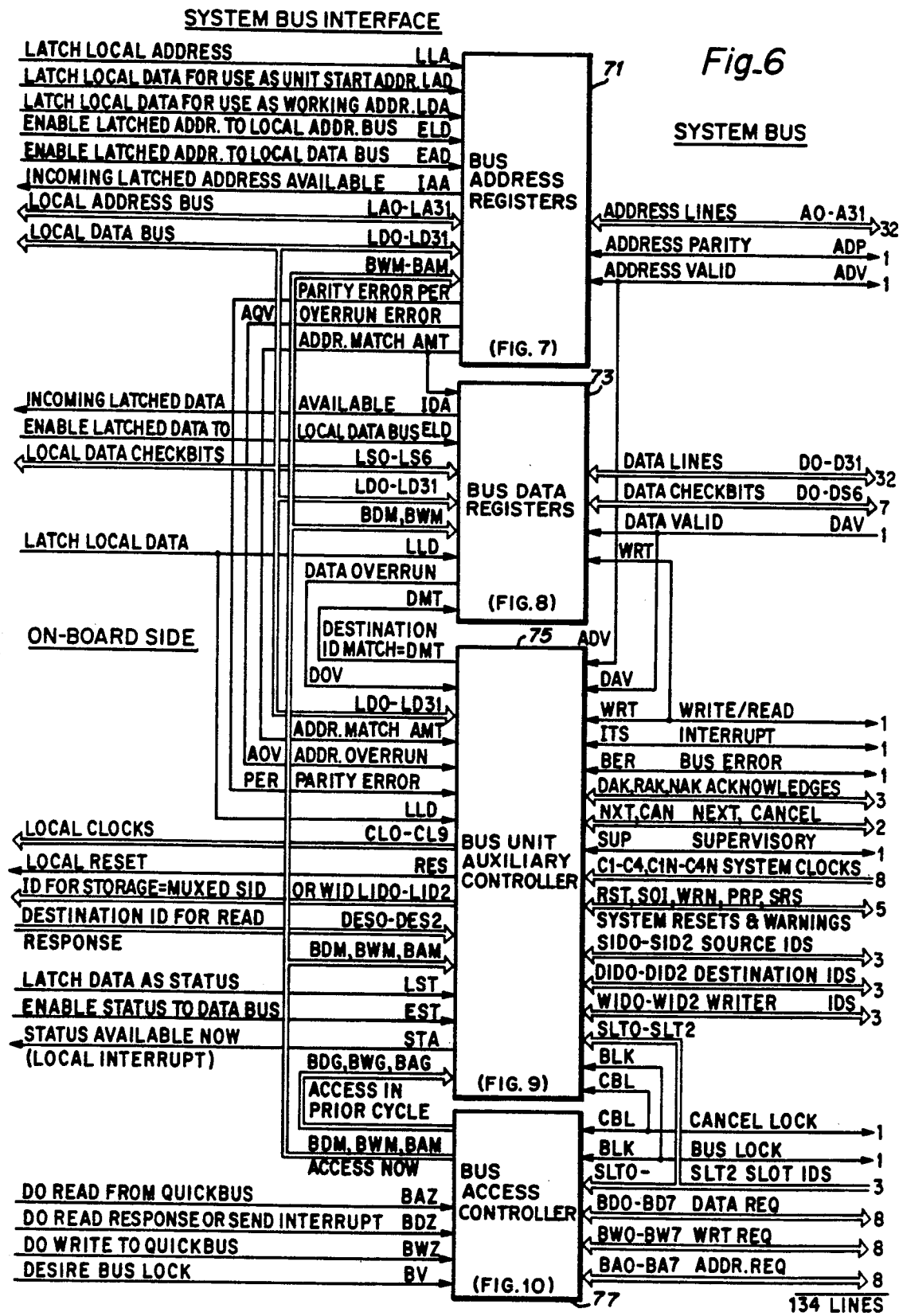

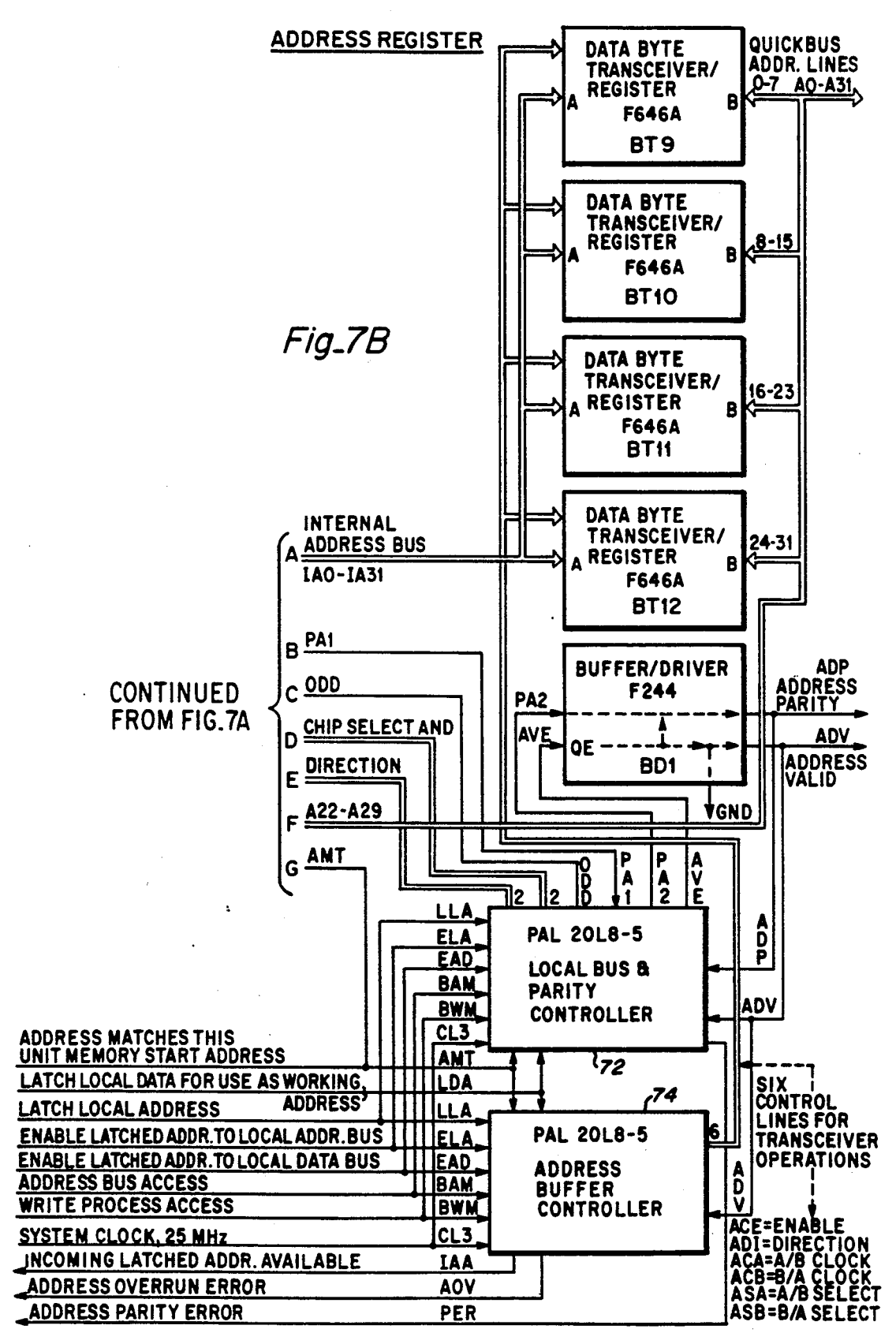

Fig_7B

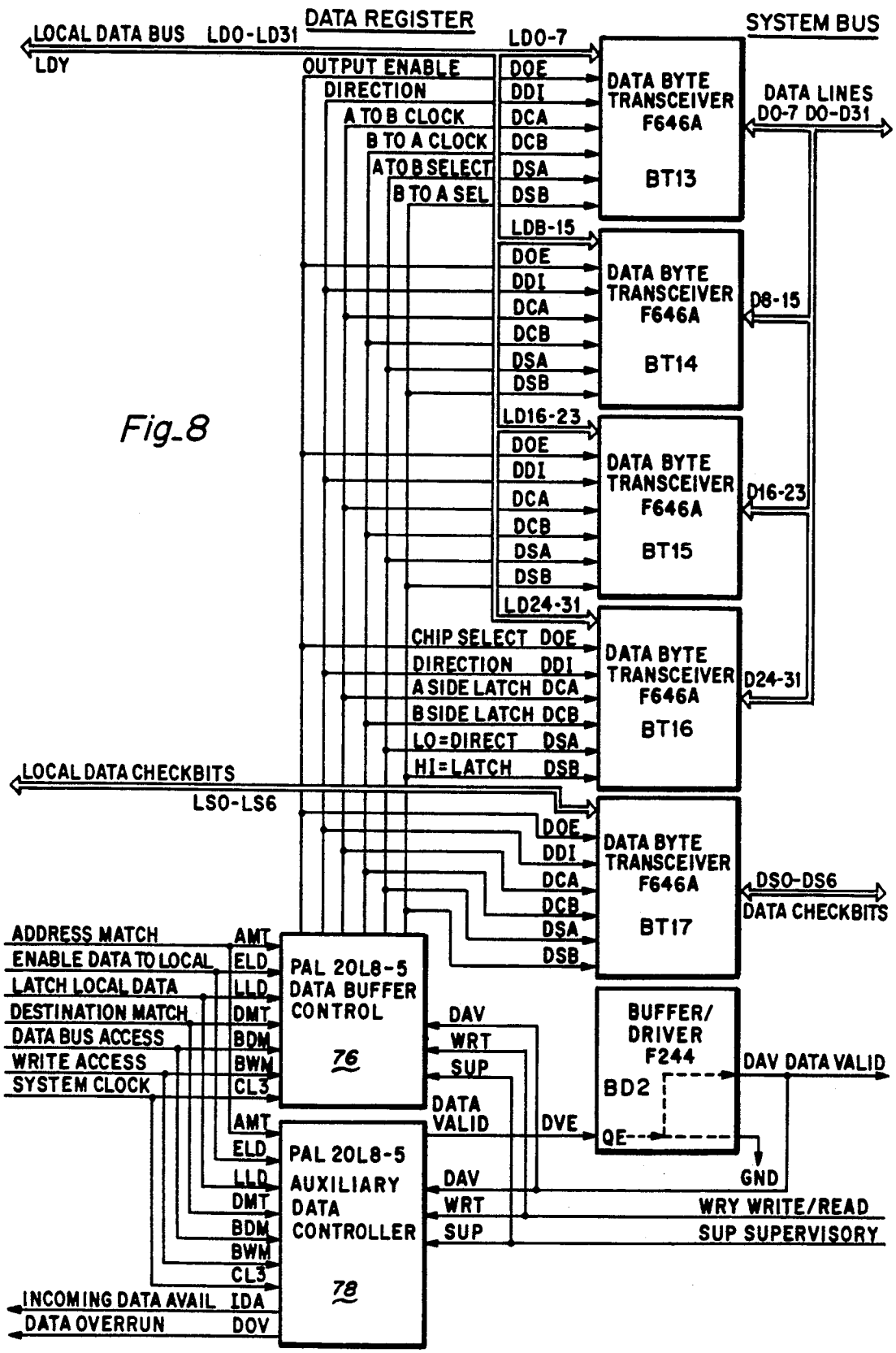
Fig_8

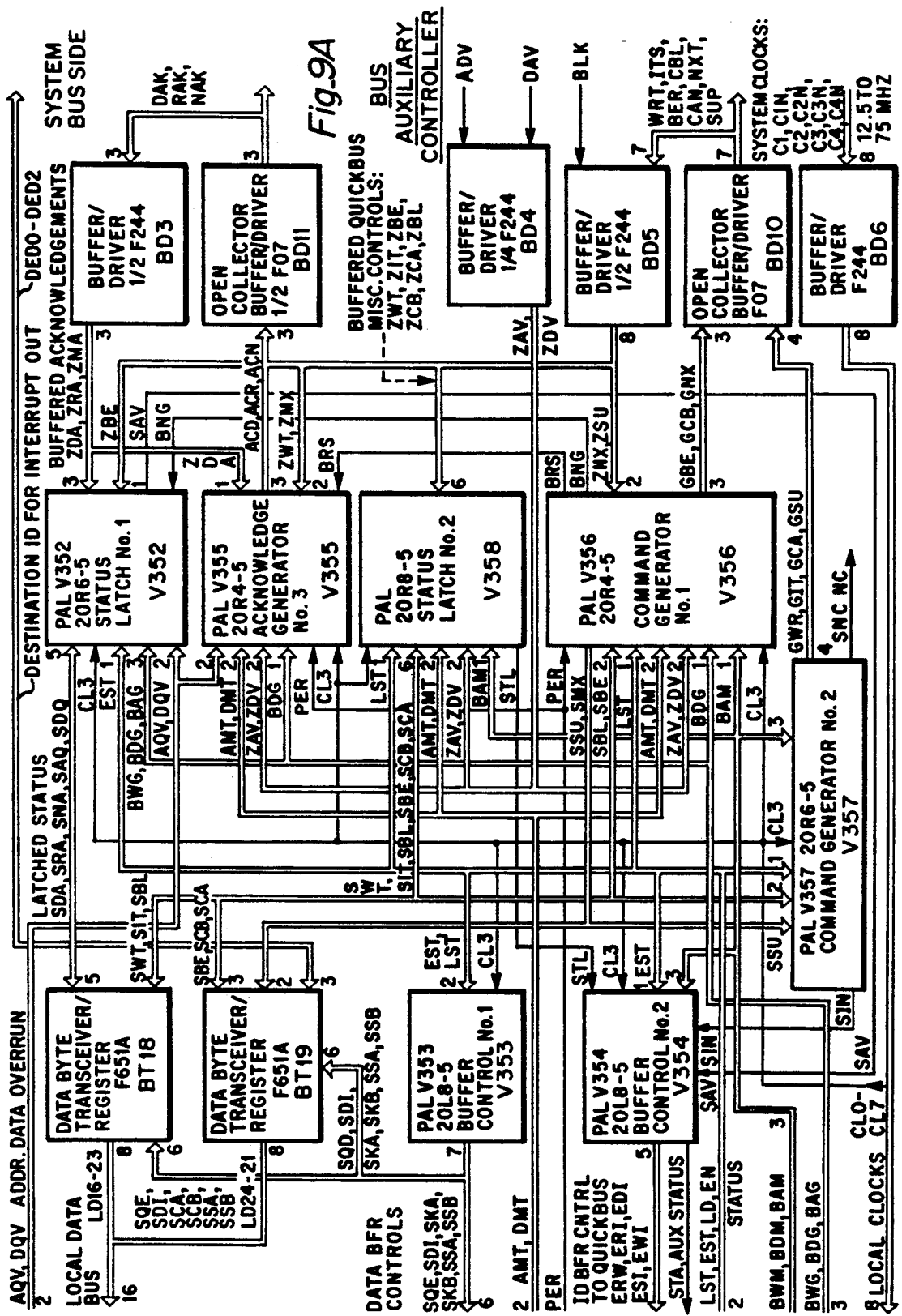

BOARD BUS ACCESS CONTROLLER

PROCESSOR COMMUNICATION BUS

FIELD OF THE INVENTION

The present invention relates to improved data processor systems and, as variously termed, computer systems that incorporate, as an element, a bus connected in common to various computer resource elements in the computer system for permitting bilateral transfer of information in electronic digital form among such various computer resources in that computer system, and, more particularly, to a novel method and apparatus for substantially increasing the utilization efficiency of the communications bus within a data processor or computer system.

BACKGROUND

Every data processor or, as variously termed, computer system, contains at least one communications bus, often simply referred to as a system bus or, simply, bus, by means of which information in digital form, whether data and/or control information, is transferred by and between various component and peripheral elements of the computer system. In a computer system having a plurality of computer devices coupled over a system bus, such as a central processing unit and an internal memory unit, as example, an orderly system must be provided to achieve bi-directional transfer of digital information between such devices. When such computer devices include, for example, one or more central processor units, CPUs, and various types of peripheral device interfaces, such as magnetic tape storage devices, disk storage devices, electronic memory and the like, as may be referred to generically as computer resources or devices coordinated efficient transfer of digital information among those elements require coordination that is regarded as somewhat complicated.

A typical communication bus in such a prior computer system contains essentially three parts: address, data and control bus portions, as logically define the types of information transmitted over the bus. The communication bus may be of a serial type, in which data and control information is transmitted serially or it may be of a parallel type, the latter of which concerns the present invention. The data and address portions are usually parallel buses, wherein the address and data information are each propagated as a group of digital "bits" in parallel, as forms a digital "word". The word in turn defines an address within the computer resource or data information or portions thereof. Each such parallel bus thus is said to be of a certain number of digital bits in width. As example, a bus structure capable of processing thirty-two bit length digital "words" may contain at least thirty-two electrical lines or leads for data information and may frequently contain thirty-two additional leads for address information; those kinds of information can be transmitted simultaneously, in parallel. Some systems cause address and data to share a common bus, each being allotted a time slot so that first address and then data traverse the same lines.

Each communications bus includes control lines or a control bus portion, as variously termed. The control lines carry the signals that manage the direction of data transmission from source to destination; the acquisition and relinquishment of control of the bus in those systems containing more than one central processing units or "master"; processor "interrupts" from one card to another; power-up and down sequencing; bus errors, which may occur, data error detection and correction; sequence control information and the like. In these control functions the design of one computer may differ from that of another computer design. Consequently, as between computer designs the control bus is subject to significant differences in size and function, the number of electrical leads forming the bus and their purpose, depending upon the desired bus characteristics for a particular computer. In that regard the composition of the control bus in the present invention contains unique features: lines are included that carry the identification of the particular computer resource within the computer system that accessed the communication bus.

Interconnections between the computer resources of a computer system range from those having common data bus paths, as previously discussed, to those which have special transmission paths. Some such systems require the data processor's control of any data transfer on the bus even though, for example, the transfer may be between devices other than the data processor and be independent of the manner in which such devices are connected or operate. Other more efficient systems employ a separate state machine or processor, a controller, dedicated to management and control of the communications bus, thereby relieving the central processor unit of that burden. The processor associated with a particular computer resource need only take the time to drop off instructions and data to the bus controller and returns immediately to its other tasks. In turn the bus controller performs all the tasks necessary in the system to carry out those instructions and controls the communications bus. The present invention likewise employs a unique controller or interface, as variously termed, to control the communications bus.

Prior computer systems may include capability for either synchronous or asynchronous operation in combination with the particular communication bus. In general, data buses used in such systems are either synchronous, wherein data transfer is performed in synchronization with a clock signal, or are asynchronous, wherein handshake signals synchronize the sending and receiving units. The present invention includes a combination of both characteristics, allowing for operations synchronously and requiring handshakes, asynchronously given, to acknowledge receipt of data transmitted on the bus.

In a synchronous data bus system, all data transfers are performed in synchronization with a clock signal. That is, the operation of the sending and receiving units is synchronized to the system clock, wherein operation occurs, for example, on the rise of the clock pulse at the beginning of each clock cycle. Such systems may utilize either a single frequency clock, or a multiple or variable frequency clock. A single frequency clock system allows the use of simple clock circuitry. However, data transmission rate, and thus operation of the overall system, is limited to the data rate of the slowest device in such data processing system. In a multiple or variable clock rate system, a clock rate is selected to be that of the slower of the sending or receiving units currently communicating. Data rate may, however, be selected to be the highest achievable with the particular units which are communicating. A multiple or variable data rate synchronous system is, in general, more complex than a single clock rate system since the clock circuitry must be capable of generating a multiplicity of clock frequencies. Before data communication can be performed, however, the sending and receiving units must communicate to elect a clock rate. The present invention provides for transfer of digital information synchronously with a system clock of fixed frequency.

In an asynchronous data bus system, transfer of data between a sending and a receiving unit is effectively synchronized by handshake signals. That is, a sending unit places data on the bus and transmits a handshake signal to the receiving unit indicating that data is present on the bus. The sending unit then waits. When the receiving unit is ready it accepts the data and then transmits a return handshake signal to the sending unit, acknowledging that the data has been accepted. An asynchronous data bus system thereby allows greater flexibility of data rate. The data rate occasionally may be the maximum achievable rate between a particular sending and receiving unit pair.

An asynchronous data bus system is in general, however, more complex than a synchronous system due to the requirement to exchange handshake signals. In addition, maximum data rate may not be achievable due to the requirement to resynchronize the data transferred at the sending and receiving units. That is, data must first be transferred from one computer resource, for example, a disc drive, to a sending unit, then from the sending unit to the receiving unit, and finally from the receiving unit to, for example, a data processor. Additional delays in data transmission may be imposed at the sending end of the bus in transferring data from the peripheral device to the sending unit, and from the sending unit to the communications bus. This delay occurs because data transfer between the peripheral device and the sending unit is not synchronized with transfer of data from the sending unit to the data bus. Similarly, additional data transmission delays may be imposed at the receiving end because reception of data by the receiving unit is not synchronized with transfer of data between the receiving unit and the data processor. The present invention also uses a handshake signal, sometimes more properly referred to as an acknowledgement, to indicate the receiving computer resource's acceptance of digital information. However, with the present invention inefficiencies attendant to waiting on the bus for the handshake signal are avoided.

A prior digital data bus system that operates synchronously with a fixed clock rate and has a variable data rate selected by the sending and receiving units is presented in a prior patent U.S. Pat. No. 4,229,792 granted Oct. 21, 1980 to Jensen, et. al., entitled "Bus Allocation Synchronization System". As example, in that prior system a master controller is located, for example, at a data processor and a peripheral controller is located at each other unit, or peripheral device, of the data processing system. Peripheral devices may include, for example, processors, disc drive memories, intelligent terminals, or further data transmission links. The master controller and all peripheral controllers are interconnected through a communication bus. The master and peripheral controllers comprise the interfaces between, respectively, the data processor and peripheral devices and the bus. A fixed frequency clock is generated by the master controller and that clock is distributed to all peripheral controllers through a single clock line. In addition to address/data lines, the bus includes a single handshake signal line, referred to as the Hold line, shared by the master and peripheral controllers.

In that prior system all data transfers are executed on a clock pulse, i.e., synchronously, but data transfer rate is controlled by the particular sending and receiving units. A sending unit places digital information, for example, an address or data, on the bus in synchronization with the clock. If the receiving unit happens to be ready at that moment to receive that information, the information is transferred into the receiving unit on the same clock pulse. If the receiving unit, however, is not ready to receive the digital information on the bus, the receiving unit asserts a Hold signal on a Hold line. The sending unit responds to a Hold signal by maintaining the information to be transferred on the bus for each clock period in which Hold signal is asserted. When the receiving unit is ready to receive the information, the Hold signal is terminated and the information is transferred on the next clock pulse. Thus, all information transfers are synchronous with the single frequency, fixed period clock. Actual rate of data transfer, however, is variable and is automatically determined by the particular sending and receiving units so as to occur at the maximum rate achievable by the particular pair of sending and receiving units. In that system the effective "thruput" of information transfer on the communication bus as a practical matter would be limited as occasioned by routinely occurring "holds" tying up the bus. A hold requires all resources in the system to wait until the occurrence of a pre-defined event. No data is transferred. As that presents inefficiency, the present invention preferably does not include a hold. As distinct from a hold, a bus "lock" as enables a particular computer resource to control and use the bus is employed on a non-routine basis; the bus lock permits continued data transfer over the bus while "locked", thereby maintaining bus efficiency.

Every processor communication bus has a maximum theoretical limit to the amount of data that may be passed from one computer resource to another over the bus; a limit that is often referred to as "thruput". For example, a computer bus for a small computer having a thirty two bit wide data word might achieve a maximum thruput on the order of between twenty to forty million bytes per second, a "byte" comprising eight "bits", when using a clock of twenty five MHz. That thruput is not presently achieved with present day small computers due to the inability of the computer's main memory to support bus accesses faster than ten to twenty megabytes per second and also due to the presently existing direct link of the bus's thruput to the memory access time. Other less significant aspects of the computer structure also reduce actual system thruput, which are known and need not be here described in detail. In present practice, therefore, a typical small or medium size computer seldom moves more than one to ten megabytes per second of thruput; most move substantially less than one megabyte with occasional bursts of larger amounts. This results in a communication bus "thru-put" efficiency of under five percent. The present invention increases that efficiency. With the present invention, efficiencies of fifty percent up to one hundred percent of the theoretical thruput for the communications bus may be achieved during normal operation.

As further background to the present invention, the patent to Cassarino, et. al. U.S. Pat. No. 3,997,896, granted Dec. 14, 1976, illustrates a data processing system in which computer elements of the system communicate over a common bus in an arrangement that could provide enhanced thruput and higher communication bus efficiency. In Cassarino's data processor system a plurality of computer resource units may transfer information along a common bus using a priority scheme in which the unit having the highest priority may transfer information during an asynchronously generated "bus transfer cycle". Logic circuits are provided for enabling a split bus cycle operation, in which a "master" unit requesting information from a "slave" unit during a first bus transfer cycle may receive such information from the slave unit via the bus during a later slave generated bus transfer cycle. Means are provided for enabling any other units to communicate over the common bus during the time interval between the first cycle and such later cycle during which the slave unit responds, thereby enabling at least two pairs of computer resource units to communicate with each other, respectively, in an interleaved manner. That "split bus cycle" form of operation thus enhances the efficiency or thruput of the communications bus, allowing intervening bus accesses by other computer sub-systems within the computer system, while the first sub-system is waiting for its response.

The architecture in Cassarino's computer system allows each master to access the communications bus for a complete "transfer cycle" as permits the master to maintain its access to the communications bus for several clock cycles, that is to hold onto the line for as long as it takes to effect the transfer of information. Further, the computer architecture in Cassarino precludes the possibility for the master and slave units that accessed the bus, awaiting completion of the request and acknowledgment from the slave, from communicating with other master or slave units during the intervening waiting period. Those aspects to the system architecture in Cassarino effectively limits the computer system's speed.

Accordingly, a principal object of the present invention is to speed up data processors by providing a computer system with a more highly efficient communications bus. A further object of the invention is to enhance operational effectiveness of a computer system by minimizing any standby or dwell periods in which the communications bus is being held by a subsystem and not being used for the transmission or reception of digital information, precluding access to other subsystems that may be waiting for access to the bus, and by limiting any access to the bus in normal operation to a fixed duration. And an additional object of the invention is to improve upon existing data processor systems by incorporation of a control means that effectively manages use of the communications bus to achieve greater utilization efficiency, allowing the digital "pipe-line" to be filled with information essentially at all times.

SUMMARY

In accordance with the foregoing objects and advantages, the invention is characterized by a processor system containing a communications bus and a plurality of computer resources, such as processors and memories, distributed along that bus to send and receive digital information. The communications bus contains address, data and control bus portions with the latter control bus portion containing a plurality of lines dedicated to transmission of information identifying the sender, receiver and, optionally, the source of the data amongst the computer resources. Each computer resource within the system includes a bus access controller or interface that effectively acts as the "traffic cop" to direct the electronic digital information originating in the associated computer resource within the data processor system onto and off of the bus in the most efficient manner possible with independent access to the data and address bus portions. The bus access controller organizes the application of data signals to the bus, including individual selection of one or more of the multiple bus portions over which digital information is to be sent, resolves multiple contentions for the same bus in accordance with a priority protocol, and limits each bus access to a predefined fixed interval ensuring that no single computer resource may routinely monopolize the bus.

The bus controller divides the communications bus between address and data bus portions so that such separate bus portion or channels may be used by different processor resource elements within the processor system, as needed, to send digital information simultaneously and independently along the address bus and data portions, permitting even data information to be sent over the address bus portion as needed to maintain the highest most efficient overall use of the bus. Thus, one processor resource element in the data processor may use the lines to send a "read" request over the address bus portion, while another processor resource in the system simultaneously sends a read response over the data bus portion, each of the resources simultaneously using separate portions of the control bus during such simultaneous bus access.

Collectively the bus controllers effectively arrange for the dense packing of "parcels" of electronic digital information supplied from any of the multiple computer resources within the computer system into predefined uniform sized time slots of limited duration, time slots that preferably, in accordance with a more detailed aspect to the invention, are of the duration of only one clock cycle of the system clock, commencing synchronously with such clock pulse, for transmission in a serial order in selected directions, to or fro, along the bus, packing the digital bit "parcels" onto the bus in such a manner as to minimize or entirely eliminate unused bus portions and/or time slots during routine operation.

In accordance with a more specific aspect to the present invention, the control bus, which is operated in tandem with the address and data bus, provides, via lines dedicated thereto, signals identifying from amongst the various computer resources in the computer system the sending source, the destination or intended recipient within the computer system, and, optionally, the identification of the source which originated the information, the writing source. The control bus contains separate leads, sometimes referred to as an identification bus, believed unique to the present invention, to carry the information identifying the source of a read and each controller associated with a respective resource contains a hard wired identification that is applied to such control lines.

With the foregoing structure and preferred features, the transmission of a read or a write operation involving separate computer sources is synchronous with the system clock and is limited thus to a single clock cycle in duration. An acknowledge is provided in a further clock cycle. Read responses are provided in a subsequent clock cycle that, typically, is not contiguous with the clock cycle in which the read request is made, thereby permitting the bus to be available for use during the intervening interval or time slots, while the read request is being processed by the addressed RAM memory, the latter of which typically exceeds the duration of a number of such time slots. The only relationship between the number of time slots thereby defined and the number of processor units and the like in the present system, as in a multiplex system, as is apparent, is purely coincidental.

Like the structure presented in the Cassarino patent, the present invention provides structure to permit one type of computer resource in the computer system, a slave unit, such as a memory, to respond to a read request from another type of resource, a master unit, such as a processor unit, at a later time, freeing the bus during the interim. Moreover, master and/or slave units are not restricted from participating in additional requests even while processing the first request.

An efficiency enhancing feature to the present invention requires that each bus transfer cycle, so to speak, in normal operation be limited or restricted to the duration of a single clock cycle of the system clock. Typically, and in computer systems in use known to the inventors, a bus transfer cycle takes more than a single system clock cycle. The Cassarino patent earlier discussed, U.S. Pat. No. 3,997,896, does not suggest departure from a normal bus transfer cycle duration and is silent on that aspect. No hint or mention as to the number of clock cycles required for the bus transfer cycle employed is given in Cassarino. Hence, one would not expect that the bus transfer cycle in the system shown in the Cassarino patent could be as short as a single clock cycle in duration. One expects that a feature as completing bus transfer cycles normally in but a single clock cycle, so important to efficiency as presently viewed, would have been identified with prominence in the Cassarino Patent, which deals with enhancing bus efficiency, had Cassarino discovered and found a way to introduce that feature of the present invention into Cassarino's disclosed computer system.

The foregoing and additional objects and advantages of the invention together with the structure characteristic thereof, which was only briefly summarized in the foregoing passages, and additional features and advantages, become more apparent to those skilled in the art upon reading the detailed description of a preferred embodiment of the invention, which follows in this specification and associated appendices, taken together with the illustrations thereof presented in the accompanying drawings.

BRIEF DESCRIPTION OF THE DRAWINGS

In the Drawings:

FIG. 3 illustrates in more detailed block diagram form a memory unit as employed as a computer resource in the system of FIG. 1;

FIG. 6 is a block diagram of the interface unit used in each of the processor unit of FIG. 2 and in the memory unit of FIG. 3;

FIGS. 7A, 7B and 8 illustrate in greater detail the address registers, the data registers, respectively, presented in the interface unit of FIG. 6;

FIGS. 9A and 9B together illustrates the auxiliary controller, earlier presented in FIG. 6 in greater detail;

FIG. 10 illustrates the access controller of FIG. 6 in greater detail; and

FIG. 12 is a timing chart illustrating operation of the preferred embodiment of the system bus under hypothetical conditions as assists understanding the operation of the preferred embodiment; and FIG. 13 is an additional timing chart also illustrating the operation of the bus under a second set of operating conditions.

DETAILED DESCRIPTION

Figure 1:
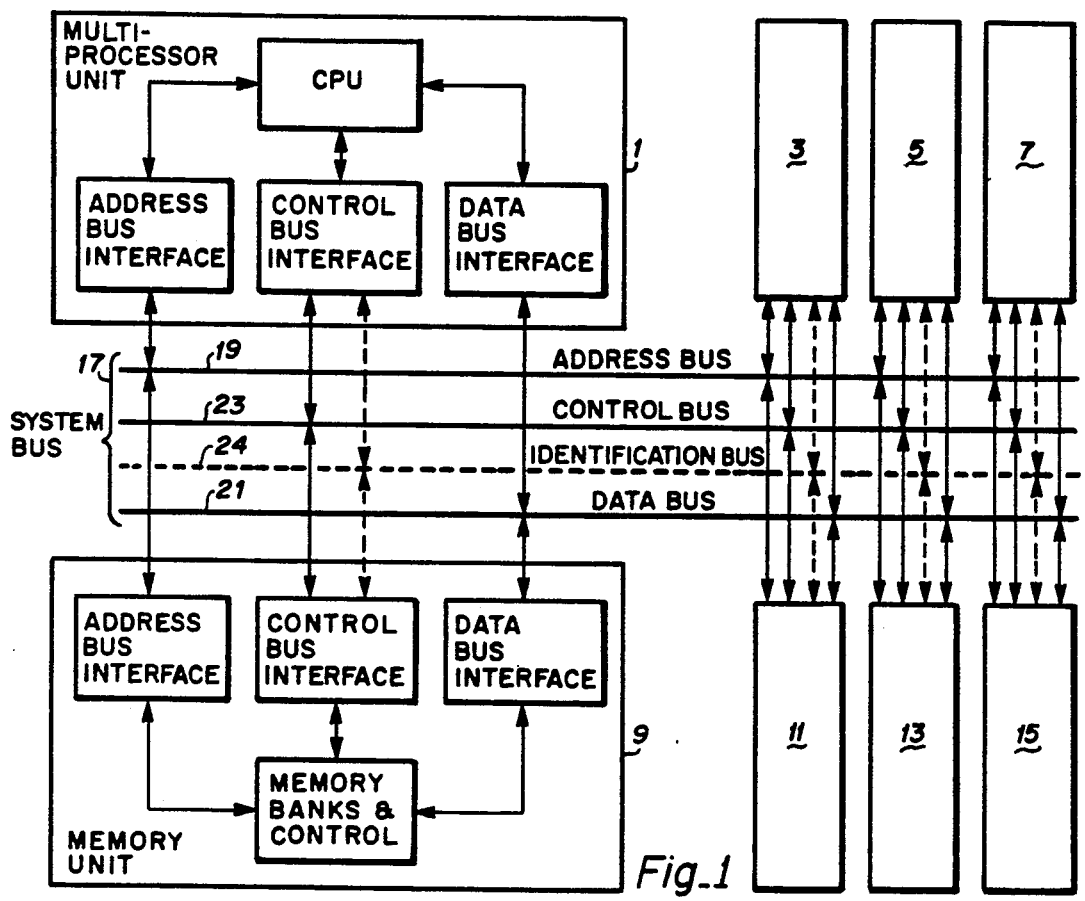
FIG. 1 is a block diagram of a computer system as contains the invention.

A preferred embodiment of the invention resides within the structure of a data processor or computer, as variously termed, as generally represented in the block diagram of FIG. 1, to which reference is made. As illustrated the data processor may contain four multiprocessor units, 1, 3, 5 and 7, treated as discrete modules, only one of which is illustrated in greater detail, each of which performs some specified computer processing function in a conventional manner in accordance with its respective program, through use of its central processing unit, designated CPU. Each processor unit may be called upon by another unit or itself may request another module to perform a specified function in the course of computer system operation. The system also contains four memory units, 9, 11, 13 and 15, only one of which is illustrated to greater detail containing memory banks and controls. Those memory units typically comprise standard semiconductor type memories capable of receiving an address and read command from a multi-processor unit, such as processor 1, acting upon the received command and, in due course, responding with a response to the requesting processor. Such memory unit is capable of receiving write commands, in which the central processor of one processor module, such as processor 1, directs address and data information to be selectively inserted within the memory of a selected one of the separate memory units.

The processor modules and the memory units are operatively coupled to and distributed along a common communication bus, 17, more particularly referred to as a system bus, as illustrated. System bus 17 is formed of four parts generally represented in the figure as an address bus portion, 19, a data bus portion, 21, a control bus portion, 23 and an identification bus portion, 24, the latter of which is believed to be unique to the present system. Other electrical paths typically extend between the units along the same route as the control bus, such as the leads to supply electrical power and ground circuit paths, but those paths are not generally regarded as a part of the communication bus and are not illustrated in the figure. The digital commands and data are distributed along this system bus as digital information usually internal of the computer system. The foregoing contrasts with other kinds of busses, referred to as input-/output busses that allow the computer to communicate with peripheral accessory equipment, such as video displays, telephone modems and the like.

Multi-processor 1, contains interface elements, functionally represented in the figure as an address bus interface, by means of which the CPU communicates with address bus 19; a control bus interface, by means of which the CPU communicates with control bus 23; and a data bus interface in which the CPU communicates with data bus 21. An important aspect to the present invention is the inclusion of identification bus, 24, represented by dash lines. The identification bus carries the code identifying the particular processor resource units that are taking certain action on the address, data and/or control bus. While that ID information is used for control purposes and although the associated electrical leads in the bus that are dedicated to that purpose may be regarded as an addition to or as part of the control bus. Considering the uniqueness of the ID leads in comparison to prior control bus structures and the prominent role they play, separate treatment for the ID leads should better assist in understanding the invention. For other purposes, those ID leads may be referred to and regarded as part of control bus 23. A like functional interface to the communication is included in the illustration of memory unit 9. In the figure the bi-directional flow of digital information is represented by the arrow headed leads between the respective interface in the units and the corresponding one of the three control busses.

Like interface units are included in the remaining multi-processor units, though not illustrated in detail, and like interface units are included in each of the remaining memory units, also not illustrated in FIG. 1. As those skilled in the art appreciate, the number of multi-processor units and memories may be increased or decreased in number from that shown in any alternative embodiment as need for greater or lessor numbers of modules dictates. Other computer type resources may also be connected to the bus for interactive communication with the afore described multi-processor and memory type computer resources. Typically, in practice each multi-processor unit and memory unit is formed upon a single printed circuit board. In turn, each printed circuit board contains a connector by means of which such board is electrically connected to an additional board containing the communications bus.

- Skilled persons also recognize that the foregoing illustration of FIG. 1, apart from ID bus 24, may be used to describe any computer system as most may have such a bus arrangement, including the VME computer, the multi-bus computer, the IBM PC computer, the IBM AT computer, the FutureBus computer, and any of the computers marketed by the DEC company. While the address bus and the data bus does not significantly vary in structure between the different computers, the control bus is a point of primary difference, since the control bus is the source of all timing and control of the address and data buses.

A practical embodiment of the system bus is described in due course in the paragraphs following the description of the more detailed block diagrams of one of the multi-processor boards, which follows, and one of the memory boards.

The Multi-processor Board

Figure 2:
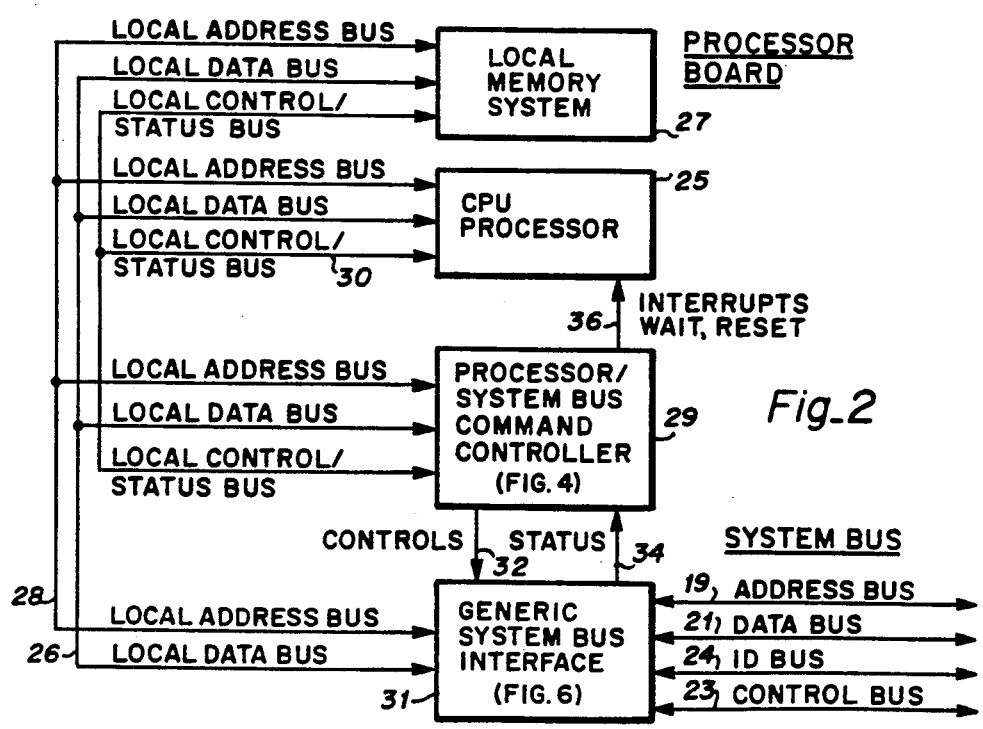
FIG. 2 illustrates in more detailed block diagram form a processor unit as employed as a computer resource in the computer system of FIG. 1.

A more detailed block diagram of a processor module is presented in FIG. 2, to which reference is made. As illustrated, the processor module contains a central processor, the CPU 25, a memory system, 27, a processor bus command controller, 29, and a bus interface, 31. Internal digital signal paths within the processor unit includes a local data bus, 26, connected in common to each of command controller 29, CPU 25, local memory system 27, and bus interface 31; and a local address bus, 28, also appropriately connected in common between those same component elements. In this sense "local" refers to the fact that the bus is provided for routing digital signals only on the circuit board or card containing the respective unit. Additionally, a local control and status bus, 30, is connected in common between the local memory system, the CPU and the command controller. The bus interface, which is under command of the processor bus command controller, serves as the interface between the communications bus and the processor board unit. The bus interface receives control signals from the command controller via the dedicated control bus, 32, and in turn the interface returns status information to that command controller via a dedicated status bus, 34. The bus command controller sends appropriate interrupts, wait and reset commands via the dedicated bus, 36, extending from the bus command controller to processor 25. As indicated by the cross reference to other drawing figures in the blocks representing command controller 29 and bus interface 31 more detailed figures of those elements are presented hereafter.

As those skilled in the art appreciate the processor unit's local memory system may consist of one or more conventional types of memory operated in a conventional manner in a computer, such as a random access memory, a static RAM memory, a dynamic RAM memory and read only memory, ROM, or the like. Processor bus command controller, 29, which is considered further in the figures which follow, controls bus interface 31. As is appreciated, the processor board unit structure depicted in FIG. 2 is identical in structure with the remaining processor board units in the system. As becomes apparent, the processor command controller differs in structure from the controller used in the memory boards, considered hereafter in greater detail, whereas the structure of the bus interface element remains the same in all of the resource units; the interface is essentially generic in structure. That feature allows for ease of design and manufacture. Such elements may ultimately be integrated into a single semiconductor chip.

As further illustrated in FIG. 2, the elements for connection to the respective communications bus portions, namely, data bus 21, the address bus 19, control bus 23 and ID bus 24 are represented in the lower right in the figure. Those paths are appropriately labeled with the mnemonic identification representing the particular function served by the line in the system bus. The mnemonics are recognized by those skilled in the art with certain exceptions for those that are unique to the present system. All such mnemonics and the leads forming the system bus are described in greater detail later in this specification and are not further discussed at this time. Additionally, from FIG. 7 on, arabic numbers located adjacent the lead indicate the number of actual leads in the particular cable or data path. As by example, the address lead or path with the number 32 indicated actually contains thirty-two lines and, hence, is capable of carrying a thirty-two bit parallel digital word.

As those skilled in the art appreciate the processor operates in a conventional manner and is merely exemplary of a processor which is operative within this system. Thus, for example, other forms of processors may be used in which only one or two memory systems are incorporated. Further, an input/output bus as may be of the type that provides for RS232 serial transmission may be appropriately coupled through an input/output interface to the CPU. Other forms of processors may be used which do not contain such an input/output manager or input/output data control system. Various combinations, such as alternative forms of processors, may be distributed along the system bus in a single data processor system. In the present context the processor unit may issue read commands and write commands to the remote memory unit and issue acknowledgements via the communications bus; the memory unit may issue and send command and acknowledgement to the processor via the bus.

The processor is a known combination of logic, which includes a sequencer to generate new addresses, a set of registers to store intermediate information, a computational unit to manipulate data in certain ways, and an execution unit to interpret instructions and control operations. A typical central-processing-unit, CPU, may be of the form of a single IC microprocessor, such as the Intel 80960CA RISC chip, which takes instructions and data from memory and from those executes a stored program to perform a specific or general function. The designation RISC, meaning reduced instruction set computer, implies that many instructions can each be executed in only one clock period.

At power up, typically, a local read-only-memory, ROM, is accessed by the CPU using the local address, data, and control buses, and used to provide the instructions to test and initialize the processor and other elements on the circuit board. After that sequence, a larger program may be loaded from some I/O device into a local random-access-memory, RAM, associated with the processor, and the processor then executes those instructions.

Other boards are next queried and tested using the system bus, which is external to the processor board. Then the final application programs typically are loaded into local RAM, and executed, using all the system resources as necessary. This final application program could involve moving data between system memory and I/O processors, sending and receiving the data to and from other remote systems. Other processors within the system might manipulate the data into other forms, or calculate more data from the given values.

The processor accesses the system bus through use of an interface. The interface takes address, data, and control signals to command the system bus to provide the needed resources. The command controller, element 29 in FIG. 2, and further detailed in FIG. 4, serves as the command and status link between the system bus interface and the processor. By use of the system bus, the computer system resources move, store and process data, and activate remote mechanical and electrical devices, in accordance with intelligence built into the programs. The end result can be nearly anything conceivable by the mind of men or other machines.

The Memory Board

A memory board unit is further illustrated in block diagram form in FIG. 3. The memory unit contains a memory master controller, 33, a local memory system, 35, which may comprise one or more banks of RAM memory and other conventional memory control structure, the details of which are not material to understanding the present invention, and a bus interface, 37. Suitably, a local data bus, 38, and a local address bus, 40, are each connected in parallel between each of the functional components. Appropriate control bus paths, 42 and 44, extend from master controller, 33, to local memory system 35 and bus interface 37, respectively.

Each of the local memory systems and bus interface provide appropriate status information to the memory master controller via dedicated electrical paths 46 and 48, respectively. And, a local identification bus 50 is connected between memory system 35 and master controller 33, and another like data path, 52, is connected for coupling identification information between the master controller and bus interface 37. As indicated by the reference to other figures in the drawings additional illustration and description of master controller 33 and bus interface 37 is presented hereafter.

In FIG. 3 the digital paths are shown as address bus 19, data bus 21, control bus 23 and identification bus 24. The paths are also identified in the figure with a mnemonic. The system memory board provides fast random access memory in amounts larger than can fit easily on a processor board. A typical present generation board might contain sixteen megabytes of dynamic RAM, composed of four blocks of four megabytes of data each. Each block actually might be 44 bits wide, by one million words deep. With that number of bits each stored word is thirty-two bits of data, seven bits of checkbits, three bits of writer ID, and two bits for spare or other purpose.

Each block of memory may, for example, be compose of eleven integrated circuits, ICs, each four bits wide, by one million words deep. Thus, each IC has 4,000,000 bits of storage capability. These dynamic RAM ICs as is known are controlled by special controller chips to allow read and write access of any forty-four bit word by random access. The controller also takes care of all the routine tasks associated with the RAM ICs, such as the automatic refresh of the stored data. The composition and control of the local memory system is well understood, and the details thereof are not pertinent to the subject invention. All of the memory ICs and their control are depicted in the single block in FIG. 3, as element 35.

The interface between the memory system and the system bus is shown in FIG. 3 as a master controller, 33, and a bus interface, 37. The bus interface is identical to that used by the processor board and is illustrated more fully in FIG. 6, and is discussed in complete detail later.

Master controller 33 provides the link between bus interface 37 and the memory system, such as commanding a system bus read response access, when read data is available from the memory. Each system bus command or inquiry may require the command controller to cause an intricate, but limited, set of operations to be undertaken.

The master controller may take the form of a processor chip and associated hardware, or, more usually, a set of programmed logic devices, such as PALs, which form a state machine. The end result in any case is a sequence of commands and status, flowing between the memory subsystem, and the bus interface. The programmed sequences may also be altered, by data inputs from other processors, so that the master controller may change operating modes under external control. The memory master controller is illustrated in greater detail in FIG. 5, and is explained at greater length later in connection with that figure.

Modern computers are typically modular in structure, as permits easy assembly and repair. Thus, in the practical embodiment of the invention each of the processor modules and memory modules, earlier described, are formed on separate printed circuit boards or "cards" containing appropriate semiconductor chips and an "end" electrical connector, not illustrated in the figures. Through that end connector the card may be inserted into and supported by a mating female connector or "slot" located on another circuit board containing the communication bus and other elements as might be referred to as a "mother board" or, in larger more main frame type computers, as in the present type, as a "back plane". The electrical circuits on the card extend through the mating connectors to the appropriate circuits on the back plane. In turn, the back plane circuit board is supported within a cabinet or rack. The less skilled reader recognizes this "plug together" modular structural technique as appears in the structure of the personal computers currently being marketed. A practical embodiment of the present invention preferably, uses such "plug together" structure; the processor and memory modules are physically located on separate boards that are plugged into the backplane containing the system bus.

Bus Description

At this juncture in this description, the details of the communication bus used in a practical embodiment may be next considered. In referring to electrical leads or lines a reference is sometimes given to the function that the line assists to serve. In appearance electrical leads generally appear alike in structure and comprise lengths of metal copper strips or cladding generally formed on, attached to or incorporated within a printed circuit board or exist as the insulated electrical leads in a multi-wire cable. By making reference to the kind and type of signals applied to individual lines, the line referenced is given "character"; a greater meaning is given to the individual copper wires that assists one to understand the operation of the invention and its structure and the relationship of the individual elements of the invention. In that context thus the meaning given to the "read acknowledge" line is that the line is dedicated to the function of serving as the conduit to which a read acknowledge signal is applied by the modules connected to that line. The line nonetheless retains its essential physical appearance as an ignominious stripe of copper or other electrically conductive material.

A practical embodiment of a system bus according to the invention contains 294 electrical leads as conveniently mates with a now standard 3 by 98 pin electrical connector and allows spares. As those skilled in the art recognize the physical bus structure is for the most part conventional. Particular attention should be paid to the mnemonic reference as those references are correlated to the additional drawing figures later described.

| Lead application | Number | Mnemonic representation |
|---|---|---|
| Address Bus | 32 lines | A0 through A31 |
| Data Bus | 32 lines | D0 through D31 |
| Control Bus | | |
| Address Parity & Address Valid | 2 lines | ADP, ADV |
| Data Syndrome & Data Valid | 8 lines | S0–S6, DAV |
| System Clocks | 8 lines | C10, C11, C20, C21, C30, C31, C40 & C41 |
| Bus Lock, Clear Bus Lock, & System Resets | 7 lines | BLK, CBL, SOI, RST, WRN, PRP, & SRS |
| Bus Requests | 24 lines | BA0–BA7, BD0–BD7, & BW0–BW7 |
| Read/Write, Interrupt & Bus Error | 3 lines | WRT, ITS, & BER |
| Acknowledges | 3 lines | DAK, RAK, NAK |
| Sequence Controls | 2 lines | NXT, CAN |

-continued

| Lead application | Number | Mnemonic representation |
|---|---|---|
| Supervisory Control | 1 line | SUP |
| General Purpose I/O Interface Identification | 108 lines | No designation |
| Slot ID Number | 3 lines | SLT0–SLT2 |
| Sender Requester ID | 3 lines | SID0–SID2 |
| Destination ID | 3 lines | DID0–DID2 |
| Writer (Original Source) | 3 lines | WID0–WID2 |
| Power Supply | | |
| Power +5 Volts | 18 lines | VCC |
| Ground Return | 18 lines | GND |
| Unused Spares | 16 lines | (None) |

As those skilled in the art appreciate the foregoing arrangement is exemplary; alternative embodiments of the invention may use different numbers of leads. As example, those leads identified as S0–S6 need not be included in every embodiment, and the functions served by those leads may be eliminated. Further, the foregoing lines add in total to 278 leads. Hence 16 additional leads are included in the practical form of the bus and connector as a practical measure at no extra cost and are treated as spare leads. In alternative practical embodiments, which do not contain the functions specified by leads S0–S6, the lead, nonetheless, preferably is retained as an additional spare.

The next to last three groups of lines, the Sender ID Number, Destination ID and Writer ID, is recognized as being unique to the present invention. The Slot ID Number lines, though not necessarily unique to the improved bus system, are not simple parallel lines common to all boards as are all the other lines, but are hard wired and are unique for each board in the system to give each module or board a unique 3 bit digital code, represented by voltage and ground potentials.

The program of operation of the system is easily defined. When CPU 25 in FIG. 2 determines that an operation over the bus is required to access either another processor board or a memory unit, such as illustrated in FIG. 3, the CPU's program relays that request via the local busses to processor command controller 29. The command controller in turn applies that information to interface 31.

The interface receives the command request from the associated processor. Next a condition check is made. The interface determines whether the kind of operation requires the address bus only, as for a read operation of a remote memory, or a data bus only as where the interface is associated with a memory that is ready to respond with information and issue a read response, or both the data and address bus, as for a write operation, writing to a remote memory.

In response thereto the interface initiates a bus access request signal for the appropriate bus portion or bus portions, as does any other interface associated with the other computer resources in the system that needs bus access.

Next in a round robin type bus contention arrangement, described in detail hereafter, interface 31 checks for its priority in respect of the bus or busses needed for the operation according to the stored protocol describing the priority. A key requirement in that priority protocol is whether the requesting unit currently has access to the bus. If, electronically answered in the affirmative, the requesting interface is given a lower priority than otherwise would be the case. If the interface does not have the highest priority, a "no" answer, the interface waits, holding its request active until the next system clock cycle, whereupon it repeats the priority check. If the only purpose of the bus access is to perform a read response, then only the data bus is required and in that situation the priority is determined against other units similarly seeking data bus access.

If the interfaces priority places it at the head of the list, a "yes" answer, the information stored is sent by the interface over the appropriate bus, even to sending data over the address bus if the data bus is unavailable and the address bus is available, although that is not the primary intention in this example, sending that information, commencing in synchronism with the start of the next system clock cycle and over the duration of that clock cycle. Such clock signals, it is recalled are present on the control bus. By means of clock lines on the control bus the clock signal is available to all interfaces in the computer system. If the command processor commands the associated interface to again access the bus, the interface cannot successfully regain immediate access, unless no other interfaces are requesting access, since the priority check step results in giving an interface that just completed bus access a lower priority. The interface then waits with its request active until the following system clock cycle and the priority check is repeated.

The cumulative effect of all of the interfaces of the various processor resources simultaneously contending for the bus is that no less than one of such processor resources gains access and sends the appropriate digital information; at most two processor resources may gain access. In the later event, for example, a memory type processor resource gains access to the data bus to issue a read response. Another processor resource seeking access to do a read command simultaneously accesses the address bus and sends the read command.

The foregoing describes the basic program for the computer system and the communications bus. Although the foregoing steps are described as discrete in nature, they are accomplished quickly through the use of dedicated logic circuits as used in a specific embodiment, which is detailed at length later in this specification.

In the foregoing description, the processor initiating a read request of a memory is sometimes referred to as a master; the memory which is to provide response, as a slave. Freeing the bus between the read request and the read response and limiting each access to a predefined fixed length interval is key to enhanced efficiency. Subsequent to the read request, the slave performs the internal read access, and then the slave must contend for the bus, in the same manner as the master. When the slave has control of the bus it places the read data upon the bus, a read response, and signals the original requesting master to latch the read data to finish the operation. This process is also concluded in one system clock cycle. Hence, the bus is not tied up for the long memory access, but only for one clock cycle for the original address and read request, and then for another single clock cycle for the later data response. During the time interval between the request and the response other processor resources may access the bus.

Further, the two parts of the bus usage are each separate and non-overlapping, either in time or in space. That is, the first bus usage involved the address portion of the bus, while the second access involved the data part of the bus. The bus in effect has two halves: One half is the address bus, and the other half is the data bus. Each half is used independently. Thus, two separate accesses could occur on the bus during any given period. For example, one processor could be receiving read data from a slave at the same instant another processor is sending an address to a slave for a new read access. Both operations can occur on the same bus in the same clock cycle. Furthermore, this could even involve the same master and/or the same slave. That is, a master could be sending an address for the next read in the same cycle in which it is receiving read data from the previous operation. Likewise, a slave can be receiving an address for the next read in the same cycle in which it is sending the read data in response to a prior read access and request. Simultaneous, independent usage of the data bus for one purpose while the address bus is used for a different purpose further enhances efficiency.

Thus, a read access uses only one total bus cycle, but in two separate portions. A write access uses only one total bus cycle, but in one complete piece, using both halves of the bus, since the address and write data can be sent in one forty nanosecond period. Then the master is totally done with the write operation, while subsequently, the slave may be tied up for some period, typically several hundred nanoseconds, while completing the write.

In order that one master, among many, knows which read data being placed on the bus by the various slaves is intended for it, a mechanism exists to allow each word of read data to be latched into the proper master that earlier requested that data. The preferred computer system necessarily includes two sets of encoded triplet lines, one set for signaling the bus ID of the card presently requesting read access, and one set for latching read data into the specific requesting card. For that purpose the bus contains a set of three lines, to encode one of eight possible IDs in binary form, corresponding to eight boards in the exemplary computer system. If one wanted to incorporate additional boards within the computer system, one could use four lines to encode sixteen IDs. Only one code on the ID lines can be active at one time. This ID line tells all processor resources on the bus which resource is presently in charge of the bus.

The second set of three lines is provided, encoding eight IDs, which is used to control which processor resource, or board, is requested to latch read data. That is, each code on these lines controls the read latch on the one board whose assigned identification corresponds to that code.

When a master places a read request upon the bus, it also causes its ID code to become active on the first set of lines. When a slave observes that it is being requested to perform a read, the slave is required to latch the state of the ID lines. Hence, later the slave will know to which master to send the corresponding read data. After the slave has performed its bus access request and has the read data available, and gains control of the bus, the slave causes the requester's ID code to be active on the second set of lines identifying the original read requester. Thus, the slave latches the read data into the master which requested the data.

Given the preceding objects and advantages of the invention, the general description and the basic program of operation, those skilled in the art are able to determine the nature of the specific structure and programing details for the structure presented in block diagram form in the preceding FIGS. 1, 2 and 3. Those skilled readers may, thus, refer directly to the latter portions of this specification that describes the mode of operation of a preferred embodiment and the appended charts providing illustrative cases in the operation of the system. Others, however, may wish greater familiarity with the somewhat more complex details of the preferred embodiment and additional features, which is illustrated in greater detail in the block diagrams of figures of FIGS. 4 through 11, Appendices 1 through 4, and to the additional description of that structure that follows immediately in this specification.

Figure 4:
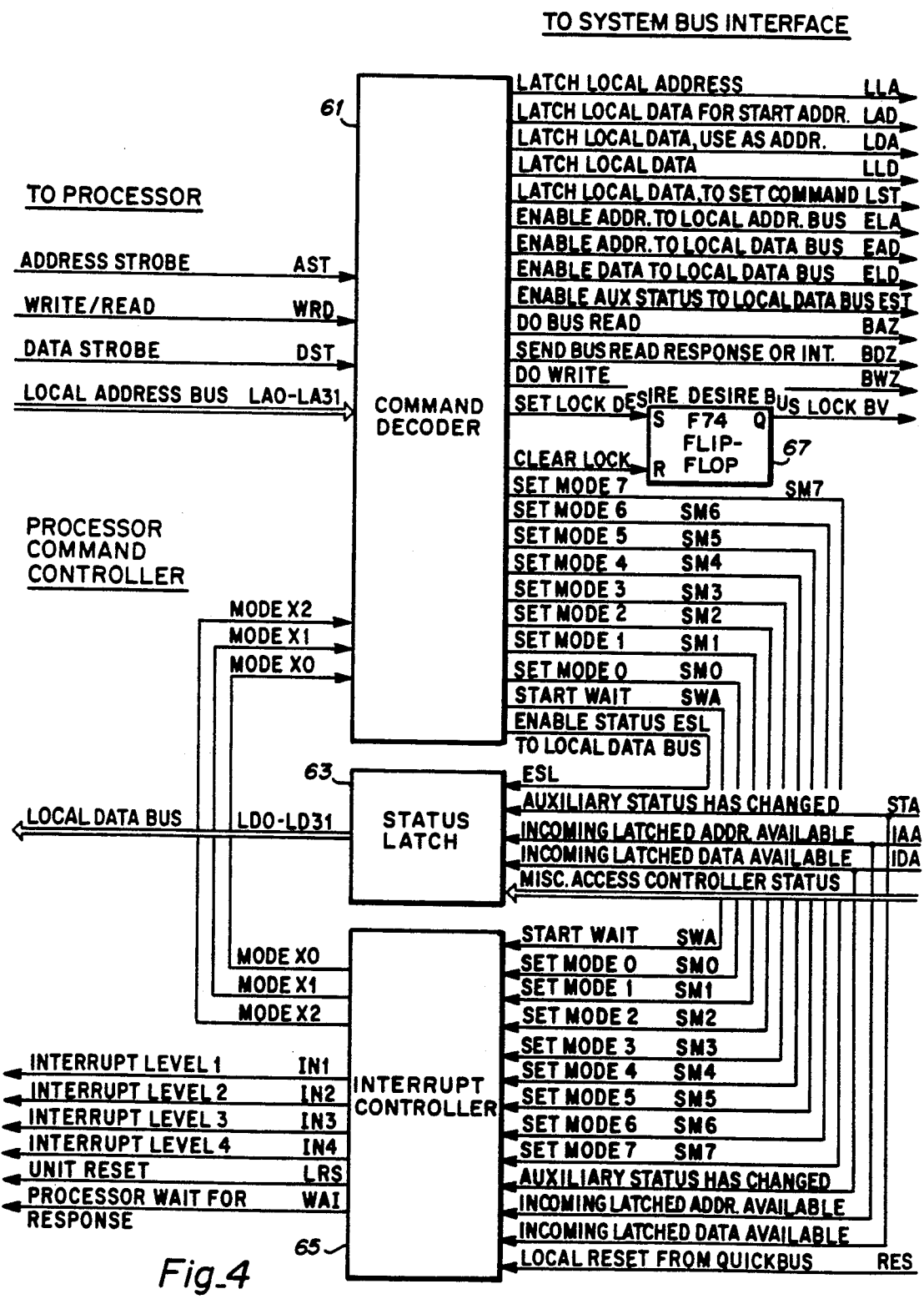
FIG. 4 illustrates the processor command controller used in the processor unit of FIG. 2.

A more detailed block diagram of the command controller, earlier presented as element 29 in the Processor Board of FIG. 2, is presented in FIG. 4. A like detailed block diagram of the memory/master controller, 33, in the memory board of FIG. 3, is presented in FIG. 5.

Figure 11:
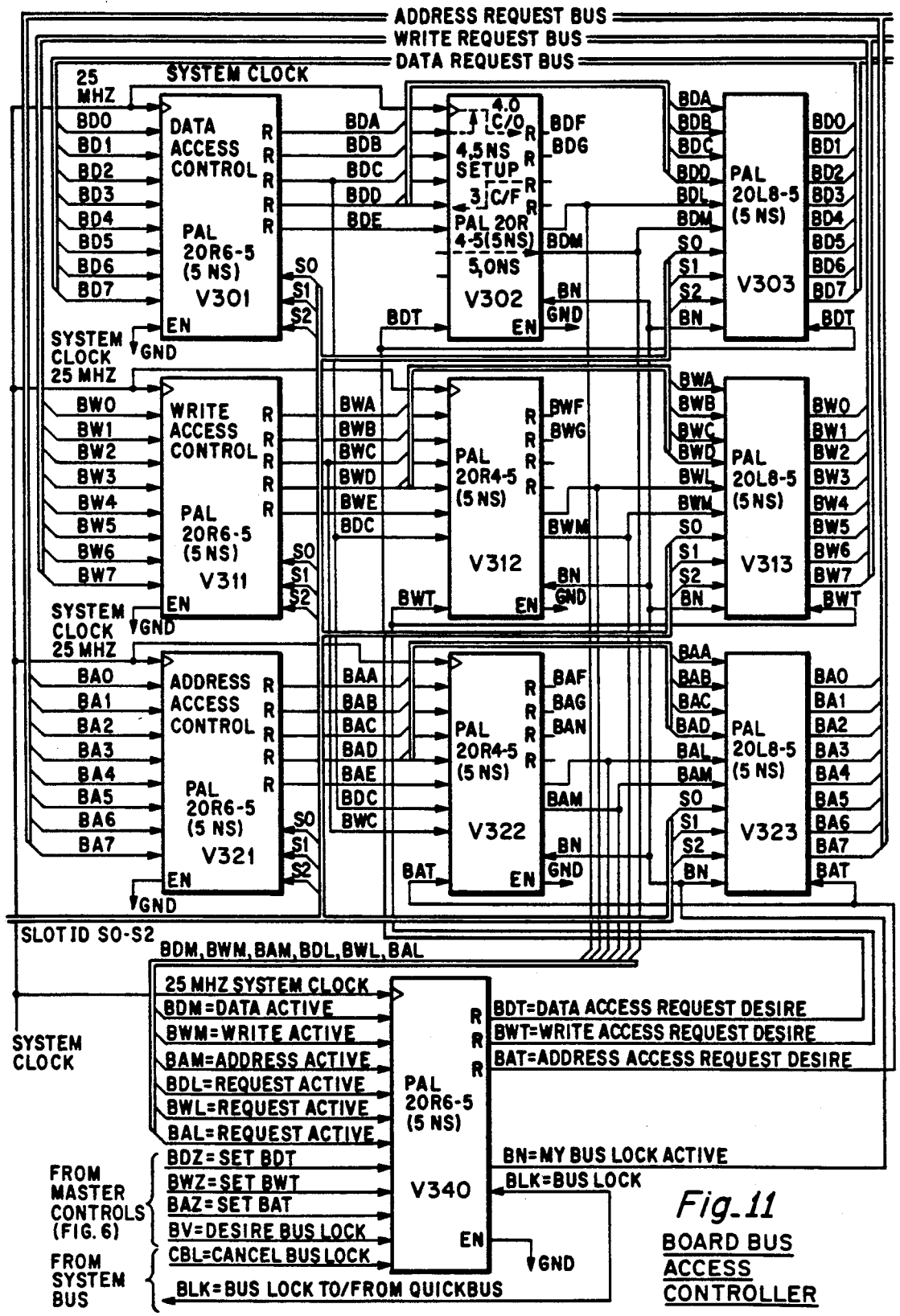
FIG. 11 is a more detailed practical embodiment of that element.

It is recalled that each of the processor unit and the memory unit earlier described contains, in addition to the respective controller, the interface, represented as element 31 in FIG. 2 and as element 37 in FIG. 3. A more detailed block diagram of the interface is presented in FIG. 6. In turn, FIGS. 7, 8, 9, and 10 are more detailed block diagrams of the elements that form the interface depicted in FIG. 6. FIG. 11 is a still more detailed block diagram of the access controller element and fully identifies all the details of that element presented in more general form in FIG. 10.

Turning again to FIG. 4, the processor command controller, illustrated in block diagram, contains a command decoder, 61, which decodes commands from the main processor, not illustrated in the figure, as applied by the leads AST, WRD, DST and LAY, mnemonically identified, shown to the left of the element in the figure, representing the address strobe, write/read, data strobe and local address bus, respectively; a status latch, 63, which reflects the status of the various inputs, ESL, STA, IAA, IDA, and MISC onto the local data bus, LDY, an example of which is the "Main Status Word" presented in Appendix 1; and interrupt controller, 65, responsible for receiving signals as to various computer interrupts inputted via the electronic paths shown to the right of the block, SWA through RES and issuing appropriate interrupts and commands to the CPU in the processor unit via appropriate leads indicated to the left of the element, IN1 through IN4, LRS and WAI, as well as providing appropriate operating mode information to the decoder 61 via the X0 to X2 leads. In general in the figure, leads to the left side of the blocks are coupled operatively to the main CPU of the associated board; those leads to the right are connected to the interface, presented in FIG. 6.

The CPU provides the read or write command to command decoder 61 via lead WRD and presents the address from which to read or write via local address bus LAY, the latter of which comprises the 32 leads LA0 through LA31, the same as in the main communication bus. Either of the address or data information placed on the appropriate lines is entered upon the CPU's application of the appropriate "strobe", the address strobe on path AST and the data strobe on path DST.

The appropriate decoder outputs represented by the various data paths that extend to the associated bus interface, as later discussed in connection with FIG. 6, may be summarized as follows: The "latch" outputs are represented as Latch the local address, LLA, the local data for start address, LAD, the local data which is to be used as an address, LDA, the local data, LLD, the local data to be used to st the commands, LST. The "Enable" outputs are represented as enable the address to the local address bus, ELA, the address to the local data bus, EAD, the data to the local data bus, ELD, and the auxiliary status to the local data bus, EST. The read and write operations are represented as follows: Do a communications bus read, BAZ, send a communications bus read response or an interrupt, BDZ, do a bus write, BWZ.

Outputs from command decoder 61 include any of various mode sets, from SM0, representing a command to set the associated interrupt controller to mode 0, through SM7, representing a command to set that controller to mode 7; and associated command paths SWA which command a "wait" for interrupt controller 65, that sends the wait command to the CPU, which causes it to enter a state of inactivity until the wait command is removed. The eight modes represent interrupt operational states, selecting different interrupt levels and combinations to be assigned as responses to the inputs SWA, STA, IAA, IDA and RES.

Given the mode information at its input, interrupt controller 65 sets the mode for all future actions, and outputs the corresponding information in three digit binary form over the three leads Mode X0, Mode X1 and Mode X2 to the command decoder, as may thus represent in binary form any of the eight possible mode input commands from the decoder.

As earlier generally described, the preferred embodiment of the invention includes a feature in which a particular processor module's operation is so important that the programmer would like the operation completed with but a single acquisition of the bus, even though doing so detracts from normal high efficiency bus operation. For those non-routine operations, such as READ-MODIFY-WRITE, the computer system includes a feature permitting the module to hold onto the bus, referred to as a "bus lock". A flip-flop, 67, is included as a part of the bus lock feature. Should decoder 61 issue a voltage high at lead SLD commanding "set bus lock" desire to the S input of flip-flop 67, the Q output issues a request via lead BV to the interface, which is discussed in greater detail in connection with the interface element of FIG. 6 hereafter. Correspondingly, a decoded command to clear the lock is provided by an appropriate output at CLD, which is applied to the reset input of flip-flop 67 and, accordingly changes the signal on lead BV.

Interrupt controller 65 provides the appropriate interrupt level output to the associated CPU over the local control bus with the interrupt level presented at the selected one of the leads IN1, interrupt level 1, IN2, interrupt level 2, IN3, level 3 and IN4, representing level 4. As is typical in computer systems the particular priority for CPU operation is set by the programmer who prescribes which amongst the various CPU processing operations is the most important and prescribes thus the appropriate interrupt levels.

Over path WAI the interrupt controller signals to the associated CPU over the local control bus to wait for a response. With the control lead RES from the communications bus activated, representing a command to reset the system, initialize the system, as would occur when some error or electronic glitch is detected as might provide erroneous result, and, also on initial start up of the system, the interrupt controller relays that reset by output on lead LRS to the local control bus to the associated CPU.

Command controller 29 of FIG. 4, earlier generally illustrated in FIG. 2, provides the interface between the processor, which uses local address, data and control buses, and the system bus interface, which is a generic interface configuration that is identical on each board that interfaces to the system bus. Basically, the primary read and write commands from the processor, and the interrupt and wait commands from the bus interface flow through the command controller. Additionally, the controller stores status and interrupt modes and aids synchronization.

Command decoder 61 in FIG. 4 is formed of an array of programmed gates, such as one or more ROMs or PALs, which outputs various commands as required by the address and control inputs. It contains thirty-two local address bus inputs, three control inputs, and three mode controls.

The command decoder decodes those inputs and activates one or more of the twenty-four output lines as required. As an example, any address form 0 to 0FE,FFFF might refer to local on-board memory. Addresses from 0FF,0000 to FF,FFF might be special I/O instructions. Addresses from 100,0000 to 0FFFF,FFFF might refer to external memory, and would thus require use of the system bus. With a combination of a write control input, and an address in the external range the command decoder would thus activate the "latch local address" line, the "latch local data" line and the "start system bus write" line. The activated lines thus cause the associated subsystems to perform the tasks necessary to perform a write of local data to the address specified onto the system bus.

Figure 5:
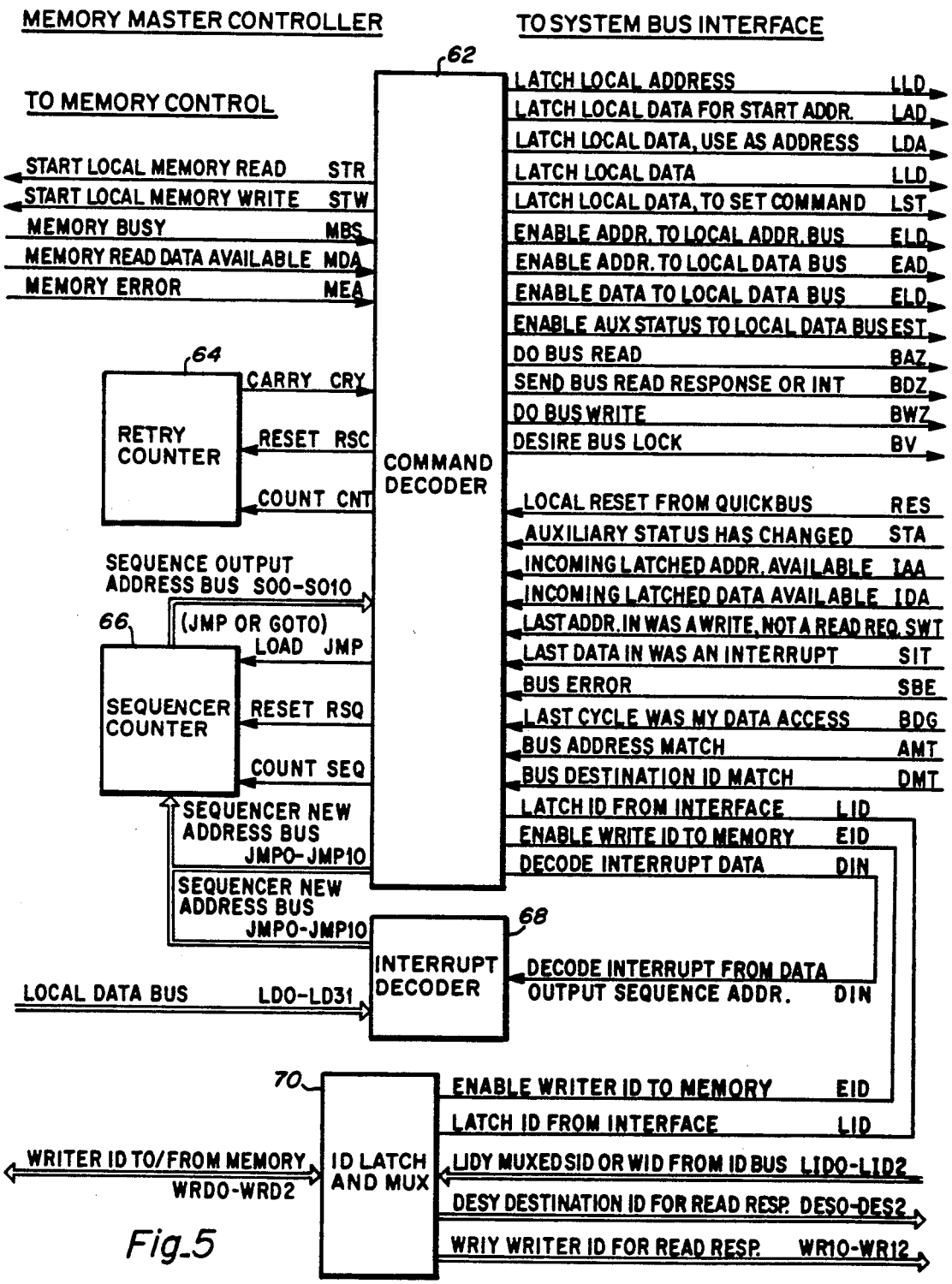
FIG. 5 illustrates the memory unit master controller used in the memory unit of FIG. 3.

The corresponding controller for the memory board module, the memory master controller, is illustrated in block diagram form in greater detail in FIG. 5, to which reference is made. As illustrated, this controller includes a command decoder, 62, a retry counter, 64, a sequence counter, 66, an interrupt decoder, 68, and an identification latch and multiplexer, 70. Command decoder, 62, receives appropriate information from the local memory control system, element 35 in FIG. 3, via leads MBS, representing memory busy, MDA, representing memory read data available, and MER, representing detection of memory error. The decoder also provides appropriate command signals to such memory control system via lead STR, start local memory read, and STW, start a local memory write. As indicated, to the upper right in the figure a series of leads, LLA, through BV, are connected to the associated bus interface, which interface element is discussed in greater detail hereafter. The foregoing leads LLA, LAD, LDA, LLD, LST, ELA, EAD, ELD, EST, BAZ, BDZ, BWZ and BV have the same purpose described in connection with FIG. 4 preceding, which need not be repeated. Various inputs from the bus interface are provided to the decoder via leads RES through DMT, illustrated to the lower right of element 62.

Command decoder, 62, also provides outputs LID, EID, and DIN, illustrated at the lower right hand side of the decoder. A signal output at LID, representing a command to latch the multiplexed sender or writer identification, LIDY, from the interface portion and the EID, representing a command to enable the identification of the writer into memory, are coupled to like inputs of an identification latch and multiplexer unit, 70. ID latch and MUX 70 also inputs via LIDY, which comprises the lines LID0 through LID2, representing the identification lines, to apply either multiplexed sender identification or writer identification from the identification bus, as is provided through the interface, later discussed. Bilateral transfer of writer identification to or from memory is enabled via path WRDY; and outputs at DESY and WRIY to the interface provide respectively paths for the destination identification, ID, for read responses and WRIY, the writer identification, ID, for a read response where Y represents any of the numbers 0 through 2 representing any of the three leads comprising this digital information pass, respectively.

From the associated interface, command decoder 62 inputs any of the control signals as represented by SWT, the last address inputted was a write request, not a read request; SIT, the last data input contains an interrupt; SBE, there is a bus error; BDG, the last cycle was the units data access, AMT, an address match to the present module was made with the address received from the communications bus; and DMT, an address match was made with the destination ID obtained from the communications bus control bus portion. Command decoder 62 via path DIN signals the presence of decode interrupt data to interrupt decoder 68 via the latter unit's local data inputs, labeled LD0-LD31.

The local data bus, LDY, comprising leads LD0 through LD31, is applied to an input of interrupt decoder 68. In turn, interrupt decoder provides appropriate outputs via leads JMP0 though JMP10 "sequencer new address bus" to sequence counter 66. Like outputs are provided to the sequencer counter from command decoder 62; that command decoder also applies outputs LOADJMP, RSQ, reset, and SEQ, count, and provides sequenced output addresses via bus comprising SQ0 through SQ10 to the corresponding input of the command decoder.

Retry counter, 64, receives inputs at RSC, reset, and CNT, count, from command decoder 62, to provide appropriate output at CRY, carry, as input to command decoder 62.

Command decoder 62 in FIG. 5 is another array of programmed gates, such as ROMs or PALs, which outputs various commands in accordance with the address and control inputs. It contains eleven address inputs, SQ0-SQ10, and fourteen control inputs. The decoder decodes those inputs and activates one or more of the twenty-three output control lines as required. Additionally, it contains eleven address outputs, JMP0-JMP10, which provide a break in a normal flow of operations.

The master controller performs as follows. An address SQ0-SQ10 flows from sequence counter 66 to command decoder 62. The command decoder interprets the address as an instruction, along with some of the control inputs and activates certain of the command decoder outputs. One of those outputs, SEQ, causes the sequencer counter to increment, thus producing another address for the command decoder to interpret. For some combinations of inputs the command decoder activates the jump line, JMP, along with the new address line outputs, thus causing the counter to load the new address. Then the command decoder decodes the new address and, again, increments the counter. An exemplary program is presented in Appendix 2.

Basically, the binary sequence counter, 66, increases monotonically, at every step, except where commanded to load a new address. This may be considered to be a stored program, causing this "state" machine to execute stored instructions per the addresses flowing from sequencer counter 66.

It is noted that new addresses may also flow from interrupt decoder, 68, instead of from the command decoder, but still under control of the command decoder. This occurs when an external subsystem has sent an interrupt to the memory board: The system bus interface stores the interrupt in the data register, and signals the command decoder of the pending interrupt. The command decoder then loads the interrupt processing routine start address into the sequencer and starts through the program. At some point early in the program that data containing the interrupt information flows to interrupt decoder, 68, which is also commanded to decode the interrupt information, just as the command decoder decodes the sequencer address.

The interrupt decoder then sends the decoded interrupt results in the form of a new address to the sequencer counter, to be loaded, to begin the specific program required by that interrupt.

In situations where the command decoder needs to repeat the same operation a number of times retry counter 64 is used to indicate when the end of the sequence has occurred. Such a retry sequence occurs, for example, when a read response does not receive an acknowledge signal. Thus, the retry counter is reset at the beginning of a sequence, and is incremented by the command decoder at various points in the sequence. When the retry counter reaches its terminal count the carry output, CRY, signals the command decoder to terminate the sequence.

Reference is made to FIG. 6 presenting the bus interface in greater detail in block diagram form. In this block diagram the mnemonic representation of the local and communications bus paths identified in the prior figures are similarly labeled. The bus interface is identical in structure irrespective of whether or not the element is applied as part of the processor command controller of FIG. 4 and whether it is applied as part of the memory master controller of FIG. 5. In considering the operation of the interface, one should associate the appropriate one of the controllers therewith.

The bus interface contains four major parts including the address registers, 71, the data registers, 73, the auxiliary controller, 75, and the access controller, 77. Each of these major elements is illustrated in greater detail in the appropriate drawing figures represented in the blocks. The data paths and leads illustrated to the left of the functional blocks, 71 through 77, represent appropriate wiring and data paths located on the printed circuit board or card containing the associated command controller. The wiring and data paths to the right of those functional blocks represent the side of the circuit board which extends to the communications bus, as applied through a circuit board end electrical connector, earlier discussed.

From the appropriate associated command controller the address registers receive appropriate input via LLA, representing a command to latch the local address as may be presented on the local address bus, LAY, the latter comprising leads LA0 through LA31, LAD, representing an instruction to latch the local data for use as a unit start address, which data is presented to the register by local data bus, LDY, the latter comprising leads LD0 through LD31, LDA latch the local data for use as a working address, ELA, enable latched incoming address to local address bus from the communications bus, and EAD, representing an instruction to enable the latched address to the local data bus. The address register has bilateral bus paths to enable local on board communication with the local address bus via path LAY and the local data bus via path LDY. IAA provides output status to the associated command controller when an incoming latched address is available. To the right hand side of the figure the register has like connections to the communications bus for the address lines, A0 through A31, an address parity bit, ADP, and ADV, an address valid indicator to the appropriate control bus portion. Through appropriate circuits in the register either the content from the local data bus or the local address bus may be applied to the communications bus address lines. Conversely, the content of the communications bus address lines may be applied to the local address bus or local data bus.

Data register 73, as illustrated, is connected to the local data bus via path LDY, the latter of which is in multiple in common to each of registers 71 and 73, and auxiliary controller, 75. As illustrated to the right of the block, data register 73 is connected for bilateral communications with the communications bus data lines, D0 through D31, the data checkbits lines, DS0 through DS6, and the data valid line, DAV. Data register 73 receives an instruction from the associated controller by lead ELD, to enable latched data contained in the data registers to the local data bus. In turn, register 73 provides indication to the associated command controller via data lead IDA that incoming latched data is available. The associated controller also enables data register 73 and unit auxiliary controller 75 by lead LLD to latch local data present on the local data bus. The additional connections to data register 73 are discussed subsequently.

Bus unit auxiliary controller, 75, is coupled for bilateral communications with many elements of the control bus portion and the identification line portion of the communications bus, as is illustrated to the right side of the block in the figure. This includes DAV, for the data valid bit, from the valid data line WRT, the write/read line, which is multiple to data register 73, ITS, indicative of an interrupt, BER, indicative of a bus error, the acknowledge leads, DAK, RAK, and NAK, the next and cancel indicators, NXT, CAN.

The computer system's clocks, carried as signals on the control bus, are identified, C1 through C4 and C1N through C4N, as are various system resets and warnings, labeled as RST, SOI, WRN, TRP, and SRS. The auxiliary controller also includes bilateral communications with the source identification leads indicated as SID0 through SID2, the destination identification leads of the control bus, indicated as DID0 through DID2, the writer identification indicated as WID0 through WID3, and the slot identification, indicated as SLT0 through SLT2 which is only an input to the subject board. Via paths BLK and CBL the unit's auxiliary controller is coupled in common to like data paths in the associated access controller to provide bilateral transfer over the control bus portion of the communications bus with bus lock and cancel bus lock information. From the associated processor, the unit auxiliary controller's LST input, can receive instructions to latch certain data bits as commands to the auxiliary controller at EST, receive an instruction to enable status to the data bus as shown in Appendix 1. In turn, the auxiliary controller supplies at path RES any local reset signal to the associated controller and by outputs LID0 through LID2 sends storage multiplexed sender identification or write identification information to the ID latch and MUX of FIG. 5. Via lead DES, the associated command controller supplies the destination identification for any read response.

As illustrated in this block diagram, address registers 71 supply, as appropriate, address parity error indications via path PER, address overrun error indications via path AOV, and address match indications via path AMT to corresponding inputs of unit auxiliary controller 75. Data register 73 provides data overrun information via path DOV to auxiliary controller 75. In turn, via path DMT, auxiliary controller 75 provides appropriate information on a destination identification match to data register 73. Address register 71 also supplies the address match information, AMT, to an input of data register 73.

The bus access controller, 77, receives appropriate commands from the associated command processor including BAZ, which instructs the access controller to perform a read from the communications bus, BDZ, which instructs that either a read response or a send interrupt be made, BWZ instructing a write operation to the communications bus and BV, commanding that the bus lock feature be enabled. The bus access controller supplies all output status, indicating immediate access to the remaining elements via paths BDM, BWM and BAM, which as shown are in multiple as inputs to each of the unit's auxiliary controller 75, BDM & BWM to data register 73, and BAM and BWM to address register 71. As illustrated, access controller, 77, is connected to receive bus lock, BLK, cancel lock, CBL, slot identification, SLT0 through SLT2, data request information, BD0 through BD7, write request information, BW0 through PW7, and address request information, BA0 through BA7. In as much as access controller, 77, involve structure unique to the present invention, it is illustrated in greater detail and described at greater length in this specification in connection with FIGS. 10 and 11.

Figure 7A:
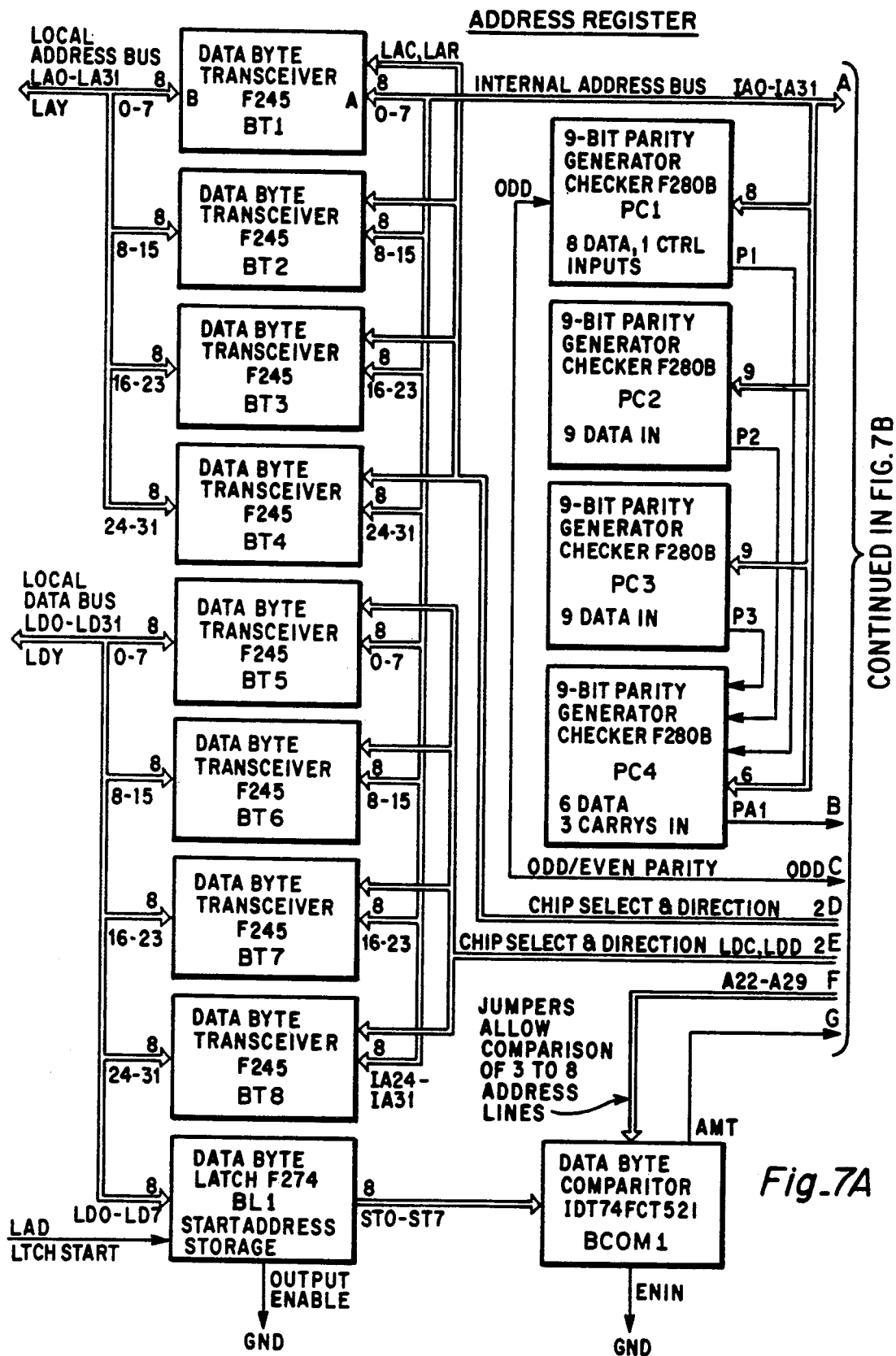

Reference is made to FIG. 7 which presents address registers 71 in greater detail. For convenience the leads previously identified in the discussion of FIG. 6 applicable to the address register need not be described again except in connection with any operation discussed. As illustrated, the address register includes four data byte transceivers, BT1, BT2, BT3, and BT4 connected between the local address bus, LA0 through LA31, and internal address bus, IA0 through IA31, Each such transceiver may comprise a conventional F245 type semiconductor data byte transceiver, such as the 74F245 type available from the Signetics Company, each capable of handling eight bits of the thirty-two bit word. A second group of four like data byte transceivers, BT5, BT6, BT7 and BT8 is connected to the local data bus, LD0 through LD31, shown on the left side of the figure, and to the internal address bus. On the right side four data byte transceiver/registers, BT9, BT10, BT11 and BT12 are included. The latter transceiver registers are connected to the communications bus address lines A0 through A31 and each is capable of transceiving or registering eight bits of the thirty-two bit digital word. The transceiver registers may comprise the available F646 types. The address register also contains a data byte latch, BL1, a data byte comparator, BCOM1, a local bus and address controller, 72, an address buffer controller, 74, and a buffer driver, BD1.

The primary purpose of the address registers in FIG. 7 is to synchronize and store the incoming or outgoing thirty-two bit address in BT9 through BT12. Line ACA clocks outgoing address from the on-board source into the register where the address remains until a new address is subsequently stored. The source for the outgoing address can be either the local address bus, connected by BT1 through BT4, or the local data bus, connected by BT5 through BT8.

It may be noted that because the data-to-address path exists for other purposes, it is possible to move data over the address bus, instead of an address, if desired. This allows an exceptionally high data rate of sixty-four data bits per clock: thirty-two data bits may flow over the data bus and, simultaneously, thirty-two data bits may flow over the address bus.

After storage, the address can later be enabled to flow out to the system bus in one of the address bus access cycles, by activation of lines AOE, ADI, and ASA. AOE low enables the register outputs. ADI high sets the direction for side a to b, toward the system bus. ASA high enables the register to be the source, instead of the side input of the transceiver.

Line ACB clocks an incoming address from the system bus into the register, where the address resides until a new address is clocked-in. After storage, the address can later be enabled to flow to either the local address bus via BT1-BT4 or to the local data bus via BT5-BT8. Line AOE low enables the outputs; line ADI low sets the direction form side b to a, towards the local buses. ASB high enables the register to be the source instead of the b side input of the transceiver.

Associated with BT1 through BT4, line LAC low enables address to flow to or from the local address bus. Line LAR low sets the direction from a to b, towards the local address bus, or LAR high would be b to a, towards the registers, BT9-BT12. Similarly, lines LDC and LDD control BT5 through BT8, connecting the local data bus.

Address parity is also generated in this section of the system. The four parity generators, PC1 through PC4, are cascaded to provide a single parity bit out for the thirty-two address lines. The parity output is routed through PAL item 72, to buffer/driver BD1. When address is enabled out to the system bus, the parity signal, ADP, is also enabled, as well as the address valid control line, ADV, driven out by BD1. Similarly, when address is latched from the bus, parity is checked by PC1-PC4, and the result is latched into PAL item 72.

One other function in the circuit of FIG. 7 is performed by latch BL1 and comparator BCOM1. Each board in the system is assigned a starting address which is latched into BL1 and retained forever after. This can be any eight bit number, which is then compared against the eight bits of the incoming address. As shown, this address is A22 through A29. Whenever there is a match, BCOM1 activates line AMT to show an address match.

As an example, assume all addresses in the range of 1800,0000 hexadecimal to 1FFF,FFFF are assigned to this board. If binary 0110,0000, the same as hex 60 is loaded into BL1 latch from the local data bus then whenever the system bus address, lines A29-A22, matches those bits in the latch, AMT is activated, signaling to all subsystems within the subject board that the system bus is addressing the memory within the subject board. Therefore, once a processor has stored a number within latch BL1, any board in the system can address and, thus, access memory within the subject board. Each board would normally have a different memory starting address stored into the associated BL1 latch, and thus each board would respond to a different memory address request, and no one address would cause two responses.

Control for all activities in this section is managed by PALs 72 and 74. The PAL devices decode the nine input control lines, and produce the buffer controls and parity controls necessary to move address through the interface.

In the data register of FIG. 8 four F646A type data byte transceivers, BT13, BT14, BT15 and BT16, are operatively connected to the communications bus data lines, D0 through D31, shown to the right, and the local data bus, LD0 through LD31, shown to the left, with each of the transceivers being capable of transceiving and/or holding eight bits of the thirty-two bit digital words. A fifth data byte transceiver, BT17, is provided for the seven data check bits, the check bits portion of the control line in the communications bus, DS0 through DS6, being shown to the right of BT17, and the local data check bits bus, LS0 through LS6 being shown connected on the left.

The data register also includes a data buffer control, 76, an auxiliary data controller, 78, an a buffer/driver, BD2. Buffer driver BD2 may comprise any of the conventional F244 type semiconductors. Data buffer control, 76, and auxiliary data controller, 78, are suitably formed of a programmable array logic, PAL. In response to the appropriate one of the data buffer inputs shown to the left of data buffer controls 76, previously discussed, the buffer controls inputs, the status of the various dedicated lines, DOE, to enable buffer output, DDI, to control buffer directions, DCA, to permit A to B clock, DCB to permit B to A clock, DSA to select A to B.

The data and checkbit transceiver/registers BT13-BT17 in FIG. 8 are controlled similar to the control for the address register elements BT9-BT12. Reference to that earlier section should aid understanding of the present control lines. For the data registers, signal DOE low enables outputs, DDI high sets "a" to "b" direction, towards the system bus, and DDI low enables "b" to "a" direction, towards the local data bus, and checkbit bus. DCA and DCB rising edge clocks data into the "a" side or the "b" side, respectively. DSA and DSB select the internal latched data when high for "a" and "b", respectively, and select input data to flow through the transceivers when low, bypassing the registers. All the data register controls are managed by PALs 76 and 78. These PALs decode the ten incoming control signals, and generate the nine control outputs and store status of the data register.

Normally, if the subject board is addressed by a user of the system bus, data on the bus is automatically latched into the data register of the subject board, due to certain combinations of signals, DAV, AMT, DMT, WRT and SUP. Then IDA, the incoming data status bit, is set, and the data is held indefinitely, until called for by on-board circuitry, which would activate the ELD line, causing PALs 76 and 78 to enable the data register's contents to the local data bus.

However, if the system bus tries to load new data into the subject data register before the data is read from that data register, i.e., before the ELD line has been activated, the control PALs 76 and 78 will not latch the new data. Instead, the PALs retain the prior data and will signal data overrun status to higher level control circuitry by activating line DOV, which will prevent acknowledging receipt of data to the system bus. Thus, the system bus user may elect to try again later, or to cancel the operation. The old data, however, is not lost. If a board has a partial failure in this area, and never accepts any incoming data, an external supervisor processor can activate the SUP control line to force data, such as an interrupt, into the data latches.

From the communications bus control portion the write/read command via lead WRT is input to auxiliary controller 78 and is multiplied to a like input of the data buffer control.

Auxiliary data controller 78 signifies availability of incoming data by high output on lead IDA. Any data overrun as when latched incoming data is not read out by the on board intelligence before a second word of incoming data becomes available, is signified by an appropriate output on DOV, the latter of which are connected to the local portion of the interface. With the thirty-two data lines output valid enabled, a low output at DVE is inputted into buffer driver F244 and is output as a data valid indication on lead DAV; that same signal, when used as an input, is fed back to the DAV input of auxiliary data controller 78 and to the data buffer control 76.

Figure 9B:
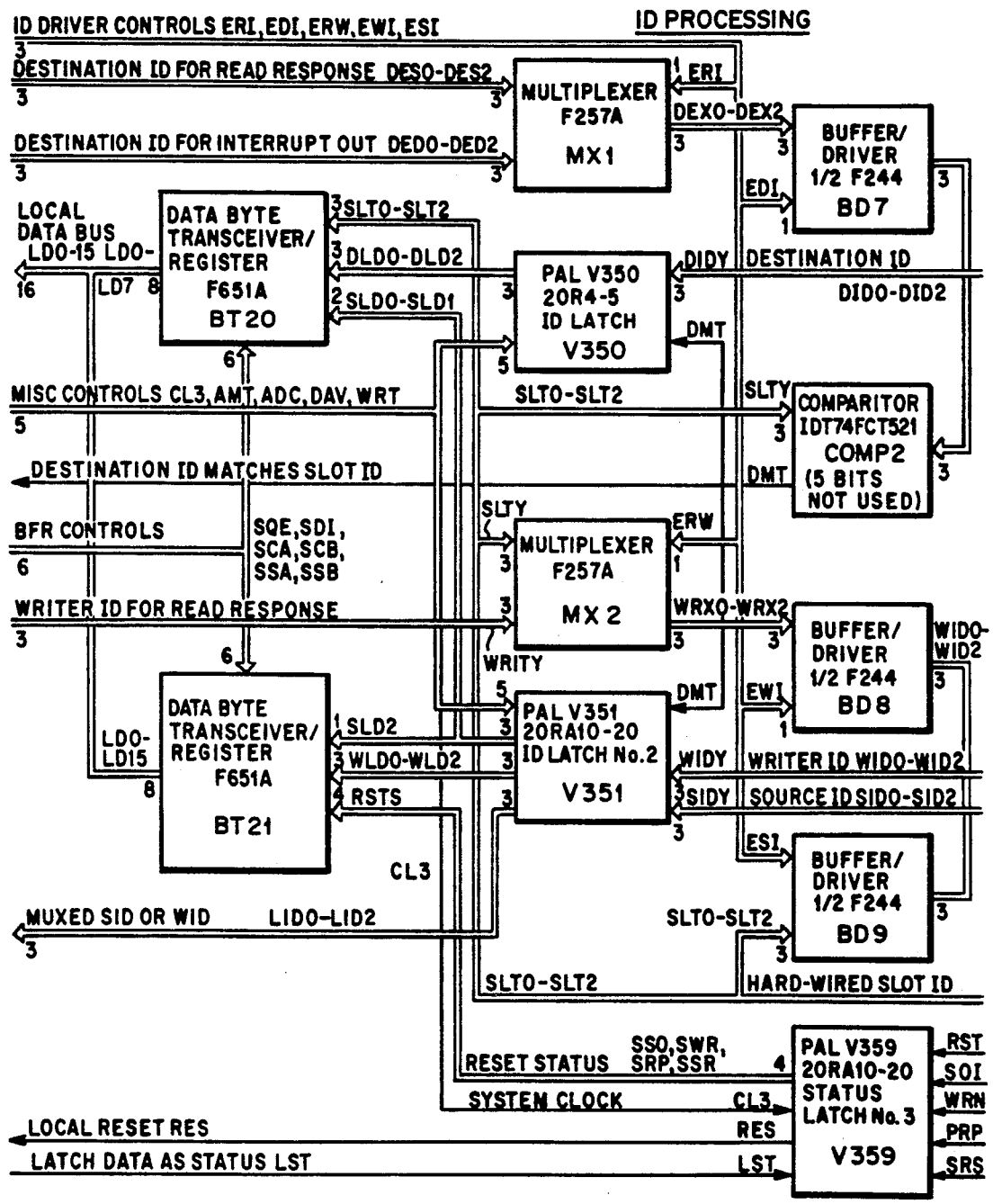

The auxiliary controller generally illustrated earlier in FIG. 6 is presented in greater detail in FIGS. 9A and 9B to which reference is made. As in the preceding figures, the mnemonic identification of the various data paths previously described earlier is carried forth to this figure so as to avoid the necessity of repeating that description. It is appreciated that the auxiliary controller is responsible for many of the control functions in the interface and consequently that element, as illustrated, at first blush appears somewhat complicated.

From the illustrations those skilled in the art recognize the function and purpose of the various elements considered together with the other figures. The auxiliary controller contains four data byte transceiver/registers, BT18 and BT19 in FIG. 9A and BT20 and BT21 in FIG. 9B, suitably of the eight bit type, F646A; nine buffer drivers, BD3, BD4, BD5, BD6, BD7, BD8 and BD9, suitably of the F244 type, two additional buffer drivers, BD10 and BD11, suitably of the open collector type, a comparator, COMP2, various latch circuits, including first and second identification latches, V350 and V351, first and second status latch, V352 and V358, and reset status latch V359 shown to the lower right side of FIG. 9B. Suitably, all of the latch circuits comprise the conventional programmable logic array semiconductor circuits.

The auxiliary controller also contains buffer controls V353 and V354, each suitably a programmed logic array semiconductor. The bus auxiliary controller contains all the miscellaneous control and status circuitry not contained elsewhere. FIG. 9A shows the first half of the circuitry. The controller's primary purpose is to control the input and output to the system bus of all the miscellaneous bi-directional control lines.

Those control lines include the three acknowledge lines, RAK, DAK, and NAK for read, data, and next, respectively; and the seven system bus controls WRT, ITS, BER, CBL, CAN, NXT and SUP, for read/write, interrupt status, bus error, clear bus lock, cancel operations, next burst mode data, and supervisor operation, respectively. Three other signals are also input here, but are output elsewhere. Those are address and data valid signals, ADV and DAV, and bus lock BLK. The preceding thirteen bi-directional control signals, plus the eight clock lines, and the five reset lines and twelve ID lines shown on FIG. 9B and the twenty-four bus request lines shown on FIG. 10, comprise the control bus of the present invention.

The thirteen bi-directional control lines are normally tri-stated and pulled high by external system bus terminators. However, when active, the lines are synchronous with the system clock, in that active equals low, shortly after the rise of system clock, and they are disabled at the next rise of system clock. Those thirteen outputs originate within the generator PALs shown in FIG. 9A, with the exception of ADV, DAV, and BLK mentioned earlier. Likewise, the thirteen inputs which are the counterparts to the outputs, are latched within the status latch PALs in FIG. 9A, except for ADV and DAV, which are used as controls in many of the PALs.

In order to follow the signal flow on FIGS. 9A and 9B the general convention is as follows: The primary mnemonics for the signals are those on the system bus, such as ITS. The internal signals related to ITS within FIG. 9A use the first two letters, IT, but add in front a single letter describing a stage in the signal flow, G, for generator output, Z, for input buffer output, and S, for status output. Thus, GIT is the generator output of ITS, but prior to the output driver. Also, ZIT is ITS, after passing through the input buffer. Finally, SIT is ITS, actually ZIT, after being latched. There are a few minor exceptions to the above rule, due to conflicts in nomenclature elsewhere. For convenience, Appendix 4 contains the mnemonics, listed in alphabetical order, and may be referred to resolve a conflict in nomenclature.

Thus, the system bus signals, WRT, ITS, BER, CBL, CAN, NXT, SUP, BLK, ADV, DAV, DAK, RAK and NAK, after being buffered as inputs, become ZWT, ZIT, ZBE, ZCB, ZCA, ZNX, ZSU, ZBL, ZAV, ZDV, ZDA, ZRA and ZNA, respectively. After latching, the related status becomes SWT, SIT, SBE, SCB, SCA, SNX, SSU, SBL, SAV, SDV, SDA, SRA and SNA, respectively. The source of the output signals are the generator outputs which are labeled GWR, GIT, GBE, GCB, GCA, GNX, GSU, GBL, GAV, GDV, ACD, ACR and ACN, respectively. A few of the above signals do not exist in the figure, being buried inside of one of the blocks, or may appear in another figure.

ACD, ACR and ACN are generated in V355, and driven onto the bus by BD11. GBE, GCB and GNX are generated in V356, and driven onto the bus by BD10. GWR, GIT, GCA and GSU are generated in V357, and also driven onto the bus by BD10.

DAK, RAK and NAK are input and buffered through BD3, and then latched into V352. WRT, ITS, BER, CBL, CAN and BLK are input and buffered by BD5, and then latched into V358. WRT and NXT are input and buffered by BD5, and then latched into V355. BER is used in V352 as a control input, to inhibit reception of an acknowledge if a bus error occurred. SUP is input and buffered in BD5, and is then latched in V356. ADV and DAV are input and buffered by BD4, and then used as master control signals in V355, V356 and V358. Additionally, several on-board control signals are also used and/or latched within the PALs of FIG. 9A. These include AOV and DOV, for address and data overrun; AMT and DMT, for address and data match; BWG, BDG, and BAG, which signal write, data, and address access in prior cycle; BWM, BDM and BAM, for write, data and address access in present cycle.

Other control signals are generated elsewhere for use in the bus auxiliary controller. Those include LST and EST for latch auxiliary input status and enable auxiliary status output, respectively.

Controls generated within V354 of FIG. 9A, for use in the FIG. 9B portion, include ERI and ERW for selecting the source of destination ID and writer ID outputs; and EDI, ESI and EWI for enabling destination ID, sender ID, and writer ID buffer/driver outputs.

Controls generated by V353 of FIG. 9A, for use in both portions of FIG. 9 include SOE, SOD, SDI, SKA, SKB, SSA and SSB, for use as local data bus buffer controls similar to those described earlier for the address and data transceiver/registers. SOE and SOD enable auxiliary status outputs for the lower twenty-four bits and the upper eight bits, respectively. SDI sets direction. SCA and SCB clock in data from the "a" side and the "b" side. SSA and SSB select latched data or input data for the outputs.

FIG. 9B shows the buffers, latches and multiplexers used to control and store the four sets of unit ID which are part of the system bus. Destination ID output, DID-0–DID2 is used to designate one of the other system boards as the receiver of accompanying data. In MX1, the destination ID is selected from either the read response ID, DES0–DES2, which equals the sender ID of the unit which originally requested the read; or else the destination ID would be a computed destination, DED-0–DED2, to select the receiver of an interrupt from the subject board. The destination ID signals, out of MX1, and before the output driver, BD7, are labeled DEX-0–DEX2.

Sender ID output, SID0–SID2, driven out by BD9, is used to show the source of a read request, and is always selected to be equal to the unique hard-wired slot ID, SLT0–SLT2, of the subject board. In MX2, writer ID output, WID0–WID2 is selected from one of two sources. First to show either the writer of data which is currently being written, and which data accompanies the ID, this is SLT0–SLT2; or else it is used to show the original writer of the data that is currently being sent in a read response, data that accompanies the ID, this is WRI0–WRI2. The output signals, before the output driver, BD8, are labeled WRX0–WRX2.

BT18, BT19, BT20 and BT21 provide the interface of the status signals to the local data bus. The thirty-two bit data bus is used by on-board processors or controllers to access the state of the various status and control lines referenced above. Thus, for instance, by use of the EST command, a thirty-two bit data word could be input by the CPU from the auxiliary controller, containing information as shown in Appendix 1.

Comparator COMP2 in FIG. 9B is used to compare the subject unit slot ID, SLT0–SLT2, to the system bus destination ID, DID0–DID2. Whenever there is a match, then the DMT line is activated low, to signal other subsystems that there may be incoming data on the system bus, directed to the subject board.

As illustrated, the system's clocks are input to buffer driver BD6, and outputted by bus CLY, containing CL0 through CL7, to other parts of the interface board. One of those clocks is applied via bus CL3 to each of the reset status latch, V352, command generators, V356 and V357, buffer control, V354 acknowledge generator, V355, in FIG. 9A and in FIG. 9B via miscellaneous controls to bus to status latches, V350, V351 and V352, as enables synchronization of the controller circuit elements with the system clock, which in the preferred embodiment is a 25 MHz clock. Any input to status latch V359 in FIG. 9B requiring reset of the circuitry to its initialized condition, as reflected by a high on one or more of the leads RST, SOI, WRN, PRP, and SRS, reflecting various conditions described elsewhere in this specification, is decoded by latch V359 and applied to the local reset path RES and via the four bit path for reset status, SSO, SWR, SRP and SSR to input of data byte transceiver register BT21.

Slot identification information presented over bus SLT0 through SLT2 is applied to transceiver register BT20, to multiplexer MX2, to buffer driver BD9 and to comparator COMP2. Destination information input is applied via leads DID0 through DID2 to comparator COMP2 and latch V350. Destination output 17 from buffer driver BD7 is also input to COMP2. At the appropriate time latch V350 outputs the destination information via leads DLD0 through DLD2 into transceiver BT20. With a match, comparator COMP2 applies outputs on line DMT in FIG. 9B, which signal is coupled to the other elements of the interface board and, also via path, AMT, DMT in FIG. 9A to the various ones of ID latch V358, acknowledge generator, V355, and command generator V356.

Unit Access Controller

A unit access controller, 77, is represented in a general block diagram form in FIG. 10 and that same unit access controller is illustrated in a more detailed block diagram form in the accompanying FIG. 11. As illustrated in FIG. 10, the access controller contains ten blocks representing individual programmable array logic circuits or "chips", commonly known as PAL or, alternatively, PLA, identified as V301, V302, V303, V311, V312, V313, V321, V322, V323, and V340. Each such chip may comprise a PAL of the 20L8, 20R8, 20R6, or 20R4 type manufactured by the AMD company which suitably has an operate time, the time taken to produce an output following application of signals to the chip's inputs, on the order of five nanoseconds or less, as one specific example.

As those skilled in the art appreciate, a PAL contains a large array or series of gates and flip-flops that are designed to produce a selected output upon the application of certain potentials to its input. This selection of logic is defined by the mask that has been burned into the PAL, that is, the PAL program. Typically this programing commences by a designer establishing a set of Boolean logic equations that characterize certain conditions to be input to the PAL, as representing certain events anticipated by the system designer, and the consequent outputs which are desired upon occurrence of those events. The equations, thus, completely define the operation of the PAL. Given those equations, thus, a particular PAL programmer will define a mask that includes certain flip-flops and gates on the chip. For additional understanding of the operation and programming of PAL chips the less skilled reader is referred to the technical literature.

The PAL is a dedicated, effectively "hard-wired" device and, unlike a computer which must go though several steps over several clock cycles to produce result, the dedicated logic simply and quickly decodes the input digital information and provides the appropriate digital output, more quickly than a computer. Hence, PAL's are consequently very fast in operation. The 20L8-5 chips manufactured by the AMD company, by way of example, provides an output within five nanoseconds of the application of the inputs. This, it is noted, is shorter than the duration of the system clock pulse, the latter of which in the exemplary embodiment is forty nanoseconds. Moreover, with such fast logic devices in which the output of one may be taken as the input to the other, and so on, the operate times are cumulative. By way of example, in FIG. 10 an output from PAL V311 is input to PAL V312 and, that output in turn is input to the third PAL, V313. As each of the PALs operates in five nanoseconds or less the cumulative time taken from the input to V311 to an output at the V313 is fifteen nanoseconds, a time duration that is also less than the forty nanosecond duration of the system clock pulses in the practical embodiment discussed.

Each of the memory boards and the processor boards includes a unit access controller. In the data processor system of FIG. 1, thus, a total of eight such access controllers are included; four in the processor boards and four in the memory boards.

In this block diagram conventional graphical representations are employed to illustrate the various data paths for the particular kinds of digital information being transmitted. Moreover, the same mnemonic designations described in the prior figures for particular data paths are employed in this figure with like designations for the same data path elements appearing in the preceding figures. Data paths to the communications bus are illustrated on the bottom side of the figure while data paths connecting to other elements in a particular circuit board within which the unit access controller is resident, by means of another different bus or series of leads are shown at the topmost side of the figure. Thus, the system clock, SYSCLK, the bus lock, BLK, the cancel bus lock, CBL, are shown to the lower left, the slot ID leads, S0, S1 and S2, which are the same as SLT0, SLT1 and SLT2, and which are of a content that is uniquely associated with a particular access controller in the system, are shown to the lower right in the figure. The data bus request leads, as includes BD0 through BD7, defining an eight bit parallel word; the write request lines, BW0 through BW7, also representative of an eight bit digital word; and the address bus request lines, BA0 through BA7, representing an eight bit digital word, are illustrated on the lower side of the figure. On the upper side of the figure the data path for the access requests are illustrated, including the data request, BDZ, the write request, BWZ, and the address bus request, BAZ are illustrated. Additionally, the bus lock data path, BV, is shown on the upper side of the figure. Control leads BDT, BWT, BAT and BN, that are output from chip V340, are the secondary bus request signals and are distributed as shown in FIG. 11.

As better illustrated in FIG. 11, one group of the PALs, V301 through V303, effectively decode the data bus request lines; another group, V311 through V313, decode the write request lines; and the remaining group, V321 through V323, handle the address bus request lines. The hard wired, unique slot ID information is connected to appropriate inputs on each of V301, V311, and V321 as well as V303, V313 and V323.

The operation of the unit access controller is completely defined by the Boolean logic equations, hereinafter presented to accomplish the desired functions of allowing the controller to request the bus and more specifically to independently and selectively access one or both portions of the system bus as needed for the sending of digital information, doing so synchronously with the commencement of the next available system clock pulse and as prompted by a master command from the unit's central controller. The operation also takes into the account the necessity on occasion for locking out other computer units associated with other access controllers by application of the bus lock signals, and, in the event of any contention for bus access by more than one access controller in separate units distributed along the bus for resolving that contention according to a pre-defined priority arrangement or protocol, including the resolution of a bus contention by different units simultaneously as might occur on occasion.

Initialization

At power up, each board in the system uses the power-up reset pulse to initialize and standardize conditions upon the board. Then, at least some boards, and preferably all, perform some type of on-board diagnostics, which do not affect the communications bus.

Initialization and on-board diagnostic routines are conventional and known and need not be detailed further. The system is capable of having several memory boards, and each is capable of being assigned, dynamically, some arbitrary address space. Further, since the system may contain more than one CPU board, a decision is to be made concerning which CPU shall assign which memory board, and how this should be done. After the power-up reset diagnostics are complete, each CPU-type board interrupts each other board, with a request for a return interrupt, describing the type of board and status of operation.

With four CPU-type processor boards and four memory boards in the system, after initialization, each of the four CPUs will interrupt each of the seven other boards with the status request. Each board responds to the three other requesters with the board type, and status. Each CPU then stores a map in its own memory, of what type of board is available in each slot. This allows total flexibility, for the operator to place any type of card in any slot. After the interrupts and the responses, each CPU knows exactly what resources are available in the system and their location.

An alternative supplementary program allows each board to automatically send its type and status to all other boards following any power-up sequence. This takes care of the case where someone inserts a new card in the system at a later time. The automatic interrupt to all other boards allows them to update their maps.

After all responses have been properly noted by the boards, the CPU with the lowest slot number assumes the duties of assigning memory space addresses to the memory boards, and any other executive duties necessary. After completion of these chores, this CPU would interrupt each of the other CPUs with a report of the spaces assigned, as well as any other necessary status Thus, even though all CPUs in the system are equal in every way, one is allowed to become the maintenance supervisor. The other CPUs can monitor all transactions, and note whether they observe any irregularities, such as the failure of the base CPU to complete the chores within a reasonable time period.

The actual assignment of memory space start address is also performed by use of the interrupt. The base CPU arbitrarily assigns one memory range to one memory board, and another range (perhaps contiguous) to the second memory board, and so on. Since the CPU has a status from each board, then the memory boards could have different capacities, and the CPU would assign according to each boards capacity. The base CPU may then assign certain other diagnostics to various boards as appropriate, and upon satisfactory completion, assign system initialization parameters, and allow application processes to commence. Some of the foregoing diagnostics and initialization may be repeated upon reset commands, other than the power-up reset. This is, each board has its own power-up reset signal, the raw reset switch signal, and a soft reset signal. Each of these could produce different levels of response.

All of the above actions are programmed using known technique into PROMs on each of the boards, to define the details of power-up diagnostics and other interrupt responses. The details of those programs are available in the industry and do not further contribute to an understanding of the invention and are not further described.

Board Identification

As earlier discussed, each processor resource in the system, such as a processor board, a memory board, and the like, contains an identification number, abbreviated I.D., that is hard wired into place and is unique to its individual physical position or location, the "slot", within the data processor system. As example, in an eight unit system, three leads to each unit could provide in binary form up to eight possible unique combinations of voltage, a "1", or ground potential, a "0" as represents binary numbers 000, 001, 010, and so on, up to 111, which units may be referred to in decimal number as 0, 1, 2, and so on up to the number 7. That identification number or ID is carried upon separate control lines in the system bus, referred to as the identification lines, labeled SLT0-2 and sometimes generally labeled as ID.

Bus Identification Lines

The control bus portion contains a read request line, and a bus containing digital information identifying the processor resource making the read request SID0-SID2 so that the memory board which recognizes the address on the address bus as its own, by comparison against the pre-assigned unit memory start address and accepts a request to perform the requested memory access, knows where to send the read response data at a later period in time during a subsequent clock cycle. A destination identification bus, DID0-DID2, provides indication of the destination to which read/response data is being sent, which it is noted, matches the SID0-SID2 identification that occurred during the original read request.

Additional Bus ID Codes

Given the two ID codes necessary for bus operation, SID and DID, it follows that it is also useful for a memory board to store in its memory the ID of the writer of a word of data, along with the word. Thereafter, when a board requests a read of the word of data, the writer's ID in bus WID0-WID2 is sent along with the data to the read requester. The reader can ignore the writer's ID, or it might use that additional information in some way, especially if the data is erroneous. Tagging of the writer's ID in this way is a very powerful diagnostic tool and an aid in system error recovery. The cost is essentially three bits of memory and a few extra lines on the communications bus, specifically in the control bus portion.

One might reason that the SID and DID lines are sufficient to convey the writer ID during a read response. That, however, is not possible, since one set of lines is tied up with destination ID, and the other set could be involved in a new read requester identification. Thus, a third set of ID lines is provided, of exactly the same construction as the first two. This third set conveys the writer ID during a read response. This third set of lines is also used to indicate the source ID of an interrupting card. In the preferred system, thus, three identical sets of three lines each, conveys encoded IDs, each relating to the slot number of one of the eight boards which are sources and destinations of various data.

The control bus portion also contains a write identification bus, WID, to indicate the particular computer resource of the data flowing on the data lines during a write operation, and also to indicate the original "writer" of the data which is flowing on the data lines during a read response operation. Any processor reading any memory location is given automatically the identification of the processor which last wrote to that memory location. The WID bus permits an audit trail for diagnostic and other purposes possible, though non-essential, not relevant to the operation of the present invention and not further discussed, except in the claims.

The control portion of the system bus contains three "hand shake" or acknowledge lines, DAK, RAK and NAK. As the address and data bus portions may be accessed by a particular resource, simultaneously and independently of other computer resources in the system, multiple types of acknowledge signals or "hand shakes" are necessary. RAK is the read acknowledge data path that is associated with the address bus; DAK is the data acknowledge signal path associated with the data bus; and NAK is a data path to cover an acknowledge signal associated with burst mode operations, a small non-essential portion of the illustrated embodiment. To permit independent access of each bus portion the bus contains three sets of request lines. This includes the address bus request, BA0-BA7, the data bus only request, BD0-BD7, or a request for both the address and data buses, BW0-BW7. Each one of the request lines is associated with a specific processor resource slot ID and is similarly labeled. For example, the board at Slot 7 makes its request for the data bus by activating lead BD7; that by Slot 6, to Lead BD6 and so on to BD0 for the board located at Slot ID "0".

As the memory boards in the practical embodiment illustrated are capable of storing more than a single read or write request it is possible for the processor board that initiated the request to decide, before those requests are fulfilled, that the accesses previously made to the memory board are no longer required. The processor, therefore, has the capability of sending a cancel signal over the cancel signal line, CAN, in coincidence with the prior address notifying the memory board not to complete the earlier request.

The remaining control bus lines have similar counterparts, more or less, in prior communication bus systems. Line WRT is the read/write status; ITS is the interrupt line; BER is bus error indicator line; BLK is the bus lock line; CBL is the cancel bus lock line, and NXT is a burst mode request line. Lines SOI, RST, WRN, PRP, and SRS are all formed of a system reset feature.

Priority Ranking

The foregoing description of the read/response interrupt operation, the write operation, and the read response present example of how independent simultaneous usage of the address and data bus portions may be accessed by more than one unit simultaneously. As in the prior art systems, any practical embodiment of the present system, in which more than one processor resource may access the same communications bus or bus portions preferably contains a priority or bus contention scheme by means of which two processor resources are precluded from accessing the same bus portion simultaneously as would result in a data "collision" on the bus with consequent error in data transmission, allow for those processor resources having the lowest priority ranking some opportunity to access the bus, should the low priority board be blocked from access for too great a period, notwithstanding the presence of a higher priority request, and conversely allow a very important high priority request to be completed without interference by locking out the other processor resources until the task is completed, even though such operation temporarily results in less efficient use of the bus. As those skilled in the art appreciate, such a bus contention scheme is effectively built into the algorithms of the access controller, previously described in detail. Those algorithms are represented in the Boolean logic equations presented herein and by the description. It must be understood that the priority algorithms and implementations exemplified herein are not the only ones possible for this invention.

In the present bus contention arrangement, thus, the priority logic within each unit is such as to provide all units access to either address or data bus or to both buses in a round-robin scheme, whereby no unit may access a specific bus a second time, until all other units have had the opportunity to decline access.

Three separate systems for providing bus access requests are given, one for providing an address bus request, one for a data bus request, and a third for those processor resources requiring access to both address and data bus addresses simultaneously as in the case of a write request.

The priority is assigned among the three access systems so that a unit requesting access to the data bus alone has the higher priority, a unit requesting access to the address bus alone has the lowest priority, and a unit requesting access to both buses simultaneously is assigned a middle priority. Provision is also made to permit an address bus request to become higher in priority than a request for both buses whenever a data bus request exists. Thus, when a data bus request is granted, the highest address request existing simultaneously is also granted; a request by a processor resource for both buses must necessarily wait anyway due to the data bus being used by the data bus requestor. Thus, read responses and interrupts, which only use the data bus, have the fastest priority. Writes, which use both buses simultaneously, have middle priority, and read requests, which use only the address bus, have the lowest priority, except in the special case where a lone address bus access occurs in coincidence with the higher priority data bus access request, thereby elevating the address bus priority to a higher level than a write bus request at that moment.

Priority Protocol

Even though the lone address bus is stated as having the lowest priority, with a write request being higher, there is a quirk: If there is a lone data bus access, a write is prevented, but the lone address access can occur simultaneously with the lone data access. Thus, the lone address request frequently jumps ahead of the both-bus request of the write operation in priority. Read response requires immediate action and thus is given highest priority in the system. Read response uses lone data bus access, and so that is why lone data bus access is given top priority. Likewise, interrupts, which also use lone data access, require top priority. Writes are more important than read requests and writes use both buses. Hence, writes are given the middle priority. Even so, with the system as described, it is seen that read requests fit in with read responses, and thus read requests have a special level of priority, not really at the bottom.

Priority rankings within a bus access group are suitably based upon the processor resource unit's identification number. The lowest unit I.D. number in each group is given the highest priority, the first chance at access, to any unit with a greater I.D. number. Thus, in a poll for access to a specific bus portion, unit 000 is granted access first and unit 111, the eighth unit, is granted access last.

Bus Contention

As shown in the figures, any access controller, associated with one of the processor resources, requires only a single line to request access to the bus, such line being selected from among the three buses BAX, BDX and BWX, depending upon the type of access desired. All such bus access request lines are connected to each and every access controller in the computer system, such as illustrated in FIG. 11 via leads BD0 through BD7, BW0 through BW7 and BA0 through BA7. A particular access controller associated with one of the processor resources cannot activate its request line until one of several conditions is met: no request line was active in the prior clock cycle; or a higher priority processor resource board request was active in the prior cycle, that is a board having a lower "slot" number, ID; or the present processor resource board was already accessing the bus in the prior cycle and had previously set the bus lock signal; or the processor resource board had its bus request active in the prior cycle, but was unsuccessful in accessing the bus, as a request, once activated, remains active until honored. If any one of the foregoing conditions is met then the processor resource board may activate its request line, unless bus lock is active, from some other board, and this request is for either address or both buses. Bus lock does not inhibit the data bus request. This is because a READ-MODIFY-WRITE requires another board, the memory, to send the response data over the data bus, during the bus lock. Note that there is one additional condition under which the data bus request can be activated. That is if there was exactly one data request in the prior cycle.

A particular bus access controller knows that it has access to the bus in one of several ways. If, following activation of its bus request line, at the commencement of the next clock pulse there is no other bus request on the line; or no other board having a lower slot ID number, hence a higher priority has its bus request active upon the commencement of the next clock pulse following the subject processor resource board's activation of its bus request line; or for address and both bus requests, if, following activation of its bus request line, the subject processor resource board had previously set its bus lock signal. Remember that both bus access is inhibited (delayed) if there were any data bus requests. Also, address bus access is inhibited if there were any requests requiring both data and address buses, unless there was a data bus request.

In the clock cycle in which a particular processor resource board is granted access to and is actually using the bus, that particular resource board removes its bus request signal, allowing other access controllers in the data processor system to contend, "jockey" for position, for the bus upon the next clock cycle, unless of course the subject processor resource board earlier issued a bus lock.

The bus contention system is a synchronous system. Digital information signals may flow between clock cycles, but the start of each clock pulse latches such digital information signals and the electronic action from, with or to such digital information, as appropriate occurs during the next clock cycle. Accordingly, digital signals are not allowed to be applied to the bus to change the signal on the bus other than at the start of a system clock pulse.

For best overall efficiency in the data processor system it is obviously desirable to maintain the acquisition time or, as variously termed, acknowledge time, the duration from the point at which a processor resource decides to access the system bus until that resource is permitted to place its address or data information upon the bus, to an absolute minimum. The shortest possible time appears to be one clock cycle of the system clock. Thus, if a processor resource activates a bus request at the start of one clock cycle, if successful, that processor resource is allowed to start access and place information upon the bus at the start of the very next clock cycle.

In the practical embodiment illustrated a system clock of 25 MHz is used that, hence provides clock cycle of forty nanoseconds duration. That clock signal is derived as follows. The disclosed computer system, discussed in greater detail later, includes a one hundred MHz clock signal that is generated by an oscillator and that 100 MHz signal serves as the source of all clocks for all circuit boards in the computer, and there are many. Appropriate electronic dividers, not illustrated, are included in the system to generate sub-multiple clock frequencies, such as 50 MHz, 25 MHz, 12.5 MHz and 6.2 MHz, from the 100 MHz signal an entirely conventional technique. From this group of clock signals, thus, the 25 MHz signal is selected as the "system clock". The 25 MHz signal in this particular instance is referred to as the system clock because each cycle of 25 MHz causes a different access over the bus. At 25 MHz, each cycle takes forty nanoseconds.

It is easily seen that if the subject bus transfers 32 bits of data at a 25 MHz rate, that 100 Megabytes per second of data are moved. This is a substantial improvement over prior bus configurations. Furthermore, if data is simultaneously moved over the address bus, then a 200 Megabyte transfer rate occurs.

The use of the forty nanosecond system clock pulses does not preclude the presence of other clocks within each processor resource or other clock signals from being applied to the bus as long as none of those other clocks causes changes to signals flowing to the bus. Digital information signals may change at the start of one clock cycle, flow out to the bus and propagate to a desired destination along the bus. The change ripples out and even if that electronic information signal takes fifteen to twenty-five nanoseconds before stabilizing, the signal is correct and sufficiently steady in sufficient time for the next succeeding clock cycle to latch that signal into appropriate digital gates.

With the constraint of a signal applied to the bus changing only at the start of the clock cycle, and the desire to use only a single clock cycle to obtain access to the bus, all access requests made by one or more of the processor resource access controller occurs at the start of a clock cycle and those requests are immediately applied to the access controllers in all the processor resources in the system. The built-in algorithm in the access controllers thereby allows every processor resource making a request for bus access to know instantly, before the end of the then extant clock cycle, whether the particular processor resource board may start access or not at the commencement of the next clock cycle.

A similar bus contention system earlier appeared in a computer manufactured by the Control Data Corporation, Minneapolis, Minn., assignee of the present invention, known as the DI System. In that prior system, however, each requestor activated several identical signals which were transmitted to the bus and through the back plane wiring and then to the lower priority boards to inhibit access until the higher priority board access was completed. Those signals were also used to enable the setting of the bus request when higher priority boards were accessing the bus. In the present system, however, every processor resource that requests access does so on only one line; and every processor resource contains as inputs all of the request lines from all of the boards. Moreover, each processor resource has a unique identification, a slot I.D., encoded so that every board has a unique number known to itself. In this system those ID numbers are in decimal form, the eight numbers, zero through seven. In both the prior system and in the present system any processor resource, having once achieved a bus access cannot obtain a second access until all other boards desiring access have had the opportunity to complete a bus access with the exception wherein a bus lock was used.

Bus Data Integrity

Various known systems exist for error detection and correction when erroneous system actions produce faulty data. In the disclosed embodiment an address parity bit provides an alarm if the thirty-two bit address over the bus is faulty. Then, seven check bits are sent over the bus, accompanying the thirty-two bit data word. These check bits are generated by any I/O board or CPU board and is sent with the data to be written into memory. When the memory is read, the check bits are sent along with the data to the read requester, which may then use the check bits to validate the integrity of the data. The extra seven bits allows discovery of errors which might occur during passage over the system bus, as well as any storage errors, the latter being more likely to occur than bus errors. But the data and checksum flow together, so that any error is detected.

The foregoing system does not require the memory board to verify data integrity, or to generate the checksum, but only to store and retrieve the seven check bits, along with the other thirty-two data bits, and the three bit writer ID. Thus, each memory word is stored as forty-two bits. The checksum/syndrome is generated at the source of the data, and is checked at the destination of the data, not in transit, and not in the memory board. When the destination card detects an error in the data, the syndrome can be used by conventional techniques to restore good data if the error is only a single bit error, but not for multiple bit-errors.

Interrupts

In the present system any board can interrupt any other board at any time. The process is similar to a read response, in that the interrupting board must contend for the data bus, just as any other card must do. Then, when the data bus is granted, the interrupting board places a thirty-two bit data word upon the data bus, the destination ID of the board to be interrupted, and the ID of the interrupter, and causes one status line on the control bus to go active, indicating that the data word is an interrupt code. The destination card would normally latch the word, and then proceed as pre-arranged, to process the interrupt. However, just as in a conventional system, where a board may have interrupts disabled, the board in the present system may choose to ignore the interrupt, or even to avoid latching the interrupting word.

It is noted that the thirty-two bit interrupt data word can be used in any way that the software or on-board hardware desires. How the interrupt word is to be used is beyond the scope of the present invention and represents known technique. It could be an interrupt vector address, an interrupt level, a special status, an instruction, or some combination of these. Interrupts are extremely flexible and comprehensive in this system and are fast. The worst case delay in the system, before an interrupt can be placed upon the bus, is seven cycles of the 40 nanosecond clock. Typical delays should be only one or two clock cycles.

Bus Lock

For some operations it is important for one processor resource board to prevent all other boards from interfering with some critical process. A bus lock feature is used to accomplish that goal. Some of the uses of bus lock, as example, are to do a read-modify-write without any interference, to do a series of writes which must be linked together, or to do a series of time-critical read requests. Any board is permitted to set bus lock if that board is accessing the address bus, but only after having gained access by normal bus contention protocol. Once having gained access to the address bus, and having set bus lock, that one board has total control of the address bus, forever after, until it chooses to clear the bus lock, or until it is forced to clear bus lock by a special system command. Any other board can send the clear bus lock command at any time, and thus restore normal bus contention immediately.

When a card has bus lock in force, the data bus is still available for normal contention to any card, for any purpose, but the address bus is reserved exclusively for the card which caused bus lock to be set. This allows read responses to continue, or interrupts to occur, but no writes or read requests can occur, except as initiated by the card which caused the bus lock. Even the card in control of bus lock must contend for the data bus if it desires concurrently to do a write, an interrupt, a read response, or whatever. It does not contend for read requests or such, which only use the address bus, which is totally under control of the current bus lock master.

The bus lock has no effect upon read responses nor upon interrupts. Those operations continue normally, regardless of the state of bus lock. Also, once bus lock is set it only prevents the remaining seven other cards of this eight card embodiment from setting address bus or write bus requests. All cards must still finish the contention process which existed at the start of the bus lock. Thus, for example: Assume Card 6 has access to the address bus, and sets bus lock; Cards 0 & 3 had address bus request set; and card 4 had data bus request set. Then, in the next clock cycle, card 4 can do its read response, but cards 0 & 3 must drop their bus requests and cannot do their read requests. However, from the start of bus lock no other card, except Card 6, can set address bus request or write bus request.

Bus Handshakes

Every normal bus transaction has a handshake, an acknowledge, so that there can never be doubt as to whether a request or command has been accepted by another card. Thus, when a card does a read request, the card which recognizes the address of the read request sends a read request acknowledging signal in the very next cycle to indicate that the access is in process and will be completed at some indeterminate future time, which in the case of a memory read response will typically be 200 nanoseconds or greater.

When a card does a read response and sends the data back to the original requester, that destination will, in turn, send a data acknowledgement back in the very next clock cycle. When a card does a write, or sends an interrupt, the destination that receives same sends a data acknowledgement, back to the originating source in the very next cycle. If, at any time, a card sends a command, request, data, or whatever, and does not receive an acknowledgement in the very next cycle, then that card knows that a problem exists, and may choose to retry, or to take other corrective action. In the present system a card is not required to accept a command or request or data. If the card is involved with other things according to its program, it can ignore the input, and not send an acknowledgement. This allows the sender card to know that further action is necessary.

In summary, every bus access has three parts: First is the bus request and contention, which may take one or more clock cycles. Next is the actual bus access, in which either the address or data bus is used, along with some control lines. Finally, there is the acknowledgement cycle, which follows the access directly. In some cases special commands are sent via one or more of the control lines. An acknowledgement of these special commands is made as well.

SEQUENTIAL READS

Even though the present system is extremely efficient and fast, it can be pushed to greater extremes if desired. One way to do so is to provide automatic, sequential reads, as is done in some prior art systems. This process is merely the sending of one original address, along with a command to do a series of contiguous sequential reads, starting at the given address. This is often referred to as "burst" mode. This reduces bus usage by only requiring access to the address bus once for more than one read. The memory card loads the address into a counter, and then does the sequential reads, incrementing the counter, automatically, after each read. Alternative systems would preset the number of reads. The disclosed embodiment does not, but provides a handshake at every read, so that either the master or the slave cards can halt the sequence at any time, as necessary. The handshake is in the form of a "next" command from the master, and a "next" acknowledgement from the slave.

BUS OPERATIONS

ACCESS CONTENTION CYCLES

There are several types of operations possible. The first part of the operations defines the access contention cycles, which are the cycles immediately preceding the actual bus access, and which provide the logic on each board with information to enable all boards to decide which board is to gain access in the subsequent clock cycle. There are three types of access: data bus only, combined address bus and data bus, and address bus only. These are considered in order. In connection therewith it may be helpful to consider also the Bus Line-Group Usage chart in Appendix 3.

First, a lone data bus access cycle, in which the address bus is not required. Place a data bus request on bus. This is allowed if:
a. No data bus request was active in the prior cycle.
b. Or, if a higher priority data bus request was active in the prior cycle.
c. Or, if the board had data bus request active in a prior cycle, and did not win the contention, so that this is just a continuation of another attempt to win.
d. Or, if exactly one data bus request was active in the prior cycle. This one contender will be accessing the bus in the present cycle. If this rule was not imposed, no card could contend in this cycle, if the accessing card were the lowest priority; and, thus, the next cycle would be idle. Note that this is a new and different rule from the DI bus described earlier, due to the necessity of completing arbitration in one cycle at this juncture. By contrast, the DI used many cycles for an access, hence, the problem did not present itself.

Second, at the end of the contention cycle, determine if access has been granted as follows:
a. Win access if no other data bus request was active.
b. Or, if no data bus request had a higher priority (i.e., came from a lower slot number).

3. If a win occurs, and access is achieved, then in the next cycle, the data bus can be used by the winner.

Next is a lone address bus access cycle, in which the data bus is not required.

LONE ADDRESS BUS ACCESS CYCLE (DATA BUS IS NOT REQUIRED):
1. Place an address bus request on the bus. This is allowed if bus lock is not active, and:
   a. No address bus request was active in the prior cycle.
   b. Or, if a higher priority address bus request was active in the prior cycle.
   c. Or, if the board has previously set bus lock, and bus lock is still active.
   d. Or, if the board had address bus request active in the prior cycle, and did not win the contention, so that this is just another attempt to win.
2. At the end of the contention cycle, determine if access has been granted as follows:
   a. Win access if no other address bus request was active and no write bus request was active.
   b. Or, if no address bus request had a higher priority, (i.e., came from a lower slot number), and no write bus request was active.
   c. Or, if no address bus request had a higher priority, (i.e., came from a lower slot number) and a lone data bus request was active. This is where we sneak past the write requests, to coincide with a read response.
3. If a win occurs, and access is achieved, then in the next cycle, the address bus can be used by the winner.

. BOTH DATA AND ADDRESS BUS CYCLE
1. Place a write bus request on the bus. Note that "write bus" is a short form, meaning both the address and the data bus together. Understand, however, that this does not activate the data bus request nor the address bus request signals, which are separate. This request is allowed to be placed on the bus, if bus lock is not active, and a. No write bus request was active in the prior cycle; or b. If a higher priority write bus request was active in the prior cycle; or c. If the board has previously set bus lock, and bus lock is still active.

d. Or, if the board had write bus request active in the prior cycle, and did not win the contention, so that this is just another attempt to win.

2. At the end of the contention cycle, determine if access has been granted, only if no lone data bus request was active, and one or more of the following conditions are true:

a. Win access if no other write bus request was active.

b. Or, if no write bus request had a higher priority, (i.e., came from a lower slot number).

c. Note that if any lone data bus request was active, that the write bus request must wait for another cycle, until none of the data bus requests are active.

3. If a win occurs, and access is achieved, then in the next cycle, the write bus (which is both the address and data bus) can be used by the winner.

The bus access cycles are next considered. Following the foregoing access contention cycles any one of the operations given hereafter may be initiated on the bus.

As example of operations requiring both address and data bus access there is: A WRITE REQUEST CYCLE:

Place a thirty-two bit address, address parity, and address valid on bus; place a thirty-two bit data, seven checkbits, and data valid upon bus; place the three-bit slot ID of the writer (card doing writing) upon bus; place write command upon bus; and expect data acknowledge signal in first subsequent cycle; and if not received, do a complete retry including bus contention.

As example of operations requiring only address bus access there is:

A READ REQUEST CYCLE: Place a thirty-two bit address, address parity, and address valid on the bus; place three-bit sender slot ID (card doing request) on the bus; and expect read acknowledge signal in first subsequent cycle; and if not so received, do a complete retry.

A FIRST SEQUENTIAL READ REQUEST CYCLE: Initially the same steps as in the read request cycle above occur. Next, place a "next" command upon the bus simultaneous with the address valid signal; and expect a next acknowledge signal (coincident with the read acknowledge signal) in the first subsequent cycle. If not received, sequential access is not possible now, but the read of the first requested word can still occur. This successful sequence guarantees that two contiguous read responses shall occur. The first is responsive to the read request, and the second in response to the "next" command.

A CANCEL WRITE OR READ REQUEST CYCLE: A card which has requested a write or a read, including sequential reads, may cancel the request at any time by accessing the address bus and generating a cancel command; place thirty-two bit address, address parity, and address valid on bus; place three-bit slot ID of the sender on the bus; and place cancel command on the bus; no acknowledgement will occur, and the destination has the right to ignore the cancel command, but if not, the destination is saved some needless work. If the destination accepts the cancel, it should cancel all read or write requests still pending, which originated with that sender ID.

As example of operations requiring only a data bus access there is:

A READ RESPONSE CYCLE: Place thirty-two bit data, seven checkbits, and data valid on bus; place three-bit writer ID on bus (card which originally wrote the data to the card now doing read); and place three-bit destination ID on bus (card which requested read); expect data acknowledge in first subsequent cycle, if not, do a complete retry. Note that sender ID is not used here, since it may be used by a coincident read request signal. However, if the read requester has enough motivation and hardware, it can tell from the prior bus contention cycles, which card the data sender is.

AND AN INTERRUPT CYCLE: Place thirty-two bit data, seven checkbits, and data valid on bus; place three-bit writer ID on bus (card generating interrupt); place three-bit destination ID on bus (card being interrupted); place interrupt status signal upon bus; and expect data acknowledge in first subsequent cycle, if not, do a complete retry.

As example of operations requiring either one or both bus accesses there is:

A BUS LOCK CYCLE: This is the same as either the write request or read request cycle previously described and the following: Place bus lock signal on bus. This prevents all other cards from requesting access to the address bus for the next read or write. This allows one card to demand and keep continuous access to the bus indefinitely, with an exception. Another card can cause a clear bus lock signal at any time, which overrides and cancels the existing bus lock. The bus lock signal can only be placed upon the bus by a card which has gained legitimate access to the address bus.

Cycles subsequent to the access cycles are next considered. Such operations, as is seen, do not require either an address or data bus access:

A WRITE REQUEST ACKNOWLEDGE CYCLE: A card which has an address range corresponding to the bus address, responds in first cycle after bus access; response occurs if address valid occurred, plus a data valid, plus a write command, unless the card is busy and cannot accept the request due to more pressing demands. Response is data acknowledge signal.

A READ REQUEST ACKNOWLEDGE CYCLE: A card which has an address range corresponding to the bus address, responds in first cycle after bus access; response occurs if address valid occurred, but no write command, (nor a cancel command) unless the card is busy and cannot accept the request due to more pressing demands. Response is read acknowledge signal.

A FIRST SEQUENTIAL READ REQUEST ACKNOWLEDGEMENT (NEXT) CYCLE: This is the same as read request acknowledgement cycle earlier described, except:

If a "next" command occurred at the same time address valid occurred, then sequential read is requested; if the card is capable of doing sequential reads, then an acknowledgement is necessary; response is a next acknowledge signal, to be coincident with the read acknowledge signal; or ignore this "next" command, if a data acknowledge command also occurred, since the "next" command is ambiguous in that case.

READ DATA (READ RESPONSE) ACKNOWLEDGE CYCLE: A card which matches a destination ID on the bus responds in first cycle after bus access, unless the card is busy and cannot accept the data due to more pressing demands. Response occurs if data valid occurred. The response is data acknowledge signal.

SUBSEQUENT SEQUENTIAL READ REQUEST (NEXT) CYCLE: After an initial sequential read request has been acknowledged, and the first read response has occurred, the requester knows that one more read is still in process. Such a requester can extend the sequence by sending a "next" command with the data acknowledge signal. Thus, if a "next" command is sent with the data acknowledge, then not only the read in process will occur, but another will follow. Furthermore, the requester can continue to send "next" commands with every data acknowledge to extend the sequence indefinitely. After the last "next" command, two read responses will occur before the sequence is terminated. Note, however, that if the requester does not send a "next" command with every data acknowledge, missing one, then the sequence terminates. If the two signals, DATA ACK, & ADDR VALID, occur in the same cycle, then any NEXT command must be ignored, since it could have two sources, either the sender of address, or the receiver of the data. Thus, all cards ignore this ambiguous NEXT. Expect a next acknowledge in the first cycle following the command. If not, the card doing the reading is not capable of any further sequential reads.

SUBSEQUENT SEQUENTIAL READ RESPONSE (NEXT) ACKNOWLEDGE CYCLE: A card, which has previously acknowledged a sequential read and is still in process of doing the read, may respond. The response trigger is that when the read data acknowledge occurred, that coincident with the data acknowledge was a "next" command. Response is not required if the card is not capable of doing any more sequential reads. Response must occur in the first cycle after the command. A response is a "next" acknowledge signal. If the two signals, DATA ACK & ADDR VALID, occur in the same cycle, then any NEXT command must be ignored, since it could have two sources, either the sender of address, or the receiver of the data. Thus, all cards ignore this ambiguous NEXT.

INTERRUPT ACKNOWLEDGE CYCLE: This is the same as read data acknowledge above.

BUS ERROR CYCLE: Any card capable of detecting an illegal combination of bus signals may signal bus error. The bus error signal, however, must be placed upon the bus in the immediately subsequent cycle to the cycle in which the error occurred. Any errors which cannot be immediately detected, such as syndrome checking, must be handled privately by an interrupt.

CLEAR BUS LOCK CYCLE: Any card, at any time, can generate a clear bus lock signal to force a hog off the bus. The hog may then contend for the bus in accordance with the standard rules and, when it has access again, it can again exert bus lock. In the meantime, other boards have had an access.

RESET CYCLE: A reset can be initiated in several ways, but the result is that a reset command is placed on the bus for one or more cycles. Power up is at least one half second long, while all other resets will only cause one cycle of reset to occur. A reset switch circuit will generate this one cycle reset at the end of the switch operation. Individual boards may lengthen the reset internally and will respond differently as system requirements dictate.

Definitional Logic

A description of the signals used within the unit access controller of FIG. 10 aids in understanding the operation of the specific embodiment illustrated. Those signals are presented in mnemonic form, the latter of which also describes the application of leads within the system bus. Master access commands into a given access controller are considered first: these signals originate within the processor unit's master control, which might be issued by a central processor unit CPU, if the unit is a processor board, or by a controller/sequencer if the unit is a memory board.

BDZ, BWZ, and BAZ are the primary access desire commands for the data operation, the write operation and the address operation, respectively. BV represents a desire to use the bus lock feature; CBL represents the command to cancel bus lock command, which originates in another unit. In reference to some future transfer cycle BXT represents the desire to access the bus, the unit is essentially stating it wants to use the bus. Request, access, and bus lock of the immediate prior cycle, which are all registered, synchronous, outputs, strobed by the system clock, are represented as follows:

BXA = No active request had a lower priority (higher slot number),

BXB = No active request had a higher priority (lower slot number),

BXC = There was no active request,

BXD = There was exactly one request active,

BXE = The only active request is me (which is not used nor implemented),

BXF = I had request active,

BXG = I had access active

BXH = I had bus lock (Note: BDH, BWH, and BAH are logically identical).

In the foregoing mnemonics, the letter X represents any of the variables D for Data, W for Write or A for Address. Thus, BXA represents BDA, BWA and BAA mnemonics.

The following refers to the present clock cycle. The reference is to gated outputs, not strobed by the system clock.

BXL = My bus request is active now,

BXM = My access is occurring now,

BN = My bus lock is active,

BXY = (Any one of: BD0–BD7, BW0–BW7, or BA0–BA7) = actual bus request signals, and BLK = System bus lock = from system bus.

Master Equations

Logic equations, represented in customary PAL-type Boolean form are presented to describe the operation of the programmed logic arrays. In all of the equations and comments in which the letter X is used in a three letter combination, such as BXL, the X represents any of the operations denoted by the letters D, A, or W. Thus, BXL may represent universally any of BAL, BDL, or BWL.

Primary access desires and master controls, all of which are latched by system clock. As example, BXT is active lo if access is desired (Master Control BXZ is active lo), or BXT was already enabled (BXZ does not have to stay active after BXT is latched by the system clock).

Further, BXT drops out after the request goes active, if BXL goes lo. Also, for address bus usage, the bus lock must be off, BLK inactive hi, or else enabled from this unit due to BN being active, lo.

These desires stay latched until a request occurs, or until another unit sets the bus lock to active,

```
/BDT := (/BDZ + /BDT * BDL)
/BWT := (/BWZ + /BWT * BWL) * (BLK + /BN)
/BAT := (/BAZ + /BAT * BAL) * (BLK + /BN)
```

Bus Lock Status

The bus lock is set if the master desire control input, BV is ACTIVE LO and the ADDR BUS access is currently active, BAM LO, or if its bus lock was already on, BN ACTIVE LO). Once on, the bus look remains in the on condition until the desire is removed. By use of the system bus, any other unit in the system can disengage the bus lock entered by the given access controller of one computer resource with the cancel bus lock signal, CBL. That is, if CBL goes active lo, BN must go inactive hi.

```
/BN = /BV * CBL * (/BAM + /BN)
/BAH := /BN          ;STORE MY BUS LOCK STATUS
/BLK = /BN           ;OUTPUT IF ENABLED, OTHERWISE
                      JUST INPUT
BLK.TRST = /BN       ;TRISTATE BLK OUTPUT EXCEPT
                      WHEN ACTIVE
```

Bus Access Request Enables

The bus access request enables are active lo within the cycle in which the request is active, and in a cycle prior to the anticipated or expected bus access. These enables may be active in several subsequent sequential cycles.

Activate bus access request enable if desire is active, that is BXT is lo, or if the request was already active, and access has not yet occurred, BXL is active lo and BXM is inactive hi, and a group of conditions is true: the group of conditions is that either some active request has a higher priority, BXB is hi, inactive, or that there was no active bus request, BXC is active lo, or that the subject unit had its request already active, initiated in the prior cycle and carried over, hence, BXF is active lo.

In addition, the group for BDL only has one other possibility, and that is for the case in which there was exactly one request active in the prior cycle, i.e. BDD is active low. Note bus lock is not used in this instance, since BAT & BWT include bus lock considerations. Note also that this function latches, but not from system clock, and unlatches when access occurs.

```
/BDL = (/BDT + /BDL * BDM) * (BDM + /BDC +
        /BDD + /BDF)
/BWL = (/BWT + /BWL * BWM) * (BWB + /BWC +
        /BWF)
/BAL = (/BAT + /BAL * BAM) * (BAB + /BAC +
        /BAF)
```

Latched Bus Access Requests Status From Prior Cycle

This is active in any cycle following a bus request. This would include being active during the actual bus access cycle.

```
/BDF := /BDL         ;STORE REQUEST STATUS
/BWF := /BWL
/BAF := /BAL
```

A Primary Control of Access

These are active lo, during the cycle in which bus access occurs for my unit. Access is allowed, if "my" unit had bus request active in the prior cycle, BXF is active lo, and no active request had a higher priority, BXB is active lo. In addition, the write process has a further limitation, in that there can not have been any active data bus request in the prior cycle, that is, BDC must be active lo. Similarly, the address bus has two choices for BAB active: either there must be a data bus request in the prior cycle, BDC must be inactive hi, or there is no write request in the prior cycle, BWC must be active lo.

Furthermore, the address bus acquisition is automatic, if "my" unit's bus lock is set, regardless of other requests. Note that all other units are locked out during bus lock, since the unit's "desire" latches, BAT, are inhibited by BLK from latching.

These are totally unlatched signals.

```
/BDM = /BDF * /BDB
/BWM = /BWF * /BWB * /BDC
/BAM = /BAF * ((/BAB * (BDC + /BWC)) + /BAH)
```

Latched Bus Access Status From Prior Cycle

These are active lo, in the cycle immediately following a bus access by the subject unit. These are not used within the access controller, but could be used for transfer handshake timing, since they are coincident with the cycle following access.

```
/BDG := /BDM         ;STORE ACCESS STATUS
/BWG := /BWM
/BAG := /BAM
```

Final Access Requests Out To Bus

One of the eight lines activates the bus request, depending upon the slot identification, ID, as S2, S1, or S0 (an alternative and simpler denomination for SLT0, SLT1 & SLT2) if enable is active, BXL is lo, and either the access is not currently active, BXM is hi, or else a request desire is still active, BXT is lo. These lines are pulled hi, as by appropriate bus termination resistors, not illustrated, in a conventional circuit, when inactive.

```
/BX0 = /S2 * /S1 * /S0 * /BXL * (BXM + /BXT)   ;FOR
                                                SLOT 0
                                                ONLY
/BX1 = /S2 * /S1 *  S0 * /BXL * (BXM + /BXT)   ;SLOT 1
/BX2 = /S2 *  S1 * /S0 * /BXL * (BXM + /BXT)   ;SLOT 2
/BX3 = /S2 *  S1 *  S0 * /BXL * (BXM + /BXT)   ;SLOT 3
/BX4 =  S2 * /S1 * /S0 * /BXL * (BXM + /BXT)   ;SLOT 4
/BX5 =  S2 * /S1 *  S0 * /BXL * (BXM + /BXT)   ;SLOT 5
/BX6 =  S2 *  S1 * /S0 * /BXL * (BXM + /BXT)   ;SLOT 6
/BX7 =  S2 *  S1 *  S0 * /BXL * (BXM + /BXT)   ;SLOT 7
```

The first line in the preceding equations represents three different equations, namely:

/BD0 = /S2 * /S1 * /S0 * /BDL * (BDM + /BDT)
/BW0 = /S2 * /S1 * /S0 * /BWL * (BWM + BWT)
/BA0 = /S2 * /S1 * /S0 * /BAL * (BAM + /BAT)

The following equations enable one of eight outputs, while leaving the other seven in "tristate" (open) condition:

BX0.TRST = /S2 * /S1 * /S0     ;ENABLE OUTPUT FOR SLOT 0 ONLY

```
/BXB := /S2 *  /S1 *  /S0
      + /S2 *  /S1 *   S0 * BX0
      + /S2 *   S1 *  /S0 * BX0 * BX1
      + /S2 *   S1 *   S0 * BX0 * BX1 * BX2
      +  S2 *  /S1 *  /S0 * BX0 * BX1 * BX2 * BX3
      +  S2 *  /S1 *   S0 * BX0 * BX1 * BX2 * BX3 * BX4
      +  S2 *   S1 *  /S0 * BX0 * BX1 * BX2 * BX3 * BX4 * BX5
      +  S2 *   S1 *   S0 * BX0 * BX1 * BX2 * BX3 * BX4 * BX5 * BX6
```

BX1.TRST = /S2 * /S1 *  S0     ;SLOT 1
BX2.TRST = /S2 *  S1 * /S0     ;SLOT 2
BX3.TRST = /S2 *  S1 *  S0     ;SLOT 3
BX4.TRST =  S2 * /S1 * /S0     ;SLOT 4
BX5.TRST =  S2 * /S1 *  S0     ;SLOT 5
BX6.TRST =  S2 *  S1 * /S0     ;SLOT 6
BX7.TRST =  S2 *  S1 *  S0     ;SLOT 7

Latched Status of Current Bus Access Requests

```
/BXD := /BX0 * BX1  * BX2  * BX3  * BX4  * BX5  * BX6  * BX7
      + BX0  * /BX1 * BX2  * BX3  * BX4  * BX5  * BX6  * BX7
      + BX0  * BX1  * /BX2 * BX3  * BX4  * BX5  * BX6  * BX7
      + BX0  * BX1  * BX2  * /BX3 * BX4  * BX5  * BX6  * BX7
      + BX0  * BX1  * BX2  * BX3  * /BX4 * BX5  * BX6  * BX7
      + BX0  * BX1  * BX2  * BX3  * BX4  * /BX5 * BX6  * BX7
      + BX0  * BX1  * BX2  * BX3  * BX4  * BX5  * /BX6 * BX7
      + BX0  * BX1  * BX2  * BX3  * BX4  * BX5  * BX6  * /BX7
```

BXA Lo represents that no active request had a lower priority.

```
/BXA :=  S2 *  S1 *  S0
      +  S2 *  S1 * /S0 * BX7
      +  S2 * /S2 *  S0 * BX7 * BX6
      +  S2 * /S1 *  S0 * BX7 * BX6 * BX5
      + /S2 *  S1 *  S0 * BX7 * BX6 * BX5 * BX4
      + /S2 *  S1 * /S0 * BX7 * BX6 * BX5 * BX4 * BX3
      + /S2 * /S1 *  S0 * BX7 * BX6 * BX5 * BX4 * BX3 * BX2
      + /S2 * /S1 * /S0 * BX7 * BX6 * BX5 * BX4 * BX3 * BX2 * BX1
```

The first two lines in the preceding list of equations represents:

/BDA := S2 * S1 * S0
      + S2 * S1 * /S0 * BD7
And also that:

/BWA := S2 * S1 *  S0
      + S2 * S1 * /S0 * BW7
And also that:
/BAA := S2 * S1 *  S0
      + S2 * S1 * /S0 * BA7

ETC. That is, the eight lines shown actually represent three different equations, for data, write and address.

BXB LO represents that no active request had a higher priority. That is, the request was initiated by a unit with a lower slot number.

BXC LO represents there are no active requests, all were high.

/BXC := BX0 * BX1 * BX2 * BX3 * BX4 * BX5 * BX6 8 BX7

BXD LO represents there was exactly one request active (lo).

BXE LO = The only active request is "me", this unit; all others are high, inactive. This feature is not used in the present embodiment but is described for completeness.

```
/BXE := /S2 * /S1 * /S0 * BX7 * BX6 * BX5 * BX4 * BX3 * BX2 * BX1 * /BX0
      + /S2 * /S1 *  S0 * BX7 * BX6 * BX5 * BX4 * BX3 * BX2 * /BX1 * BX0
      + /S2 *  S1 * /S0 * BX7 * BX6 * BX5 * BX4 * BX3 * /BX2 * BX1 * BX0
      + /S2 *  S1 *  S0 * BX7 * BX6 * BX5 * BX4 * /BX3 * BX2 * BX1 * BX0
      +  S2 * /S1 * /S0 * BX7 * BX6 * BX5 * /BX4 * BX3 * BX2 * BX1 * BX0
      +  S2 * /S1 *  S0 * BX7 * BX6 * /BX5 * BX4 * BX3 * BX2 * BX1 * BX0
      +  S2 *  S1 * /S0 * BX7 * /BX6 * BX5 * BX4 * BX3 * BX2 * BX1 * BX0
      +  S2 *  S1 *  S0 * /BX7 * BX6 * BX5 * BX4 * BX3 * BX2 * BX1 * BX0
```

Figure 12:
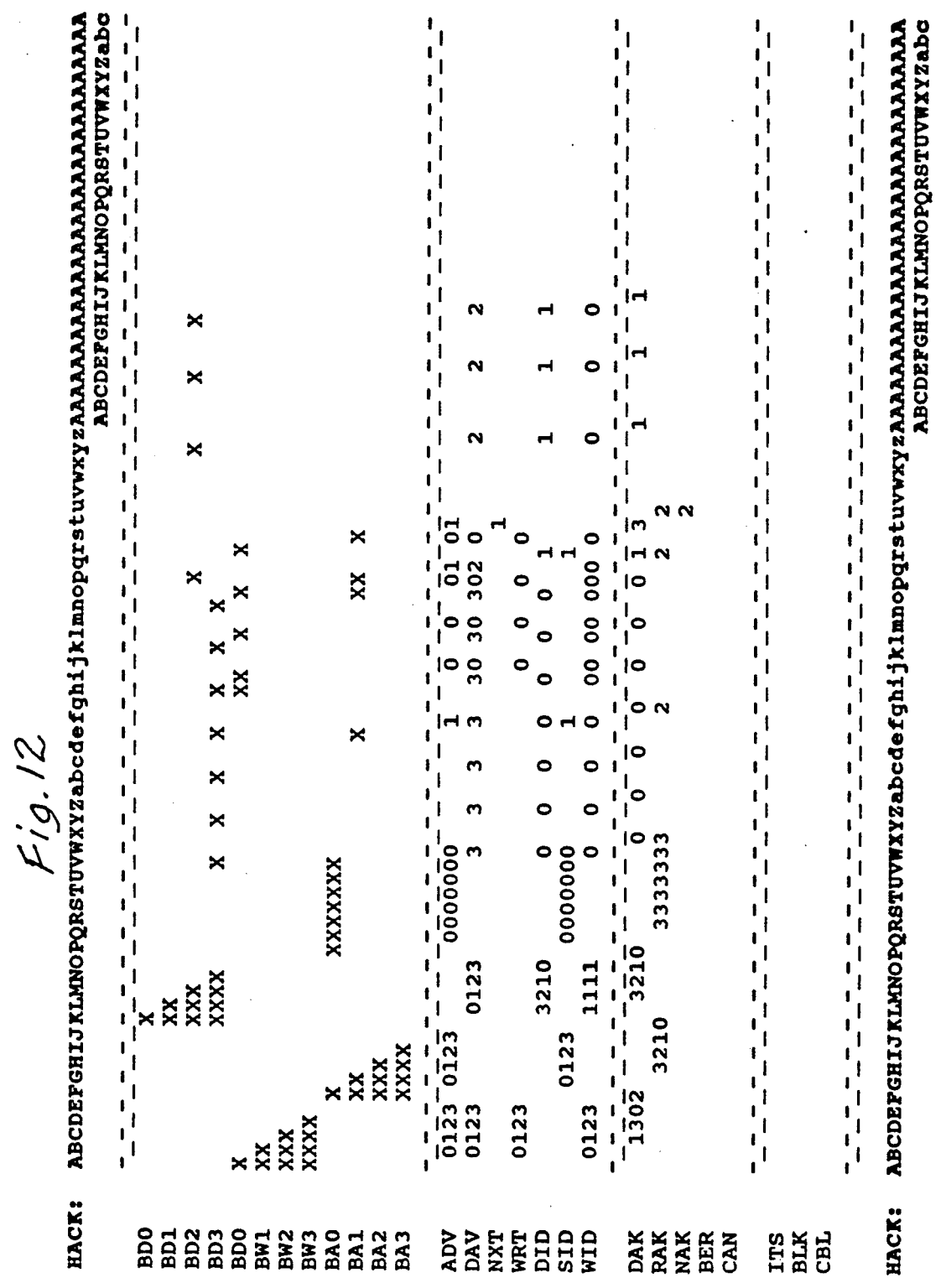

The timing diagram of FIG. 12 shows four boards using the communications bus. Each board is depicted as being a special combination of master and slave, with capabilities to request action from other boards, and also to respond to request from other boards. The board details are not important for these examples. The examples show a possible sequence of signals flowing upon the bus. The priority of bus access is shown on the diagram from top to bottom for the BD, BW, and BA signals.

Preliminary observations are given in respect of the diagram. Cards activating the BD signals normally want to do a read response, or occasionally, an interrupt. Cards activating the BW signals need to do a write request. Cards generating the BA signals normally want to do a read request.

Cards doing a read request put sender ID on the bus. Cards doing a write request put write ID on the bus. Cards doing read response put destination ID on the bus, and also write ID as well, to show the original source of the data. Cards doing an interrupt put destination ID on the bus, and use write ID to show which card is generating the interrupt. In the examples, the write ID shown for read responses is arbitrary, since it cannot be determined from the diagram which card originally wrote the data.

Figure 13:
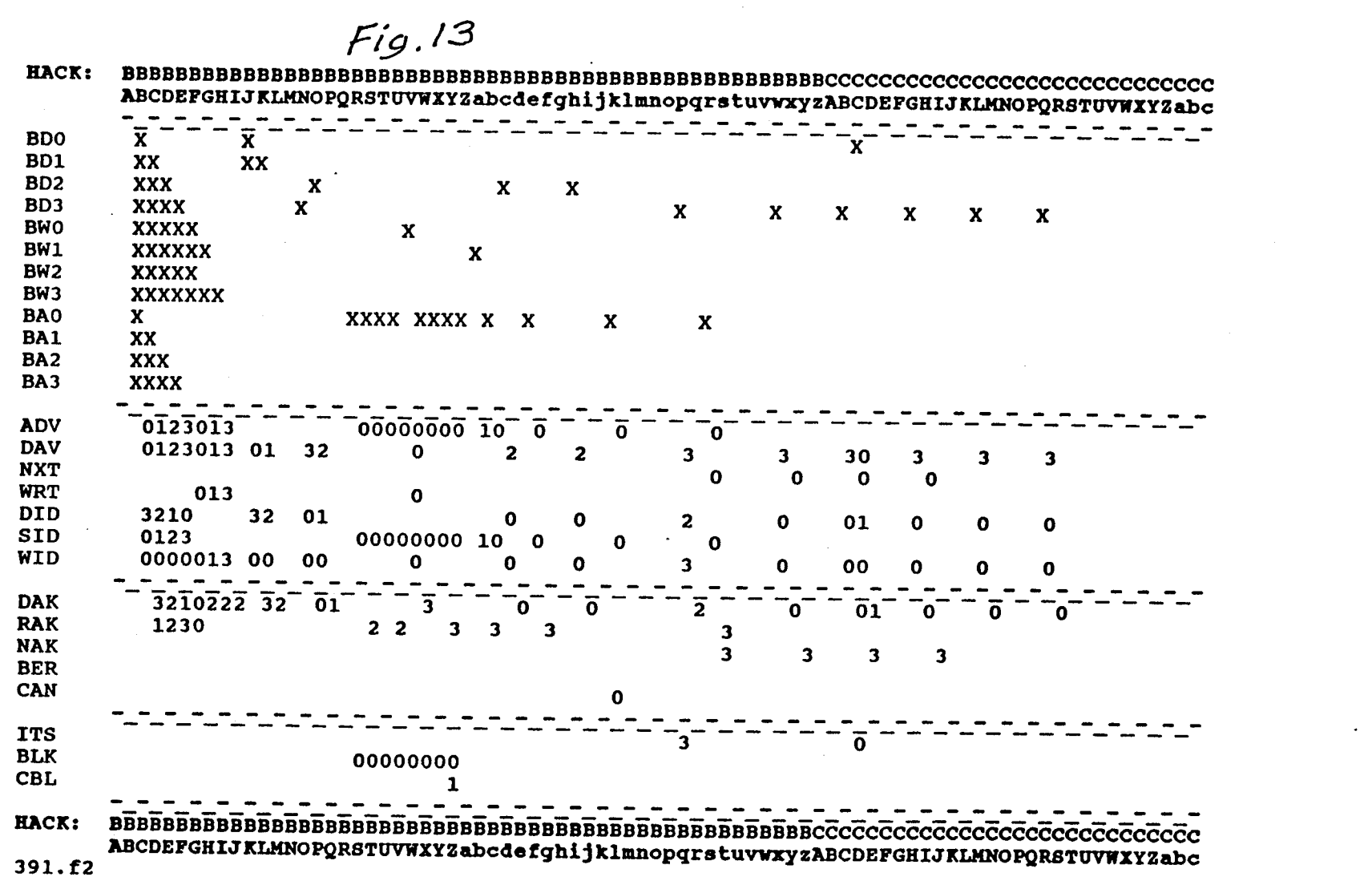

Important items to also note are the usage of the NXT signals, and their acknowledgements, and also in FIG. 13 the BLK, CBL, CAN and ITS signals and their acknowledgements. For instance, the NXT on FIG. 12 shows how one bus access with one address can cause two reads of sequential locations.

In FIG. 13 card zero is shown as setting bus lock, and the card proceeds to hog the bus for eight cycles, attempting to monopolize cards 2 & 3. However, Card 1 "times out", essentially gets tired of waiting, and activates the CBL signal to cancel the bus lock, and force card zero off the bus for one cycle. Note that card zero does not get a response to all of its requests, and is forced to retry. Later, for some reason, card zero decides that it does not need the read requested earlier and so it acquires the bus and activates the CAN signal to cancel the reads in progress.

Card 3 sends an interrupt to card 2 as shown, and later card 0 sends an interrupt to Card 1. Finally, a series of reads requested by a single read address are shown and a series of NXT commands. One address access and four NXT commands acquires five read responses from consecutive locations.

The HACK at the top and bottom of each page provide a means of uniquely identifying each access cycle, for reference purposes. On the diagram, where it is obvious which card is generating the signal, an X indicates the presence of the signal named on the left edge. Otherwise, a number, from 0 to 3, indicates the slot ID of the card generating the signal at that instant in time, except for DID, which indicates the contents of the signals, not its source. Likewise, WID, during a read response, is the contents, not its actuator. But WID, during an interrupt, gives the slot ID of the source. SID always shows both the contents and the source.

In all of the explanations, reference to data implies the associated check bits accompanying the data. Likewise, reference to address implies the associated parity bit accompanying the address Consider next the examples of operations and timing presented in the timing diagram of FIG. 12. As represented at the letter A in the uppermost row of the diagram, the four boards simultaneously request access to do write requests, which requires access to both the data bus and the address bus. Card number 0, which, as earlier described, has the highest priority, wins first access. The remaining three cards, 1, 2, and 3, continue bus request, and, as becomes apparent, achieve access to the bus in sequence. As indicated at B, Card 0 acquires the bus and places address and data upon the two main buses. The card also uses the control bus for address valid, data valid, write command, and places its slot ID upon the WID lines.

Next at C, Card 1 recognizes the address presented at the end of the prior cycle as being an address directed to space contained within Card 1's memory space. Thus, at the end of that cycle, Card 1 receives and latches the address, data and control signals on the bus into registers, enroute to internal circuit memory in the card. At the next cycle, Card 1 places the data acknowledge signal on the bus, thus letting Card 0 know that its write request was successful and commences the actual write process of storing the new data into Card 1's memory at the address location given. In a totally unrelated activity, Card 1 acquires the bus and writes to another card.

At time D, Card 3 recognizes the address from Card 1 and responds accordingly. Card 2 writes to the bus. At E, Card 0 recognizes the address from Card 2 and responds. Card 3, as represented in the figure, writes to the bus. At F, Card 2 recognizes the address from Card 3 and responds. Also, at this time all four cards simultaneously request the address bus. Card 0 wins the contention. The other cards maintain their requests, and each subsequently wins access to the bus in sequence according to the priority, 1, 2, and then 3, at respective times H, I and J.

At time G, Card 0 places an address upon the address bus. The data bus is unused in this cycle. Card 0 also uses the control bus for address valid and places its slot ID upon the SID lines, to show the source of the read request to other cards. At time H, Card 3 recognizes the address placed by Card 0 as its own, and responds with a read acknowledge in that same time interval. Concurrently, Card 1 places a read request and the associated address upon the bus.

At I, Card 2 recognizes the address placed by Card 1 and responds as indicated at row RAK. In a totally unrelated action, Card 2 places a read request on the bus, shown at ADV. Next, at J, Card 1 responds to the read request from Card 2. In this example also, Card 3 generates a read request.

At K, Card 0 responds to the read request made by Card 3. In this example again the four cards simultaneously request the data bus. This is the completion of the four reads just requested in the past few cycles. Note that Card 0 responded in the cycle following the read request, while Card 1 took four cycles to respond. This shows that cards with different access speeds can use the bus without creating problems, an additional advantage. As before, Card 0 wins the contention for the bus.

At L, Card 0 places the read data upon the data bus. The address bus is unused in this cycle. Note that even though Card 0 responded immediately to the read request, it still had one full access cycle of 40 ns to get the read data. Card 0 also uses the control bus for the data valid signal, and places the slot ID of the original requester, Card no. 3, onto the DID lines to alert that board to latch its read data. The original writer's slot ID, Card 1, is placed on the WID lines, showing the source card of the data prior to the write operation.

At time interval M, Card 3 acknowledges the read data from 0. Concurrently, Card 1 does a read response to Card 2. At time N, Card 2 acknowledges the read data from 1 and does a read response to Card 1. Continuing, at time 0, Card 1 acknowledges the read data from Card 2. Concurrently, Card 3 read/responds to Card 0. At P, Card 0 acknowledges the read data from Card 3. Card 0, concurrently, requests the address bus. At Q, Card 0 does a read request. Card 0 requests the address bus again. This repeat operation is allowed during an access by the same board, only in this condition where exactly one request occurred in the prior cycle, i.e., there was no other card requesting the bus.

At R, Card 3 acknowledges the read request. Card 0 does another read request. At times S, T, U, V: by way of example, the sequence of read requests given at time interval R is simply repeated. At time V, Card 3 now requests the data bus and wins the bus, as no higher priority card has issued a request simultaneously. At time W, Card 3 reads/responds to Card 0, from the request placed in time cycle Q, earlier described. Concurrently, Card 0 does another read request. And at X, Card 3 acknowledges the read request. Card 0 simultaneously acknowledges the read data from Card 3.

At cycle Y, Card 3 requests the address bus. At Z, Card 3 does a read response to Card 0, responding to the earlier request presented at time R, earlier described. At a, Card 0 acknowledges the read data. At times b, c, and d, the operation presented is similar to that which occurred at times Y, Z, and a.

At time e, Card 3 requests the data bus. Concurrently, Card 1 requests address bus. Both cards simultaneously win the respective bus's. At time f, Card 3 does a read response to Card 0 while card 1 does a read request. At g, Card 0 acknowledges read data from Card 3. Concurrently, Card 2 acknowledges read request from Card 1. At h, Card 3 requests the data bus, and Card 0 simultaneously requests the write bus. As illustrated that contention is won by Card 3.

At time i, Card 3 does a read response to Card 0, completing operations initiated at Time V. Card 0 continues to request the write bus and finally wins the bus. At j Card 0 acknowledges read data from Card 3. And Card 0 does a write to the bus. At k, there is no response to the write request from Card 0 at this time. The destination is busy, as example. Card 3 requests data bus. And at 1, Card 3 does a read response to Card 0, completing the process from time U. Card 0 requests the write bus and wins the bus. At time m, Card 0 acknowledges the read data from Card 3, while Card 0 does a write to the bus.

At n, there is still no response to the write request placed on the bus by Card 0 and, as example, the destination remains busy. Card 3 requests the data bus and wins access. At o, Card 3 does a read response to Card 0, from cycle W. This completes the sequence of the seven read requests which Card 0 placed. It also frees Card 3, which has been so busy working off the list that it has been unable to respond to other requests. Card 0 requests the write bus and, simultaneously, Card 1 requests the address bus. Card 0 wins the contention for bus access.

At p, Card 0 "handshakes", acknowledges the last read data. Concurrently, Card 0 does a write to the bus, Card 2 requests the data bus, and, as is shown, Card 1 continues to request the address bus. Both cards win access to the respective data and address portions of the bus.

At time q, there is still no response to the write requested by Card 0, and, as is shown, Card 3 is still recovering. Card 1 does a read request. Card 2 does a read response to Card 1, from Step f. Note the necessary usage of all three identification buses in this cycle: Bus DID, SID, & WID. At time r, Card 1 acknowledges the read data; Card 2 acknowledges the read request; and Card 0 requests the write bus for another retry.

At s, Card 0 writes to the bus. Simultaneously, Card 1 requests the address bus. At time t, Card 3 acknowledges the write from Card 0. As shown, there were four retries from Card 0 before the acknowledgement. Card 1 does a read request, and accompanies it with a "next" command, requesting a second read, at the subsequent address, to follow the first. And at time u, Card 2 acknowledges the read request, and also acknowledges the next request as well.

In time intervals labeled v through AJ, Card 2 responds to the two read requests and the next request from Card 1 with three read responses. The read requests were initiated from operations which earlier occurred at times q and t. Card 1 acknowledges each read data response.

It is believed that the foregoing examples of operation of the bus is alone sufficient to demonstrate the increased utilization of the bus, the enhancement in efficiency achieved. While the examples of operations were arbitrarily selected they are typical and should assist those skilled in the art to understand the invention. For those less skilled an additional example may aid in understanding. Thus, reference may be made to FIG. 13, which is considered in connection with the additional description that follows.

Initially at time BB, all cards or boards simultaneously request every possible bus. This is an unlikely event, since each board would need to have three separate controllers, working on three separate projects to require three requests simultaneously. However unlikely, that event is not impossible, nor prohibited by the bus architecture. BD0 has highest priority, and wins bus access. However, BA0 can also win, since BD0 has shut out BW0, and BD0 only needs the data bus. So BA0 is simultaneously granted the address bus.

At time BC, Card 0 uses the address bus to do a read request; Card 0 uses the data bus to do a read response to Card 3 in this example resulting from some prior request not identified in the figure. Line DID holds read response destination ID; Line SID holds read requester ID; and Line WID holds the ID of the original writer of the read data. Other bus requests continue. Requests BD1 and BA1 win access.

At BD: Card 3 acknowledges read data from Card 0. Card 1 acknowledges read request from Card 0, Card 1 does read request, and Card 1 does a read response to Card 2. Requests BD2 and BA2 win next. At BE, Card 2 acknowledges read data from Card 1, Card 2 acknowledges a read request from Card 1, Card 2 does a read request, and Card 2 does a read response to Card 1 in this time interval. BD3 and BA3 win next.

At BF, Card 1 acknowledges read data from Card 2. Card 3 acknowledges read request from Card 2, Card 3 does a read request, and Card 3 does a read response to Card 0. All four cards maintain requests for the write bus, which Card 0 ultimately wins. At BG, Card 0 acknowledges read data from Card 3, acknowledges read request from Card 3 and writes to the bus. In this example, at this interval BW2 gave up waiting for the write bus, for reasons not described, but BW1 and BW3 continue to request access. Card 1 wins access as shown, the card having the higher priority.

At BH, Card 2 acknowledges the write request from Card 0. Card 1 writes to the bus. Card 3 wins access to write bus next. At time BI, Card 2 acknowledges the write request from Card 1. Card 3 simultaneously writes to the bus. At time BJ, Card 2 acknowledges the write request from Card 3. Cards 0 and 1 request the data bus, which Card 0 wins. At BK, Card 0 responds to the read request from Card 3 made by the latter in step BF. Card 1 wins data bus next.

At time BL, Card 3 acknowledges the read data from Card 0. Card 1 responds to the read request from 2 in interval BE, preceding. At BM, Card 2 acknowledges the read data from Card 1. At BN, Card 3 requests the data bus. At BO, Card 3 responds to the read request from Card 0 in interval BC. Simultaneously, Card 2 requests the data bus. At BP, Card 0 acknowledges data from Card 3. Card 2 responds to a read request from Card 1 made in interval BD. At BQ, Card 1 acknowledges data from Card 2. At time BR, Card 0 requests address bus.

At intervals BS, BT, BU and BV the following occurs: Card 0 does four consecutive read requests, using bus lock to maintain exclusive control of the bus. In this sequence, two requests are acknowledged by Card 2, and two are not.

At interval BW, while maintaining the bus lock, Card 0 now does a write. At BX, Card 3 acknowledges the write from Card 0. As illustrated, Card 0 continues bus lock, and does another series of read requests. At BY, Card 0 continues bus lock. No read acknowledgement is given. So Card 0 tries again. At BZ, Card 0 continues bus lock. Card 3 acknowledges the read from Card 0. Card 0 does another read request. Card 1 activates clear bus lock command, overriding Card 0's bus lock, and forcing Card 0 off the bus. Card 1 then requests the write bus.

At time Ba, there is no access to the bus. Card 0 cannot contend for the bus in this cycle, so Card 1 wins access next. At time Bb: Card 1 does a read request. It may be noted that Card 1 can use both the address and data buses, since it won a write request that allows access to both buses, but instead the card chooses to use only the address bus. Intelligence built into the logic of the card perhaps determined the possibility of a conflict during its read. It is, however, legal for the card to request both buses, and then only use one, or use either if it desired. Card 0 requests address bus.

At time Bc, Card 3 acknowledges the read request from Card 1. Card 0 does a read request. And Card 2 requests the data bus. At BD, Card 2 responds to the read request from Card 0 presented earlier in cycle BT. At time Be, Card 0 acknowledges the read data. Simultaneously Card 0 also requests the address bus. As shown at time Bf, Card 0 does a read request. And at time Bg, Card 3 acknowledges the read request from Card 0.

At time Bh, Card 2 requests data bus. At Bi, Card 2 responds to the read request from Card 0 initiated during interval BV. At Bj, Card 0 acknowledges the read data and at time Bk, Card 0 requests the address bus. Card 0 at time Bl, does a CANCEL command, broadcasting an address and its slot identification ID. A board which recognizes the address, in this example Card 3, should clear its queue of any writes or reads still in process, which originated with Card 0. No acknowledgement is necessary.

At time intervals Bm, Bn, and Bo, No action is being taken by any of the cards. At Bp, Card 3 requests the data bus. Subsequently at the next interval, time Bq, Card 3 sends an interrupt to Card 2 by sending data, destination ID, writer ID, and the interrupt status signal. In turn, at time Br, Card 2 acknowledges the interrupt from Card 3. Concurrently Card 0 requests the address bus. At Bs, Card 0 does a read request, and accompanies it with a "next" command. Then at Bt, Card 3 acknowledges the read request and the next command. During the time intervals Bu through Bw, as illustrated no action is taken by any card.

At interval Bx, Card 3 responds to the read request from Card 0. Then at By, Card 0 acknowledges the read data from Card 3, and also sends a next command, which extends the read sequence. At Bz, Card 3 acknowledges the next command. During intervals CA through CJ, two additional read responses and next commands are performed, which is similar to the events during the preceding intervals Bw-Bz.

At CD, Card 0 sends interrupt to Card 1. Next, at CE, Card 1 acknowledges the interrupt. During intervals CM through CS, Card 3 responds to last two next commands from Card 0. In turn Card 0 acknowledges the read data but does not send any more next commands. So the entire sequence was one read request and four next commands, achieving a total of five reads from Card 3.

The terms "processor unit" or "processor resource" as sometimes used herein and in the appended claims describes or covers in few words, as definition, the many different kinds of computer elements and peripherals employed in a data processor system, the variety of which was earlier discussed; they are terminologies generic to all such devices, notwithstanding the fact that individually such devices have different capabilities and functions. Likewise the term "processor means" is used in a like sense, as being a processor resource that contains a processing unit; and a memory means, a processor resource that contains memory and serves in the resource as a bank for digital information. All, however, are permitted to send along and/or receive digital information from the communication bus. The foregoing includes all manner and combinations of interface boards, CPU boards, memory boards and any other computer subsystem or peripheral which might be attached to a communication or system bus.

As the skilled reader appreciates, the use of the 25 MHz system clock as provides a 40 nanosecond clock pulse was selected in the preferred embodiment for the time slots for the communications bus and somewhat pushes the state of technology. The time slots may be made to be of greater duration by substituting a slower clock; one for example as would permit 60 nanosecond time slots and need not use the system clock. As semiconductor technology advances further, it may also be permissible to substitute faster system clocks to reduce the time slot to under 40 nanoseconds.

In the preceding embodiment the improvement was implemented in the form of communication bus commonly referred to as a system bus. The invention however has wider application and may be implemented within other types of computer systems buses as well, such as with an input output bus, if improved efficiency is a predominant consideration in the particular application.

Digital information may be transmitted in media different from electrical leads. The most conventional media at present is the electrical conductor electrical leads as described in the preferred embodiment, by means of which the voltage "hi" or "lo" signals, representing digital data, are thereby propagated between elements in the computer system. However, transmission systems employing fiber optic cables are being introduced as substitute, as known to those skilled in the art, for use as transmission media. Instead of electrical current and voltage, the fiber optic media transmits light. In that instance the electrical signals generated in the computer system are appropriately converted into on and off flashes of light, corresponding to the hi and lo states of the electrical voltage. Light pulses so formed and applied travel along the optical communications leads, referred to as fibre optic cable, to convey the appropriate digital information at the lines other end, and, suitably, is reconverted from the optical form to the electrical form for use by the semiconductor digital circuits that require electrical voltages and currents. In addressing the present subject, a specific embodiment is described which employs electrical leads and electrical signals. However, as those skilled in the art appreciate, it is understood that the invention is not so limited and that other forms of communications bus media, such as optical fiber optic cables, serve as equivalents to the electrical media and may be substituted in alternative embodiments.

In the present system a processor resource is permitted to send two or more successive requests, which may all go out to one or more responders, before even the first response is generated. For instance, processor 1 sends four successive read requests to memory 4, and then a read request to memory 2, and then a write request to memory 7. Meanwhile, memory 4 is sending a series of responses to processor 2, coincident with all of the requester activity. Next, memory 7 accepts the write request, and memory 2 sends a read response to the read request. Eventually, memory 4 gets around to sending the read responses back to processor 1. The order of the responses and the identity of the bus users is mixed, and the system does not require a specific processor resource to be tied into only one request or response until satisfied.

Every bus access is forced to be completed in the same, precise, minimal time period. This rigor maximizes thruput over the bus. One transfer is completed in one system clock cycle.

The processor resource responding needs to know where to send the response, since the original access is long over. The requesting card sends identification along with the request, which allows the responder knowledge of where to send the response. This is possible by the inclusion of the processor resource's ID, which is encoded in three bits. The requester's ID is stored along with write data in memory, and then that original writer's ID is passed along to every future read requester. This adds an audit trail to the system, at very little cost, since the write requester has the mechanism to send its ID already built in for the earlier consideration. While not essential to bus thruput, it adds significant value to a system from a debugging viewpoint.

The read request only uses the Address bus, and a few control lines, while the read response uses the data bus and some control lines. Furthermore, these two operations can be made totally independent, and, in addition, they can be occurring simultaneously. This allows the full bus band width to be in use at all times if necessary, making the bus thruput 100 percent. Independent, simultaneous usage of the address and data buses optimizes transfers. One access being requested on the address lines simultaneously with another totally unrelated access being concluded on the data lines, is a very powerful mechanism, and essential to maximizing total thruput.

A compilation of the mnemonics and their meaning alphabetically arranged is included herein as an assistance to the reader in Appendix 4.

The Appendices follow in this specification.

Appendix 1

Status Words

The thirty two bit status words generated in the auxiliary controller transceiver/registers of Fig. 9A and 9B are composed as follows.

Bus Auxiliary Status Word.

| BIT No. | Name | READ OR WRITE | FUNCTION |
| --- | --- | --- | --- |
| 0 | SLT0 | READ ONLY | HARD-WIRED SLOT NUMBER IDENTIFICATION |
| 1 | SLT1 | READ ONLY | HARD-WIRED SLOT NUMBER IDENTIFICATION |
| 2 | SLT2 | READ ONLY | HARD-WIRED SLOT NUMBER IDENTIFICATION |
| 3 | DLD0 | RE#D ONLY | DEST1NATION UN1T IDENTIFICATION |
| 4 | DLD1 | READ ONLY | DESTINATION UNIT IDENTIFICATION |
| 5 | DLD2 | READ ONLY | DESTINATION UNIT IDENTIFICATION |
| 6 | SLD0 | READ ONLY | READ REQUESTER UNIT IDENTIFICATION |
| 7 | SLD1 | READ ONLY | READ REQUESTER UNIT IDENTIFICATION |
| 8 | SLD2 | READ ONLY | READ REQUESTER UNIT IDENTIFICATION |

| BIT | NAME | READ OR WRITE | FUNCTION |
|---|---|---|---|
| 9 | WLD0 | READ ONLY | WRITER UNIT IDENTIFICATION |
| 10 | WLD1 | READ ONLY | WRITER UNIT IDENTIFICATION |
| 11 | WLD2 | READ ONLY | WRITER UNIT IDENTIFICATION |
| 12 | SSO | READ ONLY | SOFT RESET |
| 13 | SWR | READ ONLY | SYSTEM FAIL WARNING RESET |
| 14 | SRP | READ ONLY | POWER UP RESET |
| 15 | SSR | READ ONLY | RAW RESET SWITCH |
| 16 | SDA | READ ONLY | DATA ACKNOWLEDGE ERROR |
| 17 | SRA | READ ONLY | READ REQUEST ACKNOWLEDGE ERROR |
| 18 | SNA | READ ONLY | NEXT REQUEST ACKNOWLEDGE ERROR |
| 19 | SDO | READ ONLY | INCOMING DATA OVERRUN |
| 20 | SAO | READ ONLY | INCOMING ADDRESS OVERRUN |
| 21 | SWT | READ ONLY | LASTADDRESS IN WAS A WRITE, NOT A READ REQUEST |
| 22 | SIT | READ ONLY | LAST DATA IN WAS AN INT., NOT A READ RESPONSE OR WRT |
| 23 | SBL | READ ONLY | BUS LOCK |
| 24 | SBE | READ/WRITE | BUS ERROR |
| 25 | SCB | READ/WRITE | CANCEL BUS LOCK |
| 26 | SCA | READ/WRITE | CANCEL ALLREAD/WRITE REQUESTS |
| 27 | SNX | READ/WRITE | NEXT (BURST MODE) REQUEST |
| 28 | SPARE | | |
| 29 | DED0 | WRITE ONLY | DESTINATION ID FOR OUTGOING INTERRUPT |
| 30 | DED1 | WRITE ONLY | DESTINATION ID FOR OUTGOING INTERRUPT |
| 31 | DED2 | WRITE ONLY | DESTINATION ID FOR OUTGOING INTERRUPT |

The Main Status Word generated in the status latch 63 of Figure 4 is composed as follows:

| BIT | NAME | READ OR WRITE | FUNCTION |
|---|---|---|---|
| 0 | STA | READ ONLY | AUXILIARY STATUS HAS CHANGED |
| 1 | IAA | READ ONLY | INCOMING ADDRESS IS AVAILABLE |
| 2 | SWT | READ ONLY | LAST ADDRESS IN WAS A WRITE, NOT A READ REQUEST |
| 3 | IDA | READ ONLY | INCOMING DATA IS AVAILABLE |
| 4 | SIT | READ ONLY | LAST DATA IN WAS AN INTERRUPT, NOT A READ RESPONSE OR WRT |
| 5 | SBE | READ ONLY | BUS ERROR |
| 6 | SPARE | " | |
| 7 | SPARE | " | |
| 8 | MX0 | READ ONLY | WAIT/INTERRUPT MODE |
| 9 | MX1 | " | " |
| 10 | MX2 | " | " |
| 11 | BAA | READ ONLY | ADDRESS BUS ACCESS STATUS |
| 12 | BAB | " | " |
| 13 | BAF | " | " |
| 14 | BAG | " | " |
| 15 | BAM | " | " |
| 16 | BAL | " | " |
| 17 | BAT | " | " |
| 18 | BWA | " | WRITE PROCESS ACCESS STATUS |
| 19 | BWB | " | " |
| 20 | BWF | " | " |
| 21 | BWG | " | " |
| 22 | BWM | " | " |
| 23 | BWL | " | " |
| 24 | BWT | " | " |
| 25 | BDA | " | DATA BUS ACCESS STATUS |
| 26 | BDB | " | " |
| 27 | BDF | " | " |
| 28 | BDG | " | " |
| 29 | BDM | " | " |
| 30 | BDL | " | " |
| 31 | BDT | " | " |

Appendix 2

Memory Controller Operation

A hypothetical memory controller's sequence of operation, which might be stored in the memory command decoder of Fig. 5 is conveniently described by the program which follows:

```
1.      SET COUNT TO RETRY LIMIT (20)
2.      IF BUS ERROR (SBE) IS SENSED, THEN GO TO 700
3.      IF A STATUS CHANGE IS SENSED, THEN GOTO 800
4.      IF INCOMING ADDRESS IS AVAILABLE, GOTO 100
5.      IF INCOMING DATA IS AVAILABLE GOTO 300
6.      GOTO 1

100.    IF ADDRESS WAS FOR WRITE, GO TO 200
101     MUST BE READ REQUEST
102.    LATCH INCOMING SOURCE ID (LID0-2)
103.    ENABLE THE ADDRESS TO MEMORY   (ELA)
104.    COMMAND MEMORY TO READ
105.    GOTO 120

120.    IF MEMORY READ IS NOT FINISHED GOTO 120
121.    LATCH MEMORY READ DATA (LLD)
122.    SEND LATCHED SOURCE ID OUT AS A DESTINATION ID
        LID0-2 GOES TO DES0-2
123.    GOTO 130

130.    START DATA BUS ACCESS (BDZ)
131.    GOTO 140

140.    WAIT FOR BUS ACCESS TO COMPLETE:
        IF NOT BDG GOTO 140
141.    IF A BUS ERROR (SBE) IS SENSED GOTO 700
142.    IF ACKNOWLEDGE ERROR (SDA) IS SENSED GOTO 160
143.    DONE, GOTO 1

160.    DECREMENT THE RETRY COUNT
161.    IF COUNT <= 0, GOTO 900
162.    GOTO 130

200.    MUST BE WRITE REQUEST
201.    SEND ADDRESS TO MEMORY
202.    SEND DATA TO MEMORY
203.    SEND CHECKBITS TO MEMORY
204.    SEND WRITER ID TO MEMORY
205.    COMMAND MEMORY TO WRITE
206.    GOTO 210

210.    IF MEMORY WRITE IS NOT FINISHED, GO TO 210
211.    DONE, GOTO 1

300.    IF DATA WAS NOT FOR AN INTERRUPT (SIT), GOTO 400
301.    MUST BE AN INTERRUPT INPUT
302.    ENABLE INCOMING DATA TO THE INTERRUPT DECODER
303.    DECODE INTERRUPT
304.    GOTO DECODED INTERRUPT SEQUENCE ADDRESS

400.    THIS WOULD BE FOR A READ RESPONSE PROCESS
401.    BUT A SIMPLE MEMORY BOARD WOULD NEVER INITIATE A READ
        REQUEST, AND THUS WOULD NEVER GET A READ RESPONSE
700.    BUS ERROR PROCESSING AND RECOVERY ROUTINES
800.    STATUS CHANGE PROCESSING AND RECOVERY ROUTINES
900.    RETRY EXHAUSTED PROCESSING AND RECOVERY ROUTINES
```

Appendix 3 - Bus Line-Group Usage

|  | AX | DX | BDY | BAY | BWY | ADV | DAV | NXT | WRT | DID | SID | WID | DAK | RAK | NAK | BER | CAN | ITS | BLK | CBL | SUP | SOI |
|---|---|---|---|---|---|---|---|---|---|---|---|---|---|---|---|---|---|---|---|---|---|---|
| I. BUS ACCESS CONTENTION CYCLES: | | | | | | | | | | | | | | | | | | | | | | |
| A. DATA BUS OR SUPERVISOR REQUEST | X | | | | | | | | | | | | | | | | | | | | | |
| B. ADDRESS BUS REQUEST | | | X | | | | | | | | | | | | | | | | | | | |
| C. WRITE BUS REQUEST | | | | | X | | | | | | | | | | | | | | | | | |
| II. ACCESSES USING BOTH BUSES: | | | | | | | | | | | | | | | | | | | | | | |
| A. WRITE REQUEST | X | X | | | | X | X | | X | | | X | | | | | | | | | | |
| B. WRT REQUEST WITH BUS LOCK | X | X | | | | X | X | | X | | | X | | | | | | | X | | | |
| C. SUPERVISORY WRITE REQUEST | X | X | | | | X | X | | X | | | X | | | | | | | | | X | |
| D. 64-BIT INTERRUPT | X | X | | | | X | X | X | X | | | X | | | | | | X | | | | |
| E. 64-BIT DATA TRANSFER | X | X | | | | X | X | | | X | X | | | | | | | | | | | X |
| III. ACCESS USING ONLY ADDRESS BUS: | | | | | | | | | | | | | | | | | | | | | | |
| A. READ REQUEST | X | | | | | X | | | | X | | | | | | | | | | | | |
| B. RD REQUEST WITH BUS LOCK | X | | | | | X | | | | X | | | | | | | | | X | | | |
| C. 1ST SEQUENTIAL RD. REQUEST | X | | | | | X | | X | | X | | | | | | | | | | | | |
| D. CANCEL WRT OR RD REQUEST | X | | | | | X | | | | X | | | | | | | X | | | | | |
| IV. ACCESSES USING ONLY DATA BUS: | | | | | | | | | | | | | | | | | | | | | | |
| A. READ RESPONSE | | X | | | | | X | | | X | X | | | | | | | | | | | |
| B. MASKABLE INTERRUPT | | X | | | | | X | | | X | X | | | | | X | | | | | | |
| V. CYCLES SUBSEQUENT TO ACCESS CYCLES: | | | | | | | | | | | | | | | | | | | | | | |
| A. WRITE REQUEST ACKNOWLEDGE | | | | | | | | | | | | | X | | | | | | | | | |
| B. READ REQUEST ACKNOWLEDGE | | | | | | | | | | | | | | X | | | | | | | | |
| C. 1ST SEQUENTIAL RD REQ. ACK. | | | | | | | | | | | | | | X | X | | | | | | | |
| D. READ RESPONSE ACK | | | | | | | | | | | | | X | | | | | | | | | |
| E. SUBSEQUENT RD. REQUEST (NEXT) | | | | | | | | X | | | | | X | | | | | | | | | |
| F. SUBSEQUENT RD REQ ACK | | | | | | | | | | | | | | | X | | | | | | | |
| G. INTERRUPT ACK | | | | | | | | | | | | | X | | | | | | | | | |
| H. BUS ERROR | | | | | | | | | | | | | | | | X | | | | | | |
| I. CLEAR BUS LOCK | | | | | | | | | | | | | | | | | | | | X | | |
| VI. SPECIAL SUPERVISORY CYCLES WITH NO DATA OR ADDRESS: | | | | | | | | | | | | | | | | | | | | | | |
| A. DIRECTED NON-MASKABLE INTERR. | | | | | | | | | | X | X | | | | | | X | | | | X | |
| B. DIRECTED RESET TO ONE UNIT | | | | | | | | | | X | X | | | | | | | | | | X | X |

MNEMONICS - DESCRIPTION

```
AX  = ADDRESS BUS & PARITY
DX  = DATA BUS & CHECKBITS
BDY = DATA BUS REQUEST LINES
BAY = ADDRESS BUS REQUEST LINES
BWY = WRITE BUS REQUEST LINES
ADV = ADDRESS VALID
DAV = DATA VALID
NXT = BURST MODE READ OR WRITE REQUEST
WRT = WRITE COMMAND
DID = ENCODED DESTINATION ID LINES
SID = ENCODED SENDER ID LINES
WID = ENCODED WRITER ID LINES
DAK = DATA RECEIVED ACKNOWLEDGEMENT
RAK = READ REQUEST ACCEPTED ACKNOWLEDGEMENT
NAK = SEQUENTIAL READ REQUEST ACCEPTED ACKNOWLEDGEMENT
BER = BUS ERROR OBSERVED IN THE PREVIOUS CYCLE
CAN = CANCEL ALL OUTSTANDING READS AND WRITES FROM THIS SENDER ID
ITS = DATA ON BUS IS AN INTERRUPT
BLK = ADDRESS BUS IS LOCKED
CBL = FORCE OVERRIDE (CANCEL) BUS LOCK
SUP = SUPERVISORY OVERRIDE CONTROL
SOI = SOFTWARE RESET OR INTERRUPT STATUS
```

GENERAL RESETS, WHICH USE RST AND ALSO WRN, SOI, PRP, AND SRS IN VARIOUS COMBINATIONS ARE NOT ILLUSTRATED IN THE CHART.

Appendix 4
Compendium of Mnemonic Terms used in the Drawings
In Alphabetical Order

```
A0-A31 Bus Address Lines, also generally AY
ACA A to B Clock for Address Register
ACB B to A Clock for Address Register
ACD Data Acknowledge prior to driver
ACR Read Acknowledge prior to driver
ACN Next Acknowledge prior to driver
ADI Direction for Address Register
ADP Address Parity
ADV Address Valid
AMT Bus Address Match
AOE Enable Address Register Output
AOV Address Overrun Error
```

ASA  A Side Select for Address Register
ASB  B Side Select for Address Register
AST  Address Strobe
AVE  Address Valid Enable
AY   Address Lines (collectively), Also A0-A31 & ADP
BA0-BA7 Address Request leads
BAG  Last Cycle Was My Address Access
BAL  Address Request Active
BAM  Address Access Now
BAT  Address Access Desire
BAX  Address Bus Request Lines, also BA0-BA7
BAZ  Do Read from Bus
BD0-BD7 Data Request leads
BDG  Last Cycle Was My Data Access
BDL  Data Request Active
BDM  Data Access Now
BDT  Data Access Desire
BDX  Data Bus Request Lines, also BD0-BD7
BDZ  Send Bus Read Response or an Interrupt
BER  Bus Error observed in the previous cycle
BLK  Address Bus is Locked
BN   Bus Lock Active
BNG  Last Cycle had a NXT command
BV   Desire Bus Lock
BW0-BW7 Write Request leads
BWG  Last Cycle was My Write Access
BWL  Write Request Active
BWM  Write Process Access Now
BWT  Write Address Desire
BWZ  Write to Bus
BXA  See Boolean Equations in text for Access Controller
BXB  "
BXC  "
BXD  "
BXE  "
BXF  "
BXG  Bus Access in Prior Cycle (combines BDG, BAG & BWG)
BXL  collectively BDL, BAL & BWL
BXM  Bus Access Now (combines BDM, BAM & BWM)
BXT  collectively BDT, BAT & BWT
C1-C4 & C1N-C4N System Clock and Other Timing Signals
CAN  Cancel all outstanding reads and writes from this Sender ID
CBL  Cancel (Clear) Bus Lock
CL0-CL7 Local Clocks, same as CLY
CL3  System Clock, one of clocks CL0 through CL7
CLD  Force Override, Cancel Bus Lock Desire
CLY  Local Clocks, same as CL0-CL7
CNT  Count -Master Contr., Comm. Decoder Retry Cntr Incr't Com'd
CRY  Carry -Master Contr., Comm. Decoder Retry Counter Carry Out
D0-D31 Bus Data Lines, same as DY
DAK  Data Received Acknowledgement
DAV  Data Valid
DCA  A side latch, A-to-B Clock, Data Register Controls
DCB  B side latch, B-to-A Clock  Data Register Controls
DDI  Data Register Direction Control
DED0-DED2 Destination ID for Interrupts Out, same as DEDY
DES  Destination ID for Read Response
DES0-DES2 Destination ID leads, same as DESY
DESY Destination ID for Read Responses, same as DES0-DES2
DEX0-DEX2 Destination ID prior to Output Driver
DID0-DID2 Encoded Destination ID Lines
DIDY Same as DID0-DID2
DIN  Decode Interrupt from Data Output Sequence Address
DMT  Bus Destination ID Match
DOE  Output Enable, Data Register Control
DOV  Data Overrun
DS0-DS6 Data Checkbits, seven bits of data checking
DSA  Lo=Direct, A-to-B Select -Data Register Control
DSB  Hi=Latch, B-to-A Select -Data Register Control DST Local Data Strobe
DVE Data Valid Enable
DY  Data Bus and Checkbits
EAD Enable Address to Local Data Bus
EDI Enable Destination ID Out
EID Enable Writer ID to Memory
ELA Enable Address to Local Address Bus
ELD Enable Data to Local Data Bus
ERI Select Read Response Destination
ERW Select Read Response ID
ESI Enable Source ID Out
ESL Enable Status to Local Data Bus
EST Enable Auxiliary Status to Local Data Bus
EWI Enable Write ID Out
GAV ADV Command before Driver
GBE Bus Error Out before Driver
GBL BLK Command before Driver
GCA Cancel Command before Driver
GCB Clear Bus Lock Command before Driver
GDV DAV Command before Driver
GIT Interrupt Status Out before Driver
GND Ground
GNX Next Command Out before Driver
GSU SUP Command before Driver
GWR Write Out before Driver
IA0-IA31 Internal Address Bus
IAA Incoming Latched Address is Available
IDA Incoming Latched Data is Available
IN1 Interrupt Level 1, prioritized interrupt to processor
IN2 Interrupt Level 2  prioritized interrupt to processor
IN3 Interrupt Level 3  prioritized interrupt to processor
IN4 Interrupt Level 4  prioritized interrupt to processor
ITS Data on Bus is an Interrupt
JMP Load Memory Sequence Counter with a New Address
JMP0-JMP10  11 Bits of a new address for Mem. Sequencer Loading
LA0-LA31 Local Address Bus leads
LAC Address Buffer Select
LAD Latch Local Data for Start Address
LAR Address Buffer Direction
LAY Local Address Bus, same as LA0-LA31)
LD0-LD31 Local Data Bus leads, same as LDY
LDA Latch Local Data, Use as Address
LDC Address Buffer Select
LDD Address Buffer Direction
LDY Local Data Bus, same as LD0-LD31
LID Latch ID from Interface
LID0-LID2 Muxed SID or WID from ID bus, same as LIDY
LLA Latch Local Address
LLD Latch Local Data
LRS Local Unit Reset
LS0-LS6 Local Data Checkbits, same as LSY
LST Latch Local Data to Set Commands
MBS Memory is Busy
MDA Memory Read Data is Available
MER Memory Error
MODE X1; X0, X1, X2 are encoded mode for command controller
MODE X2, see Mode X1
NAK NXT Command Acknowledge, Seq'l Read Request Accepted Ack't
NXT Burst Mode Read Request, Next
ODD Odd or Even Parity
PA2 P1, P2, P3, PA1, PA2 are Partial Parity Signals
PER Address Parity Error
PRP Power Up Reset Status
RAK Read Request Accepted Acknowledgement
RES Local Reset from the Bus
RSC Reset Counter
RSQ Reset Sequencer On Master Controller Memory
RST Unit Reset
S0-S2 Same as SLT0-SLT2

SAV ADV Command Input Status
SBE Bus Error Status
SBL Bus Lock Status
SCA Cancel Command Input Status
SCB Clear Bus Lock Status
SDA DAK Command Input Status
SDV DAV Command Input Status
SDI Auxiliary Data Buffer Direction
SEQ Memory Sequence Increment Command
SID Encoded Sender ID Lines, same as SID0-SID2
SID0-SID2 Source Identification leads, same as SID
SIE Auxiliary Data Buffer Enable
SIT Last Data in was an Interrupt
SKA Auxiliary Data Buffer A to B Clock
SKB Auxiliary Data Buffer B to A Clock
SLD Set Bus Lock Desire
SLT0-SLT2 Slot ID's
SM0 Set Mode 0, Command Controller Interrupt & Wait Mode Control
SM1 Set Mode 1  "
SM2 Set Mode 2  "
SM3 Set Mode 3  "
SM4 Set Mode 4  "
SM5 Set Mode 5  "
SM6 Set Mode 6  "
SM7 Set Mode 7  "
SNA NAK Command Output Status
SNX NXT Command Input Status
SOD Auxiliary Data Buffer Disable
SOE Auxilary Data Buffer Enable
SOI Soft Reset Status
SQ0 SQ10 Address Lines from Memory Sequencer
SRA RAK Command Input Status
SRS Raw Reset Switch
SSA Auxiliary Data Buffer A to B Select
SSB Auxiliary Data Buffer B to A Select
SSU SUP Command Input Status
ST0-ST7 Memory Start Address
STA Auxiliary Status has Changed
STR Start Local Memory Read
STW Start Local Memory Write
SUP Supervisory Control
SWA Start Wait
SWT Last Address in was a Write, not a Read Request
WAI Processor Wait for Response
WID Encoded Writer ID Lines
WID0-WID2 Writer IDs
WRD Local Write/Read Command
WRD0-WRD2 Writer ID leads, also WRDY
WRDY Writer ID to/from Memory
WRI0-WRI2 Writer ID to/from Memory, also WRIY
WRIY Writer ID for Read Response
WRN Warning Reset Status
WRT Write Command
X0-X2 Indicator of Current Interrupt Mode 0-7
ZAV Buffered Address Valid (ADV)
ZBA Buffered SUP
ZBE Buffered BER

```
ZBL  Buffered BLK
ZCA  Buffered CAN
ZCB  Buffered CBL
ZDV  Buffered Data Valid (DAV)
ZIT  Buffered ITS
ZNX  Buffered NXT
ZNA  Buffered NAK
ZRA  Buffered RAK
ZSU  Buffered SUP
ZWT  Buffered WRT
```

It is believed that the foregoing description of the preferred embodiment of the invention is sufficient in detail to enable one skilled in the art to make and use the invention without undue experimentation. However, it is expressly understood that the details of the elements which are presented for the foregoing enabling purpose are not intended to limit the scope of the invention, in as much as equivalents to those elements and other modifications thereof, all of which come within the scope of the invention, become apparent to those skilled in the art upon reading this specification. Thus the invention is to be broadly construed within the full scope of the appended claims.

What is claimed is:

1. In a processor system containing a plurality of processor resources, including at least three of any combination of processor means and memory means, at least one of which is a processor means, a system bus connected in common to all said processor resources for permitting transfer of digital information thereover between such processor resources, and a system clock for providing clock signals of predetermined fixed cycle duration to all said processor resources to synchronize such processor resources, said system bus containing at least a data bus portion, address bus portion and a control bus portion, the improvement comprising in combination therewith:

interface means for permitting any one of said processor means or memory means to access either said data bus portion without busying said address bus portion, leaving said address bus portion accessible by another one of said processor means or memory means, or said address bus portion without busying said data bus portion, leaving said data bus portion accessible by another one of said processor means or memory means, and for permitting another one of said processor means or memory means to simultaneously access a remaining accessible one of said address and data bus portions, whereby different ones of said processor means and memory means may simultaneously transfer digital information over said respective address and data bus portions.

2. The invention as defined in claim 1, wherein said interface means comprises a plurality of interface units, said plurality corresponding in number to the number of said plurality of computer resources; each of said plurality of interface units being associated with a corresponding one of said plurality of processor resource units for providing an interface between the respective associated computer resource means of said communications bus.

3. The processor system defined in claim 1 wherein said interface means is responsive to said system clock for permitting said bus access for only the duration of a single cycle of said system clock in synchronism with the commencement of the clock cycle to thereby limit the period during which said bus may be used by the respective processor resource means.

4. The processor system defined in claim 2 wherein said interface means is responsive to said system clock for permitting said bus access for only the duration of a single cycle of said system clock to thereby limit the period during which said bus may be used by the respective processor resource means.

5. The processor system defined in claim 1 wherein said interface means permits said access for the duration of a predetermined time interval of fixed length to thereby limit the period during which said accessed bus may be used by the respective processor resource means achieving such access.

6. The processor system as defined in claim 5 wherein said predetermined time interval is derived, directly or indirectly, from said system clock and is equal in duration to one cycle of said system clock.

7. The processor system as defined in claim 5 wherein said predetermined time interval is equal to one cycle of clock pulses produced by system clock.

8. The processor system defined in claim 5 wherein said processor system includes further:

priority determining means for resolving conflicting requests for access to said communications bus portions amongst more than one of said processor means and memory means in accordance with a predetermined priority protocol, said priority determining means, including:

means to prevent any one processor resource gaining access to at least one of said bus portions during a given interval from again obtaining access to said bus portion during the next contiguous interval in the presence of a bus access request by another of said processor resources for the same bus portion.

9. The invention as defined in claim 2 wherein said interface means includes an identification code uniquely identifying each said interface unit; and wherein said communications bus includes identification line means to identify the particular computer resource which is accessing said communications bus to perform a read or write operation to the other computer resources in the processor system.

10. The invention as defined in claim 8 wherein said interface means includes an identification code uniquely identifying each said interface unit; and wherein said communications bus includes identification line means to identify the particular computer resource which is accessing said communications bus to perform a read or write operation to the other computer resources in the processor system.

11. The invention as defined in claim 10 wherein said communications bus further includes
- at least second identification line means responsive to one of said memory means type processor resources accessing said data bus to provide a read response for receiving from said respective memory means an identity code representing another processor resource that is the intended recipient of said read response and providing such identification information to the other processor resources.

12. The invention as defined in claim 2 wherein each of said interface units includes an identification code uniquely identifying each said interface unit within said processor system; and
- wherein said control bus portion includes identification line means, said identification line means including:
  - at least first identification lines responsive to one of said processor resources accessing said communication bus for receiving an identity code representing the identity of said interface means of said processor resource having access to the bus to transmit a command on said communications bus, whereby any other processor resource addressed by said one processor resource may identify such processor resource; and
  - at least second identification lines responsive to one of said memory means type processor resources accessing said data bus to provide a read response for receiving from said respective memory means an identity code representing another processor resource that is the intended recipient of said read response; and
  - at least third identification line means responsive to one of said memory means type processor resource accessing said data bus portion to provide a read response with data information contained in memory for receiving a identity code from said memory means type processor means with said identity code representing the identity of the one of said processor resources that originally wrote said data into said memory means to thereby communicate the identity of the original writer of said data information to the processor resource requesting said data information and also responsive to one of said processor resources accessing said communication bus to perform a write operation for receiving an identity code representing the identity of the one of said processor resources that originated the data that is the subject of said write operation.

13. The invention as defined in claim 8, wherein said predetermined priority protocol comprises in order:
- read responses and interrupts defining the first priority;
- writes defining the second priority;
- read requests defining the third priority;
- address bus access occurring in coincidence with the highest priority lone data bus access;and
- processor resource identification number defining the last numbered priority, with the lowest identification number having the highest priority from among said plurality of processor resources.

14. The invention as defined in claim 12 wherein each of said memory means, responsive to a processor means performing a read operation therewith, checks said first identification lines to obtain the identity code of the processor means requesting a read operation and storing such identity code of said processor resource along with said respective resource's read information.

15. The processor system defined in claim 1 wherein said processor means includes means to perform a write operation with said write operation requiring transmittal of an address and data information to write; and wherein said interface means further comprises:
- write command interface means for permitting one of said processor means to individually access both said data bus portion and said address bus portion simultaneously to permit said respective processor means to perform a write operation to like processor resource addresses, wherein said processor means sends simultaneously a write command on said data lines and an address on said address line, while busying both said address and data bus portions to thereby prevent simultaneous access to either of said address or data bus portions by remaining ones of said processor resources.

16. A digital processor system comprising:
- a plurality of processor resources for said system, said plurality of processor resources comprising at least the number three, with each of said processor resources being capable of sending and receiving digital information, at least one of said processor resources being capable of issuing a read command and all of said processor resources being capable of issuing an acknowledge command;
- a communication bus;
- each of said processor resources being coupled in common to said communication bus to permit transfer of digital information thereover between any of said plurality of processor resources;
- said communication bus including:
- a first plurality of lines defining an address bus portion,
- a second plurality of lines defining a data bus portion, and
- a third plurality of lines defining a control bus portion; and
- control means for permitting a first one of said processor resources to access said address bus portion and issue a read command onto said address bus portion within a bus transfer cycle interval directed to a second one of said resources and for concurrently permitting a third one of said processor resources to access the data bus portion and issue an acknowledge command or a read response to one of said processor resources over said data bus within said bus transfer cycle interval, whereby separate portions of said communication bus may be utilized simultaneously by separate processor resources in the digital processor system to enhance communication bus efficiency.

17. The processor system defined in claim 16 wherein said system further comprises:
- clock means for defining clock cycles of predetermined fixed time duration with said clock means being connected to said processor resources and to said control means over said control bus portion; and
- said control means including means for defining said bus transfer interval as equal in duration to said predetermined time duration of one cycle of said clock means.

18. The invention as defined in claim 17 wherein said clock means comprises a system clock.

19. The processor system defined in claim 17 wherein said control means includes further:
- priority determining means for resolving conflicting requests for access to said communications bus portions amongst more than one of said processor means and memory means in accordance with a predetermined priority protocol, said priority determining means, including:

means to prevent any one processor resource gaining access to at least one of said bus portions during a given interval from again obtaining access to said bus portion during the next contiguous interval in the presence of a bus access request by another of said processor resources for the same bus portion.

20. The method of transmitting digital information over a digital communication bus in a data processor system, wherein said communications bus contains an address bus portion, a data bus portion and a control bus portion, and wherein said data processor system contains a plurality of processor units each of which is capable of accessing said bus to transmit and receive digital information, thereover, which includes the step of:

determining whether one and another of said processor units seeking access to said communications bus have immediately concluded an access to said communications bus; and applying digital information from said one or said processor units to said address bus for a fixed interval of time and simultaneously applying digital information from said another of said processor units to said data bus portion within said same fixed interval of time for simultaneous transmission to other processor means in said plurality to thereby increase the thruput of said communications bus.

21. The method as defined in claim 20 wherein said digital communication bus includes further an identification bus and wherein said step of applying includes applying identification information identifying one of said processor units to said identification bus.

22. The method of transmitting digital information over a communications bus in a data processor system, wherein said communications bus contains an address bus portion, a data bus portion and a control bus portion, and wherein said data processor system contains a plurality of processor units each of which is capable of accessing said communication bus to transmit and receive digital information thereover and a system clock coupled to all such processor units to provide clock pulses of a predetermined duration to define a fixed interval of time, comprising the steps of:

determining whether one or more processor units is contending for access to said communications bus and resolving multiple contentions according to a priority protocol, said protocol prioritizing the ability of each processor unit to individually access said address and data bus, and precluding any one processor unit from immediately reaccessing a given bus portion immediately following a bus access thereby in the presence of another processor unit requiring access of that bus portion;

dividing each bus portion into a plurality of consecutive like time intervals and limiting any processor unit bus access to a single time interval, whereby if said processor resource cannot complete an operation within such interval such processor is forced thereby to again access the bus at a later time according to prioritizing in order to further communicate upon said bus;

determining whether one processor unit is contending for bus access to perform a read operation simultaneously with another processor resource contending to perform a read response operation and responsive to an affirmative determination connecting respective processor units to address and data portions of said communication bus portions, respectively, for only said fixed interval of time in which one bus portion thereof may be accessed by one of said processor units to perform a read operation without interfering with use of the other bus portion and the data bus portion may be simultaneously accessed for permitting the second processor unit to perform a read response; and applying digital information from one of said processor units to said address bus for said fixed interval of time and simultaneously applying digital information from another of said processor units to said data bus portion within said same fixed interval of time.

23. A data processing system comprising a plurality of units coupled to transfer information between any two of said units over a common communications bus during asynchronously generated information transfer periods, said system further comprising:

first means, included in a first one of said units, for enabling the transfer of first information over said bus to a second one of said units during a transfer interval, said first information indicating a request for a further transfer of information from said second one of said units to said first one of said units;

second means, included in said second one of said units, responsive to said first information, for enabling the transfer of second information from said second one of said units to said first one of said units over said bus during a later transfer interval, said later transfer interval occurring asynchronously relative to said first transfer interval;

third means for limiting the duration of said information transfer to said transfer interval, irrespective of said first unit requiring a greater period of time to transfer said first information to said second unit, whereby the transfer of information by said first unit may be incomplete at the conclusion of said respective transfer interval;

means responsive to incomplete transfer of said first information by said first unit for permitting each of said first and second units to again access said bus during a subsequent information transfer interval, non-contiguous with said transfer interval, to permit completion of transfer of the remainder of said information to be transferred to said respective unit during like transfer intervals; and each of said units including means for enabling the transfer of information between any two of said units, including said first and said second ones of said units, during any information transfer cycle between the time said first transfer cycle and said later transfer cycle.

24. The invention as defined in claim 23, wherein said data processing system further includes: system clock means for providing clock pulses of uniform duration repetitively; and means for commencing each said transfer interval only on commencement of and in synchronism with a clock pulse at the commencement of a clock pulse cycle and for concluding said respective transfer interval only on termination of said respective clock pulse cycle, whereby said system clock means defines said transfer intervals.

25. A system as defined in claim 24 further comprising:
   means, included in first one of said units, for storing an indication that said first information, requesting a return transfer of information, has been transferred from said first one of said units;
   means, included in said second one of said units, responsive to said first information, for supplying an indication over said bus to said first one of said units to signify receipt of said first information within said second unit.

26. The invention, as defined in claim 23, wherein said data processor system includes clock means for generating clock cycles; said second means being responsive to said clock for limiting each said transfer interval to one clock cycle.

27. The invention, as defined in claim 24, wherein said communications bus comprises:
   a first plurality of paths for data information;
   a second plurality of paths for address information; and
   a third plurality of paths for control information; said processor system further comprising:
   means for determining whether address information awaits transmission on said second plurality of data paths; and
   means for sending reply information over said second plurality of paths in response to an absence of address information awaiting transmission thereover, whereby reply information is sent on a data path normally reserved for address information.

28. The invention, as defined in claim 27, wherein said second unit includes means for storing the identification number of said requesting first unit together with the information request sent by said first means; means included in said second unit for checking the identification number of any subsequent one of said first units to determine whether said subsequent unit is identical to the prior one of said first units; and means responsive to said requesting first unit having the same identification number for transmitting said requested information.

29. A processor system comprising:
   a plurality of processor resources, including at least three of any combination of processor means and memory means;
   each of said processor resources including a permanent identification code uniquely identifying each said processor resource within said processor system;
   each of said processor means including means for performing read and write operations pursuant to an associated program;
   each of said memory means, responsive to a processor means performing a read operation therewith, for checking said first identification lines to obtain the identity code of the processor means requesting a read operation and storing such identity code of said processor means along with said respective processor means read information;
   said processor resource means including:
   means to provide a first handshake signal to acknowledge receipt and acceptance of address information from the address bus;
   means to provide a second handshake signal to acknowledge receipt and acceptance of data information from the data bus;
   means for applying the appropriate handshake signals in the bus transfer cycle immediately following the bus transfer cycle in which the information was received by said resource;
   system bus means, said system bus means being connected in common to all said processor resources for permitting transfer of digital information between such processor resources thereover, said system bus means containing at least a data bus portion, address bus portion and a control bus portion;
   said control bus portion including:
   an address bus request line for requesting the address bus;
   a data bus request line for requesting the data bus;
   a write bus request line for requesting simultaneously the data bus and the address bus;
   sender identification lines, said sender identification lines being responsive to one of said processor resources accessing said communication bus for receiving an identity code representing the identity of said processor resource having access to the bus to transmit a command on said communications bus, whereby any other processor resource addressed by said one processor resource may identify the processor resource sending a command;
   destination identification lines, said destination identification lines being responsive to one of said memory means type processor resources accessing said data bus to provide a read response for receiving from said respective memory means an identity code representing another processor resource that is the intended recipient of said read response;;
   writer identification lines, said writer identification lines being responsive to one of said memory means type processor resource accessing said data bus portion to provide a read response with data information contained in memory for receiving a identity code from said memory means type processor means with said identity code representing the identity of the one of said processor resources that originally wrote said data into said memory means to thereby communicate the identity of the original writer of said data information to the processor resource requesting said data information and also being responsive to one of said processor resources accessing said communication bus to perform a write operation for receiving an identity code representing the identity of the one of said processor resources that originated the data that is the subject of said write operation;
   module identification lines;
   a read acknowledge line;
   a write acknowledge line; and
   a burst acknowledge line;
   system clock means for providing clock signal of predetermined fixed cycle duration to all said processor resources to synchronize such processor resources;
   each of said computer resource means including:
   interface means for providing an interface between the respective associated computer resource means and said communications bus;
   control means interconnecting said interface means over said control bus portion for permitting any one of said processor means or memory means to access either said data bus portion without busying said address bus portion, leaving said address bus portion accessible by another one of said processor means or memory means, or said address bus portion without busying said data bus portion, leaving said data bus portion accessible by another one of said processor means or memory means, and for permitting another one of said processor means or memory means to simultaneously access a remaining accessible one of said address and data bus portions, whereby different ones of said processor means and memory means may simultaneously transfer digital information over said respective address and data bus portions;

said control means further including bus lock control means for intentionally asserting a lock on both address and data bus portions to preclude another processor resource from accessing said bus and for preventing disconnection of the processor resource initiating said lock;

said interface means being responsive to said system clock and to the absence of a bus lock for permitting said associated processor resource to access said address or data bus portion for only the duration of a single cycle of said system clock to thereby limit the period during which said bus may be used by the respective processor resource means;

said interface means including priority determining means for resolving conflicting requests for access to said communications bus portions amongst more than one of said processor means and memory means in accordance with a predetermined priority protocol, said priority determining means, including: means to prevent any one processor resource gaining access to at least one of said bus portions during a given interval from again obtaining access to said bus portion during the next contiguous interval in the presence of a bus access request by another of said processor resources for the same bus portion;

said predetermined priority protocol comprising in order: read responses and interrupts defining the first priority; writes defining the second priority; read requests defining the third priority; address bus access occurring in coincidence with the highest priority lone data bus access; and processor resource identification number defining the last numbered priority, with the lowest identification number having the highest priority from among said plurality of processor resources.

30. The invention as defined in claim 29, further including: means for deactivating said bus lock control means.

* * * * *